United States Patent
Zhao et al.

(10) Patent No.: US 11,615,302 B2
(45) Date of Patent: Mar. 28, 2023

(54) EFFECTIVE USER MODELING WITH TIME-AWARE BASED BINARY HASHING

(71) Applicant: Samsung Electronics Company, Ltd., Gyeonggi-do (KR)

(72) Inventors: Xiangyuan Zhao, Irvine, CA (US); Hong-hoe Kim, Irvine, CA (US); Peng Zhou, Irvine, CA (US); Yingnan Zhu, Irvine, CA (US); Hyun Chul Lee, Mountain View, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 414 days.

(21) Appl. No.: 16/796,813

(22) Filed: Feb. 20, 2020

(65) Prior Publication Data
US 2020/0285960 A1    Sep. 10, 2020

Related U.S. Application Data

(60) Provisional application No. 62/814,418, filed on Mar. 6, 2019.

(51) Int. Cl.
*G06N 3/08* (2006.01)
*G06N 3/04* (2023.01)
(Continued)

(52) U.S. Cl.
CPC .......... *G06N 3/08* (2013.01); *G06F 16/2264* (2019.01); *G06F 17/15* (2013.01); *G06N 3/0454* (2013.01); *G06N 20/00* (2019.01); *G06Q 30/0201* (2013.01); *G06Q 30/0205* (2013.01); *G06Q 30/0276* (2013.01)

(58) Field of Classification Search
CPC ........ G06N 20/00; G06N 3/0454; G06N 3/08; G06N 3/084; G06Q 30/0205; G06Q 30/0201; G06Q 30/0276; G06F 17/15; G06F 16/2264; G06F 16/9535;
(Continued)

(56) References Cited

U.S. PATENT DOCUMENTS 6,281,801 B1 * 8/2001 Cherry .................. G01N 22/04
                                                           73/61.41
8,775,471 B1   7/2014 Kozyrczak
(Continued)

FOREIGN PATENT DOCUMENTS

KR   10-2016-0114241 A   10/2016
KR   10-2017-0080551 A    7/2017
WO   WO2017-116488 A1     7/2017

OTHER PUBLICATIONS

Liu, et al. "Audience Expansion for Online Social Network Advertising," KDD '16 San Francisco, CA, DOI 10.1145/2939672.2939680, 10 pages, Aug. 13, 2016.
(Continued)

*Primary Examiner* — Xilin Guo

(57) ABSTRACT

In one embodiment, a computer-implemented method includes acquiring sequential user behavior data including one-dimensional data. The user behavior data is associated with a user. The method includes abstracting features from the sequential user behavior data to cover short-term and long-term timeframes. The method includes determining one or more properties of the user based on the features.

20 Claims, 28 Drawing Sheets

(51) Int. Cl.
  *G06F 16/22* (2019.01)
  *G06N 20/00* (2019.01)
  *G06F 17/15* (2006.01)
  *G06Q 30/0201* (2023.01)
  *G06Q 30/0204* (2023.01)
  *G06Q 30/0241* (2023.01)

(58) Field of Classification Search
  CPC ...... G06F 21/554; G06V 20/52; G06V 40/20; G06T 2207/10016; G06T 7/20
  See application file for complete search history.

(56) References Cited

U.S. PATENT DOCUMENTS

| | | | |
|---|---|---|---|
| 10,976,404 | B2 | 4/2021 | Wirola |
| 11,190,358 | B2 | 11/2021 | Bettger |
| 11,251,964 | B2 | 2/2022 | Bettger |
| 11,409,980 | B2 | 8/2022 | Chan |
| 2003/0061212 | A1 | 3/2003 | Smith |
| 2015/0248458 | A1 | 9/2015 | Sakamoto |
| 2015/0254151 | A1* | 9/2015 | Baril .................. G06F 11/3003 702/182 |
| 2015/0278239 | A1 | 10/2015 | Colt |
| 2016/0197730 | A1 | 7/2016 | Lu |
| 2017/0353477 | A1 | 12/2017 | Faigon |
| 2018/0032528 | A1 | 2/2018 | Turner |
| 2018/0253438 | A1 | 9/2018 | Zaydman |
| 2019/0052467 | A1 | 2/2019 | Bettger |
| 2020/0065124 | A1 | 2/2020 | Chen |
| 2020/0074275 | A1 | 3/2020 | Xia |
| 2020/0162450 | A1 | 5/2020 | Yarabolu |
| 2020/0193295 | A1 | 6/2020 | Talmi |
| 2020/0202102 | A1 | 6/2020 | Chan |
| 2020/0202449 | A1* | 6/2020 | Cheng ................. G06N 3/0427 |
| 2020/0265098 | A1 | 8/2020 | Tepper |
| 2020/0286112 | A1 | 9/2020 | Zhou |
| 2021/0011882 | A1 | 1/2021 | Zhao |
| 2021/0012426 | A1 | 1/2021 | Brooks |
| 2021/0182387 | A1 | 6/2021 | Zhu |

OTHER PUBLICATIONS

Cao, et al. "Binary Hashing for Approximate Nearest Neighbor Search on Big Data: A Survey," IEEE Access vol. 6, 2018, DOI 10.1109/ACCESS.2017.2781360, 16 pages, Feb. 14, 2018.

Ying, et al. "Sequential Recommender System based on Hierarchical Attention Network," IJCAI-18, 7 pages, Jul. 13, 2018.

Ding, et al. "Collective Matrix Factorization for Multimodal Data," 2014 IEEE Conference on Computer Vision and Pattern Recognition, DOI 10.1109/VCPR.2014.267, 8 pages, Jun. 24, 2014.

Cao, et al. "HashNet: Deep Learning to Hash by Continuation," arXiv: 1702.00758v4 [cs.LG], 11 pages, Jul. 29, 2017.

Gionis, et al. "Similarity Search in High Dimensions via Hashing," Proceedings of the 25th VLDB Conference, Edinburgh, Scotland, 12 pages, Sep. 7, 1999.

International Search Report and Written Opinion for International Application No. PCT/KR2020/003560, 10 pages, dated Jul. 1, 2020.

Souza Cesar R., "Kernel Functions for Machine Learning Applications.", Web, pp. 1-11, Mar. 17, 2010.

Cakir et al., Adaptive Hashing for Fast Similarity Search, IEEE Xplore, DOI 10.1109/ICCV.2015.125, Feb. 18, 2016.

Non-final Office Action dated Sep. 2, 2022 in U.S. Appl. No. 16/796,739.

International Search Report and Written Opinion for International Application PCT/KR2020/003213, dated Jun. 18, 2020.

Non-final office action in U.S. Appl. No. 16/796,739, dated Feb. 3, 2022.

Final office action in U.S. Appl. No. 16/796,739, dated Apr. 19, 2022.

European Search Report in EP 20765778, dated Feb. 11, 2022.

HashNet: Deep Learning to Hash by Continuation, (Cao et al), 2017 IEEE International Conference on Computer Vision, Feb. 2017.

Shih, SY., Sun, FK. & Lee, Hy. Temporal pattern attention for multivariate time series forecasting. Mach Learn 108, 1421-1441 (2019). https://doi.org/10.1007/s10994-019-05815-0, Jun. 11, 2019.

Final office action in U.S. Appl. No. 16/796,739 dated Dec. 14, 2022.

\* cited by examiner

| User | Item | Context 1 | Context 2 | Context 3 | Context 4 | Context 5 | Context 6 |
|---|---|---|---|---|---|---|---|
| u1 | i2 | Family room | Saturday evening | SocialApp2 | OS2 | Phone2 | ... |
| u1 | i1 | Living room | Sunday morning | SocialApp1 | OS1 | Phone1 | ... |
| u1 | i2 | Living room | Sunday morning | MailApp | OS2 | Phone2 | ... |
| u1 | i4 | Bedroom | Sunday evening | SocialApp1 | OS1 | Phone1 | ... |
| u1 | i3 | Living room | Monday evening | VideoApp | OS1 | Phone1 | ... |
| u1 | i1 | Living room | Monday evening | VideoApp | OS2 | Phone2 | ... |

EFFECTIVE USER MODELING WITH TIME-AWARE BASED BINARY HASHING

PRIORITY

This application claims the benefit, under 35 U.S.C. § 119(e), of U.S. Provisional Patent Application No. 62/814,418, filed 6 Mar. 2019, which is incorporated herein by reference.

TECHNICAL FIELD

This disclosure generally relates to user activity modeling and similarity searches.

BACKGROUND

In big data systems for advertisement and marketing, finding and ranking groups of similar users—known as nearest neighbor search—is a critical task, particularly for applications such as lookalike search, user segmentation, and recommendation. Many types of modern devices, including televisions and mobile devices have detailed profiles of user interaction histories with content such as linear television, video on-demand, games, applications, and external devices, which can be used to calculate similarity between users, and ultimately their "nearest neighbors." However, due to the large-scale nature of this data, which can involve tens of millions of users with constantly updating interaction histories, each spanning millions of sessions over time, the task is computationally expensive.

One method to speed up nearest neighbor search is hashing using deep neural networks. Hashing transforms arbitrary fixed-format data, such as images, sounds, and text, into fixed size hash codes. Similarity operations can then be performed by comparing the hash codes. Efficiency gains are particularly pronounced when the hash codes generated are binary vectors, whose comparisons are just bit operations. User behavior histories, however, have contextual features and patterns different from the data formats that are compatible with this technique.

DESCRIPTION OF EXAMPLE EMBODIMENTS

Figure 1:
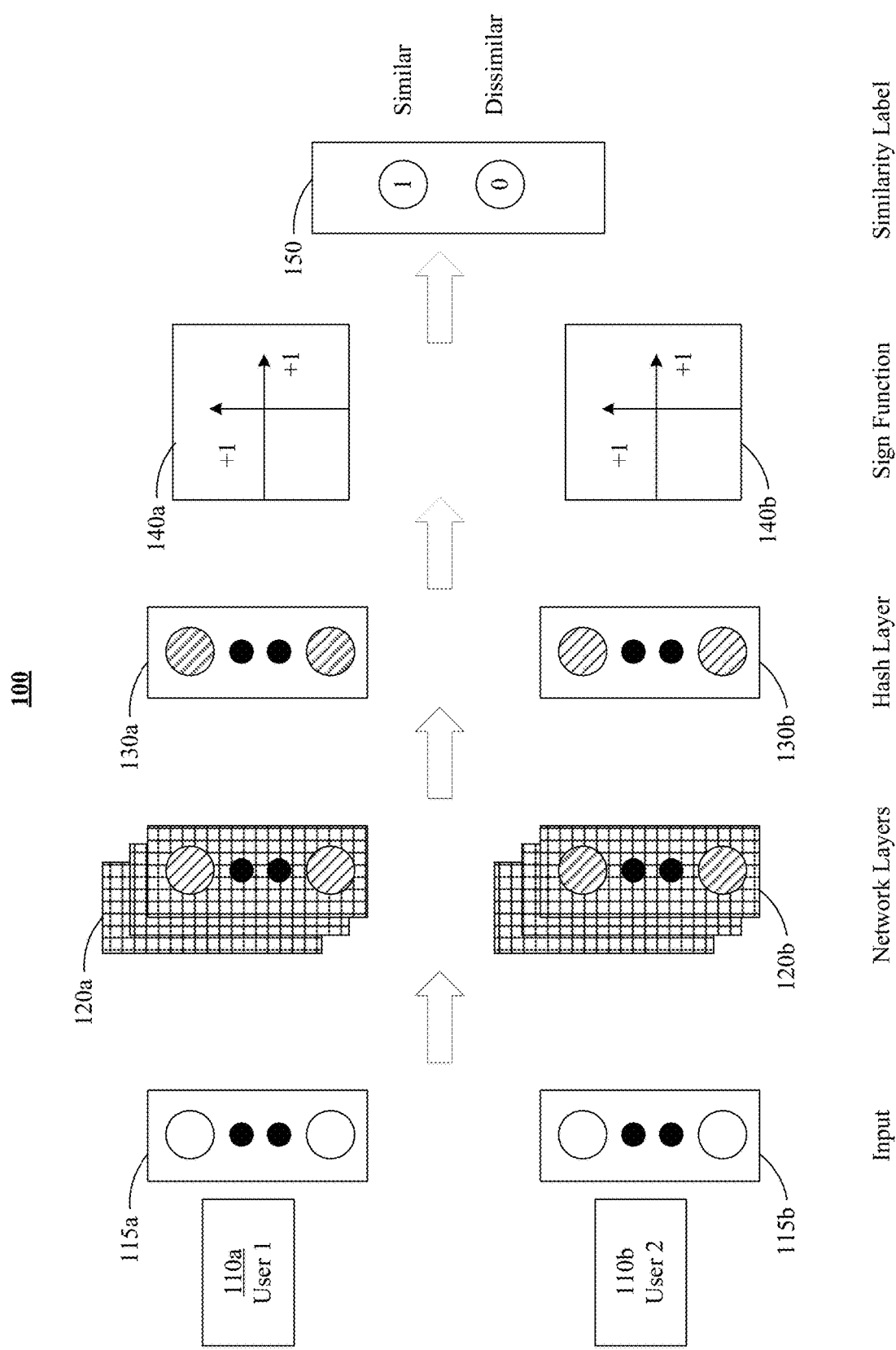
FIG. 1 illustrates an example high-level structural architecture for an embodiment of the disclosed hashing system.

Learning to hash has been widely adopted as a solution to approximate nearest neighbor search for large-scale data retrieval in many applications. Applying deep architectures to learn to hash has particular benefits due to its computational efficiency and retrieval quality. These deep architectures, however, may not be fully suitable to properly handle data known as "sequential behavior data." Sequential behavior data may include types of data observed in application scenarios related to user modeling. In particular embodiments, to learn binary hashing for sequential behavior data, a system may capture a user's evolving preferences (e.g., measured over an extended period of time) or exploit the user's activity patterns at different time scales (e.g., by comparing activity patterns over a short time scale and a long time scale). The disclosed technology provides novel deep learning-based architectures to learn binary hashing for sequential behavior data. The effectiveness of the architectures of the disclosed technology is shown through different experiments.

The problem of approximate nearest neighbors (ANN) search arises in many applications related to large-scale data search and retrieval. For example, one example application may be referred to as a "LookALike" expansion method which seeks to identify a seed object or data collection and identify other objects or data collections having a threshold degree of similarity to the seed object or data collection. The ultimate quality of LookALike audience expansion methods, which are widely used in ad targeting, may be highly dependent on the performance of the ANN algorithm used. Binary hashing is one approach to efficiently handle the ANN problem in high-dimensional spaces. In binary hashing, the original feature space may be projected into a low-dimensional Hamming space while preserving the similarity value or ranking of the original data within a predictable error margin. Searching in Hamming space tends to be fast and efficient as the Hamming distance between two points can be calculated through bit operations. Furthermore, as with general hashing, the number of comparisons can be substantially reduced.

Deep binary hashing techniques may demonstrate improved performance in highly complicated feature spaces. In particular embodiments, in deep binary hashing, a neural network may be optimized according to a similarity or ranking function while preserving loss function with the goal of transforming raw features into their corresponding embeddings. The corresponding embeddings are then eventually transformed into binary hash codes. This latter process can be achieved through the use of a sign function. Continuation methods have been developed to iteratively approximate the sign function during learning to solve the problem of vanishing gradients during back propagation.

Deep binary hashing algorithms may not always be suitable for behavior data, especially when the behavior data are sequential in nature. Sequential behavior data are frequently observed in applications dealing with the user's behavior patterns over a certain time period. Examples include a user interacting with websites, mobile apps, multimedia content, etc. The disclosed technology provides an approach to binary hashing of sequential behavior data that captures the user's evolving preferences and the dynamic nature of user behavior at various time scales. As an example and not by way of limitation, the timescales may include hourly, daily, weekly, monthly, or shorter or longer timescales depending on the application and use cases.

In scenarios such as LookALike, a computing system may capture the common behavior of groups of users whose preferences and needs are presumably similar. In such cases, the computing system may consider a certain group of users as a basic unit of binary hashing projection, which can be modeled using similarity functions for activity patterns. For example, two users regularly visit the same fantasy sports website because both of them are fanatic fans of fantasy sports. In addition, when behavior data is sequential, and especially when it is associated with specific time events, the computing system may capture the dynamic nature of the user's behavior across different temporal horizons. For example, two users regularly watch the same television show in the same day and time of the week as both of them live in the same time-zone while being subscribed to the same cable provider.

With these design principles in mind, the disclosed technology provides novel deep learning-based architectures that are substantially different from previous deep binary hashing methods. A first deep learning-based architecture is Categorical Attention, which uses a novel set of intermediate attention layers to transform raw feature data into high-level metadata (e.g., category or genre) embeddings with the goal of capturing the user's evolving preferences. A second deep learning-based architecture described in particular embodiments is a Relation and Attention CNN (RACNN). RACNN employs a set of intermediate relation and attention layers representing sequential user behavior in the 2D space at different time-window sizes, with an additional convolution layer associated with relation and attention layers to minimize the loss of isolated feature information from original data input. Because RACNN exposes information based on the time features of a user's interactions, it may also be referred to as a Time-Aware Attention CNN (TAACNN).

The disclosed technology introduces a unified deep binary hashing framework, the goal of which is to efficiently learn hashing for sequential behavior data. It is contemplated that there can be many variations associated with the disclosed technology. The disclosed technology provides a Categorical Attention model, which captures a user's preferences over high-level metadata information. In particular embodiments, this model may be more suitable for modeling the user's long-term and consistent preferences. The disclosed technology also provides a RACNN/TAACNN model that captures the user's behavior at various time scales. In particular embodiments, this model combines the user's long-term preferences with her short-term preferences. Thus, the RACNN/TAACNN model may be suitable for modeling the user's more dynamic behavior patterns. Moreover, several experiments have been run, which show that the disclosed technology outperforms other baseline hashing methods. The experiments also prove that the disclosed technology effectively handles nearest neighbors search for sequential behavior data.

One method of binary hashing for nearest neighbor search is locality-sensitive hashing (LSH), which uses random projections. Deep learning-based binary hashing approaches have been introduced. Many deep learning-based approaches focus on multimedia content (image and video), where it is possible to utilize CNN-type structures to create image embeddings that are then converted into similarity preserving hash codes. Sequential behavior data, however, is significantly different from multimedia data, making these approaches difficult to apply.

Another line of research concerns deep binary hashing for text (e.g., document similarity matching). These include semantic hashing, semantic hashing using tags and topic modeling (SHTTM), and variational deep semantic hashing for text (VDSH). These approaches take a document as an input bag of words and then learn binary hashing using an encoder-decoder network. Deep binary hashing has also been applied to recommendation, where a discrete deep learning approach factorizes user-item matrices into latent vectors in the Hamming space to generate binary hash codes for users and items. Even these are not appropriate for sequential behavior data types, such as user's interaction data over time, which is relevant to the disclosed technology, since state-of-the-art bag of words and matrix factorization approaches neglect the time-sensitive aspects of sequential behavior data.

This disclosure expands on deep learning-based approaches that generate user embeddings from user sequential behavior data. For instance, for a sequential recommendation system, an approach may model the evolving user's long-term preferences over time by distinguishing short-term and long-term histories, and then generate long-term history representation using attention. The output of such long-term representation is combined with the short-term history representation using attention again. One weakness of particular embodiments of that approach, though, is that it simply generates embeddings from sequential user-item interactions and neglects each item's high level metadata (e.g., category) information. As a result, it cannot correctly capture the user's taste (e.g., action movie lover). The disclosed technology provides an improved approach.

FIG. 1 illustrates an example high-level structural architecture for an embodiment of the disclosed technology including a deep binary hashing architecture 100. As illustrated, the architecture 100 includes three key components: (1) Network layers 120a and 120b (e.g., Categorical Attention or RACNN/TAACNN) to generate user representation from behavior data; (2) a fully connected hash layer 130a and 130b for transforming user representation into K-dimensional user embeddings; and (3) a sign activation function 140a and 140b for binarizing the embeddings for Hamming distance comparison.

One main usage of the binary hashing of the disclosed technology is how to quickly determine whether two users are similar to each other based on their behavior history. The disclosed technology defines user's behavior history to be a sequence of user actions (e.g., series of book reviews by the same user or series of clicks by a user on a website), each of which is associated with a time stamp. In particular embodiments, to measure similarity between users, the disclosed technology may efficiently vectorize their behavior histories and utilize vector distance metrics. Traditionally, one drawback of such distance calculations is the involved complexity as the associated vector dimension increases. To efficiently approximate nearest neighbor search, particular embodiments of the disclosed technology may reduce the overall computational complexity and the number of comparisons. Particular embodiments of the disclosed technology may accomplish this by hashing a user's behavior history vectors into Hamming space.

An example embodiment workflow of the disclosed technology for deep binary hashing is illustrated in FIG. 1. Inputs 115a and 115b arrive in pairs of pre-processed user behavior histories, each associated with a respective user 110a and 110b. The pre-processed user behavior histories are fed into a network layer (e.g., 120a and 120b, respectively) according to Siamese structure. The network layers 120a and 120b produce user representations. The user representations are compressed into K-dimensional user embeddings by a hash layer 130a and 130b, respectively. A sign activation function 140a and 140b is employed to binarize the embeddings into K-bit binary hash codes. Finally, a Hamming distance calculation 150 is performed to determine whether two users are similar or dissimilar.

As an improvement over previous deep learning-based approaches, the disclosed technology generates user embeddings from sequential user-item interactions using items' high-level metadata information (e.g., category or genre). The necessity of generating user embeddings based on user groups by preference can be illustrated with the following example. Assume that user A is an action/adventure movie fan and user B is a romantic movie lover. Suppose that a romantic movie is recommended to both users. User B may naturally enjoy watching the romantic movie as it is well aligned with their movie genre preference. User A may still watch this movie even though it is not their best preferred movie genre, perhaps because it is a top trending movie and User A enjoys watching top trending movies in particular contexts. As can be seen in this example, a user event may have different semantics and therefore a user's preference is an influential factor for user modeling.

Figure 2:
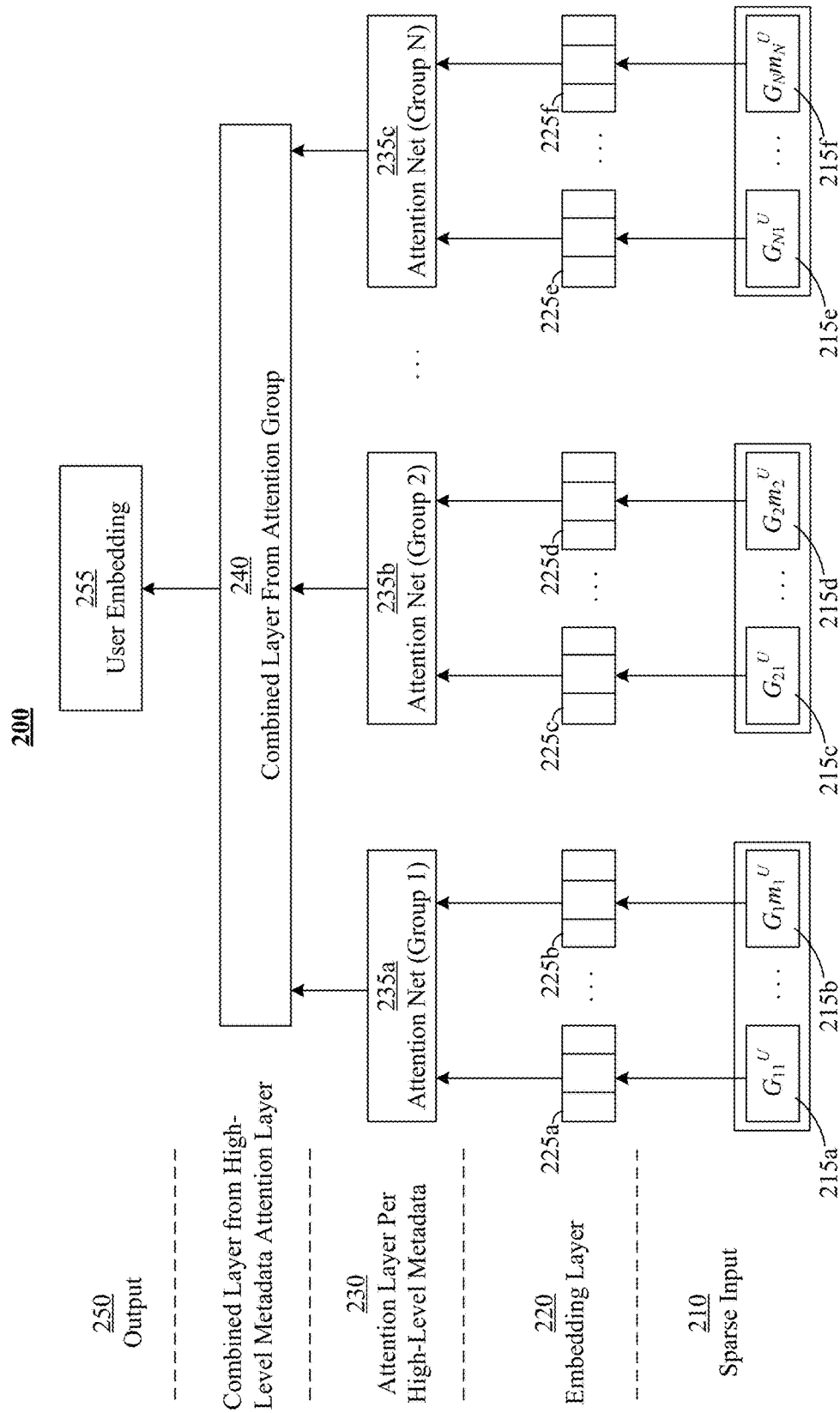
FIG. 2 illustrates an example architecture for a heterogeneous hashing model.

To efficiently learn user representation (embedding) from sequential behavior data to generate binary hashing, the disclosed technology provides a novel hybrid attention network, Categorical Attention, to capture the user's underlying preference. FIG. 2 illustrates an example embodiment of the disclosed technology including an overall structural architecture of a Categorical Attention network 200. In the Categorical Attention network 200, user representation is learned by combining attention networks per high-level metadata (e.g., category). In particular embodiments, attention may be chosen as the basic network for the disclosed technology rather than long short-term memory (LSTM) or gated recurrent unit (GRU) due to its superior performance. The network 200 of the disclosed technology includes four layers: (1) a sparse input layer 210 that sparses user and item inputs 215a-215f (e.g., one-hot representation) by grouping items per high-level metadata, (2) an embedding layer 220 that learns each item's embedding 225a-225f, (3) an attention layer per high-level metadata 230 that computes a weighted sum over the items' embeddings per high-level metadata in networks for each grouping 235a-235c, and (4) a combined layer 240 from high level metadata attention layer. The output 250 of this particular layer represents users while representing their categorical preferences as well.

In particular embodiments, the disclosed technology first sorts all items in time sequence and categorizes them according to their high-level metadata information to produce item groupings containing items 215a-215f. Metadata may have a broad meaning. Examples of metadata include, but are not limited to genre, topic, category, taste, etc. Each item 215a-215f found in a metadata group is represented by $G_{ij}^U$, where G is a group, i is the index of the group, j is the index of the item in the $i^{th}$ group, and U represents users. From the item groupings, the embedding layer 220 produces items embeddings 225a-225f corresponding to each metadata group 215a-215f. The attention layer 230 layer captures inner-relationships among all items that are found in the given high-level metadata group (e.g., 225a) for each group (creating attention nets 235a-235c). Here the disclosed technology uses user taste (e.g., "Sports") to illustrate this. From the grouped embedding layer 220 per taste, the disclosed technology captures inner-relationships in each item embedding 225a-225f. As the disclosed technology captures these inner relationships, some user-item interactions are inflated or deflated. This layer's output is treated as a representation of the user's sequential behavior reflecting other items' impact in the given taste. The disclosed technology can modify another self-attention structure to consider user attention per taste. Let $H_i$ be a matrix including a sequence of embedding outputs from grouped items 215a-b15f in each user's taste i, where G is a group and U represents users (Equation 1). The disclosed technology can apply nonlinear function tan h on $H_i$ (Equation 2). $T_i$ denotes the number of sequenced items in the $i^{th}$ taste (Equation 3). The representation $r_i$ of the sequence is formed by a weighted sum of these output vectors (Equation 4):

$$H_i = G_i^U \qquad (1)$$

$$M_i = \tanh(H_i) \qquad (2)$$

$$\alpha_i = \text{softmax}(w_i^{T_i} * M_i) \qquad (3)$$

$$r_i = H_i * \alpha_i^T \qquad (4)$$

After obtaining attention per taste using equation 4, the disclosed technology sums $r_i$ altogether to retrieve user embedding, $U_e = \Sigma_{i=1}^N r_i$, (255) where N is the number of tastes. Algorithm 1, shown below introduces the general approach of Categorical Attention from the described equations.

ALGORITHM 1

Categorical Attention

Figure 3:
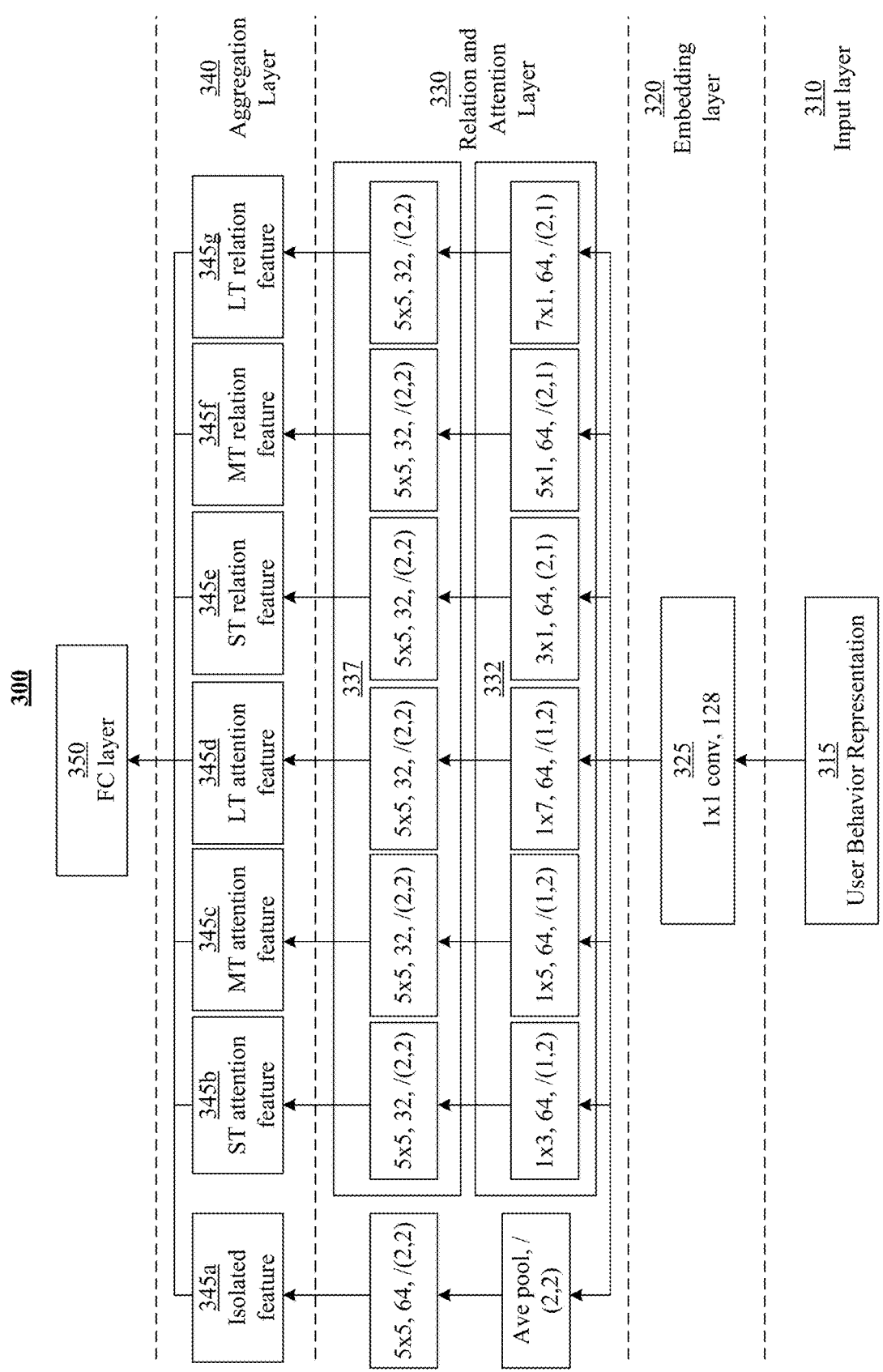
FIG. 3 illustrates an example architecture for a time-aware attention convolution neural network.

Input: User group U, Grouped item $G^u$ high-level metadata per each user U (e.g., $G_i^U$ contains a list of item id in ith high-level metadata), K: dimension of hash bit
Output: generated user embedding $U_e$ in K dimension
for each user $U_i$ in U do
  for each group $G_j^{Ui}$ in $U_i$ do
    ItemList = sorted by timestamp in $G_j^{Ui}$
    ItemEmbedding = generated by
    Embedding Layer in K dimension
    Compute high-level metadata
    attention (Equations 1 - 4)
  end for
  $U_{ei}$ = Sum the generated high-level metadata attention embedding
end for FIG. 3 illustrates an example embodiment of the disclosed technology including an architecture of RACNN/TAACNN 300. Although the figure implies certain parameter choices, as will be discussed in depth below, this disclosure envisions particular generalizations to be made to the structure. In FIG. 3, "ST" is short for short-time, "MT" is short for middle-time, and "LT" long-time, as described further below.

While attention models are known to be effective in processing sequential data, this disclosure builds upon approaches further showcasing the potential of CNN in processing sequential data. In those approaches however, because of data structure limitations, the CNN structures applied their convolution kernel in one single dimension even with embeddings in place. In the case of the disclosed technology with sequential data, this has the potential to lead to long-term attention feature loss, which could affect similarity preservation during binary hash code generation. To alleviate this potential problem, the disclosed technology provides a Relation and Attention CNN (RACNN) architecture/Time-Aware Attention CNN (TAACNN) architecture 300 to decompose sequential user behaviors into hash codes while preserving their similarity. Particular embodiments of the disclosed technology may be capable of converting given sequential behavior data into high dimension structures to abstract each user's short-term (relation) feature and long-term (attention) feature to achieve a better similarity preservation during binary hashing.

The structure begins with a user behavior representation 315 in the input layer 310. Because user behavior data are usually represented in terms of user-item interactions, in order to fit sequential behavior data into the RACNN/TAACNN structure, the disclosed technology first maps each item to its category domain to reduce its dimension. For example, each category may be encoded using one-hot encoding and the item could be a multi-hot encoding because it could belong to multiple categories (e.g., book or movie). After this, a system employing the RACNN/TAACNN structure may sessionize a user's data by a specific time unit (e.g., hour, day, week, etc.). In each session, the disclosed technology aggregates all items that the user has interacted with over the specific time unit, using each item's multi-hot encoding to represent user aggregated behavior in this session. Next, systems using the RACNN/TAACNN structure may reshape user's behavior into a high dimension space $U \in R^{H \times W \times C}$, where H is short-term dimension (e.g., day), W is long-term dimension (e.g., month), and C is category size. The exact time required in each dimension may be relative to the length of time chosen for the session. After gaining the user behavior representation 315, an embedding layer 320 is used. This layer uses a 1×1 convolution kernel 325 to map the low-dimensional sparse input U into a high dimensional adaptive dense embedding $U_e \in U \in R^{H \times W \times E}$, where E is the embedding size (e.g., 128 herein).

In the relation and attention layer 330, the disclosed technology utilizes different kernels to abstract different features to better preserve user similarity. The relation kernel set $k^R$ 332 has a finite number of kernels. In particular embodiments, the relation kernel set 332 includes three kernels, namely $\{k_{3\times 1}, k_{5\times 1}, k_{7\times 1}\}$. The attention kernel set $k^A$ 337 also has a finite number of kernels. In particular embodiments, the attention kernel set 337 includes three kernels, namely $\{k_{1\times 3}, k_{1\times 5}, k_{1\times 7}\}$.

In particular embodiments, to avoid isolated feature loss from the original user behavior representation 315, an isolated convolution 338 based on an average pooling function 333 may be added in the relation and attention layer 330 as shown in the left side of FIG. 3. Algorithm 2, below, shows how to compute user feature in the relation and attention layer 330 of the disclosed technology according to particular embodiments. All features 345a-345g extracted from the relation and attention layer 330c are flattened and concatenated together in the aggregation layer 340 for further similarity computation.

ALGORITHM 2

Relation and Attention / Time-Aware
Attention Feature Abstraction

Input: 2D embedded user behavior representations
$U^e = \{U_1^e, U_2^e, \ldots, U_N^e\}$
Output: The user feature $U^f = \{U_1^f, U_2^f, \ldots, U_N^f\}$
(dedicated feature abstract from the
relation and attention layer)
    for each user $U_1^e$ in $U^e$ do
        for each kernel $k_j^{ST}$ in relation
        kernel set $K^{ST}$ do
            $E_{i,j}^{ST}$ = Convolution($U_1^e$, $k_j^{ST}$)
            (each convolution will have a
            stride 2 at its convolution axis)
            $f_{i,j}^{ST}$ = Convolution($E_{i,j}^{ST}$, $k_{N \times N}$) (stride 2 is
            applied on each axis)
        end for
        for each kernel $k_j^{LT}$ in relation kernel set $K^{LT}$ do
            $E_{i,j}^{LT}$ = Convolution($U_1^e$, $k_j^{LT}$) (each
            convolution will have
            a stride 2 at its convolution axis)
            $f_{i,j}^{LT}$ = Convolution($E_{i,j}^{LT}$, $k_{N \times N}$) (stride 2
            is applied on each axis)
        end for
    $E_i^C$ = AveragePooling($U_i^e$)
    $f_i^C$ = Convolution($E_i^C$, $k_{N \times N}$)
    Final user feature $U_i^f = [f_i^C, f_i^{ST}, f_i^{LT}]$
    end for The last layer of both the Categorical Attention network 200 and RACNN 300 (250 and 350, respectively) generate user embeddings (e.g., 255) in the form of continuous vectors. Thus, it is necessary to convert them into binary hashes as the following. Formally, similarity-preserving hashing is the problem of representing the data from the input space $X = \{x_i\}_{i=1}^N$, composed of D-dimensional feature vector $x_i \in R^D$ to the hashing space $H = \{y_i\}_{i=1}^N$, composed of K-bit binary hash code $y_i \in \{-1,1\}^K$ while still preserving similarity. The problem can be described as: given N points of D-dimensional input data $X \in R^{N \times D}$, the goal is to learn a hashing function $f: x \to y$ to generate K-bit binary codes $Y \in H^{N \times K}$.

To define similarity, in most of the Siamese structures, it is usually defined as: $S_{ij} \in \{0,1\}$. $S_{ij}=1$ implies that $x_i$ and $x_j$ are similar while $S_{ij}=0$ implies their dissimilarity. In one approach, similarity of each pair is determined using tags that they are associated with. In that approach, $S_{ij}=1$ when two input objects share at least one tag, otherwise $S_{ij}=0$. However, in accordance with the disclosed technology, this definition is too loose and a more fine-grained similarity (e.g., real value similarity score) is beneficial. Such an objective can be achieved using Euclidean, Cosine, or Jaccard distances. The disclosed technology therefore defines the real value similarity function $S_{ij}$ as: $S_{ij} = c_i \cdot c_j / (\|c_i\| \|c_j\|)$. where $c_i$, $c_j \in C^M$, and M are number of segments, genres or categories respectively. Hamming distance is the most widely used measurement of similarity for binary codes. Observe: There is also a relationship between Hamming distance and inner product, which is $d_H(y_i, y_j) = \frac{1}{2}(K - \sum_k^K h_k(x_i) \cdot h_k(x_j)) = \frac{1}{2}(K - y_i W y_j^x)$ where K is the length of hash code, W is K×K diagonal matrix, $y_i = [h_1(x_i), \ldots, h_K(x_i)]$ and $y_j = [h_1(x_j), \ldots, h_k(x_j), \ldots, h_K(x_j)] \in Y$. As the basic notion of Hamming distance does not fully capture different impact levels from different hash bits, the disclosed technology introduces a weighted Hamming distance measure. More precisely, between two binary codes, $y_i$ and $y_j$, the disclosed technology defines $d_H(y_i,y_j)=\Sigma_{k=1}^{K} w_k\|h_k(x_i)-h_k(x_j)\|$ where $w_k \in W$. The weighted Hamming distance measure can also be written as:

$$d_H(y_i, y_j) = \frac{1}{2}\left(\sum_{k=1}^{K} w_k - \sum_{k=1}^{K} w_k h_k(x_i) \cdot h_k(x_j)\right) \quad (5)$$

$$= \frac{1}{2}(tr(\mathcal{W}) - y_i \mathcal{W} y_j^T)$$

Given the set of pairwise similarities for N training data points, let $y_i W y_j^T$ be denoted as $\langle y_i, y_j \rangle_w$, the likelihood function is $P(S|y,W) = \Pi_{s_{ij} \in S} P(s_{ij}|\langle y_i, y_j \rangle_w)$. Thus the maximum likelihood estimation for the hash code output of all training points is given as:

$$\log P(S \mid \mathcal{Y}, \mathcal{W}) = \sum_{s_{ij} \in S} \log P(s_{ij} \mid \langle y_i, y_j \rangle_w) \quad (6)$$

For each pair, $P(s_{ij}|\langle y_i,y_j \rangle_w)$ can be defined as:

$$P(s_{ij}|\langle y_i,y_j \rangle_w) = 1 - \|s_{ij} - \sigma(\langle y_i, y_j \rangle_w)\|_1 \quad (7)$$

where $\sigma(x)=1/(1+e^{-\alpha x})$ is the adaptive sigmoid function with hyper-parameter $\alpha$ to control its bandwidth (i.e., steepness of the function). $\|s_{ij} - \sigma(\langle y_i, y_j \rangle_w)\|_1$ is Euclidean distance between the similarity label and sigmoid output of $\langle y_i,y_j \rangle_w$. From Eq. 7, it can be obtained as:

$$P(s_{ij} \mid \langle y_i, y_j \rangle_w) = \begin{cases} \sigma(\langle y_i, y_j \rangle_w), & s_{ij} = 1 \\ 1 - \sigma(\langle y_i, y_j \rangle_w), & s_{ij} = 0 \end{cases}$$

By taking Eq. 7 into maximum likelihood estimation in Eq. 6, the optimization problem can be defined as:

$$\min_{\Theta} \mathcal{L} = -\sum_{s_{ij} \in S} \log(1 - \|s_{ij} - \sigma(\langle y_i, y_j \rangle_w)\|_1) \quad (8)$$

where $\Theta$ denotes the set of all parameters in the given deep network. Due to the vanishing gradient problem of sign function, alternated relaxation methods can be used to optimize Eq. 8, such as using tan h or softsign for continuous relaxation.

In big data systems for advertisement and marketing, finding and ranking groups of similar users—nearest neighbor search—is a critical task, particularly for applications such as lookalike search, user segmentation, and recommendation. Modern devices, such as televisions and mobile devices, have detailed profiles of user interaction histories with content such as linear television, video on-demand, games, applications, and external devices, which can be used to calculate similarity between users, and thus their "nearest neighbors." However, due to the large-scale nature of this data, which can involve tens of millions of users with constantly updating interaction histories, each spanning millions of sessions over time, the task is computationally expensive.

A method used to speed up nearest neighbor search is hashing using deep neural networks, which transforms arbitrary data in fixed formats, such as images, sounds, texts, etc., into fixed-size hash codes. Similarity operations can then be performed much more efficiently by comparing the hash codes. Efficiency gains are particularly pronounced when the hash codes generated are binary vectors, whose comparisons are bit operations. User behavior histories, however, have contextual features and patterns that differ from images, sounds, and texts. Particular embodiments of the systems and architectures described in this disclosure can exploit these differences to achieve better and more efficient results in hashing, which will assist an operator in applications such as lookalike search, user segmentation, and recommendation.

Scalability and efficiency are among the most difficult problems in big data user behavior modeling. For a large device manufacturer, there may be millions of users providing user behavior data, leading to billions of individual records of user behavior data that may require processing on a daily basis. However, for businesses like online interactive advertisement, the service may require responses to be provided in an extremely limited time period, often on the order of milliseconds. Thus, a scalable and efficient framework is highly beneficial. The framework may also be required to combine both offline and online computing to best serve advertisement requests.

Previously, approaches to solving the nearest neighbor problem using hashing have been adopted for use with large-scale datasets, such as LSH and other binary hashing mechanisms. Usually these approaches capture a user's behavior at a high level only or over a long period of time. The performance of these approaches are generally poor while considering time sequences of changing user behavior. In addition, these historical approaches do not consider user behavior changes based on various contextual environments in which the user may be generating the user behavioral data (e.g., how the user interacts with content). For example, in the advertising domain, a user's preferences may change over time, from location to location, depending on the device they are using, the class of activity they are doing, or the social group they are in, to name but a few of contexts that may be considered. Particular embodiments of the systems and architectures discloses herein solve these problems, using novel and highly efficient hashing methods that captures all contextual aspects while still preserving users' preferences. By utilizing the hash codes generated by these novel methods, the disclosed techniques can be applied into applications such as user segmentation and lookalike user search.

This disclosure addresses the general problem of nearest neighbor search via hashing user behavior histories. The overall framework described herein provides a novel approach to the problem as described above. In addition, the architecture and framework address many technical problems that feed into the general problem. For example, this disclosure provides for time-based hashing of user behavior histories, a novel implementation of hashing. User behavior histories commonly exhibit specific temporal patterns. For example, users may have habits depending on the time of day, such as watching particular programs in the morning, at night, or during holidays. By producing hash codes that can reveal these patterns the disclosed system facilitates more effective comparison of users and their usage patterns over time. As another example, this disclosure provides for social group-based hashing of user behavior histories. The metadata that may be used to provide additional context elements to user behavior data include demographics and social network information. The demographic and social network information can be used to produce social group-based hash codes, in addition to individual hash codes. Social group-based hash codes facilitate similarity search both within and across groups, according to the targeting and analysis needs of end clients. As another example, this disclosure provides for location-based hashing of user behavior histories. Users often change their behavior depending on location. Taking advantage of location-specific patterns in user behavior history allows for location-aware similarity search. As another example, this disclosure provides for activity class-based hashing of user behavior histories. Another facet of the metadata that may be used include recordation of different activity classes such as content types, genres, etc. to take advantage of unique user similarity patterns within these classes. As another example, the systems and architectures described herein employ the use of heterogeneous hash codes. Hash codes in existing systems tend to capture the preference for a user as an overall value. However, using such hash codes, previous systems cannot efficiently discern different aspects of user preferences and cannot optimally differentiate users based on these preferences. This disclosure addresses this issue, as described herein, by generating heterogeneous hash codes composed of hash segments, which can capture different aspects of user preference and context. As another example, this invention tackles the problem of how to efficiently store the heterogenous hash codes and efficiently update the hash codes when needed. Because the ultimate purpose of hashing is to speed up applications such as nearest neighbor search, reducing the complexity of storage and updating is a vital component of any system employing the techniques described herein. As another example, the techniques described herein greatly improve usage and applications of user behavior history hash codes. Once a variety of hash codes have been generated for a user (or group of users), a system employing the techniques described herein may make use of them in particular applications such as to perform nearest neighbor search. This disclosure addresses the challenge of how to do so in an optimal manner by making use of context, weights, and both heuristic and learned decision making. User segmentation and lookalike user search are challenging problems in problem domains such as advertising. Machine learning methods and manual rules are first used to classify and identify user segments. Then, previous approaches apply sub-optimal methods such as LSH on seed user segments to find similar users. One standing problem of these approaches is the quality of user segments which has a large and detrimental effect on the performance of these systems, ultimately affecting the return on investment of advertising customers. Often, user segment quality is a crucial key performance indicator for an ad-targeting service provider. This disclosure provides solutions that efficiently refine the existing segments and expand the existing segments with high quality users.

In particular embodiments, this disclosure describes a system and architecture for performing nearest neighbor search via deep hashing of user behavior histories. The disclosure describes solutions to the problems described in the preceding paragraphs. The particular solutions that will be described in detail herein include time-based hashing of user behavior histories. The disclosed architecture hashes user behavior history with content at multiple, adaptive time windows, so as to model temporal structural patterns in users' behavior with content. This is done, for example, by defining "serial" and "periodic" patterns, either heuristically or through deep neural network learning. Then, users' time-based preferences may be directly hashed into hash segments or users' behavior histories may be decomposed according to the time windows. Finally, separate hash codes for each window may be generated. Another solution described herein includes social group-based hashing of user behavior histories. The architecture described herein uses available demographics and social network information to produce social group-based hash codes, in addition to individual hash codes. In particular embodiments, this is done by obtaining detailed descriptions of households (e.g., the individuals that comprise the household) and social networks and correlating them with household behavior histories. The correlating is performed, for example, with content through either heuristics or deep learning models, so as to produce hash segments for joint interactions, as well as individual interactions, or decomposing them into different hash codes. Another solution described herein includes location-based hashing of user behavior histories. When location information is available, the disclosed systems and architectures make use of it, either to generate hash segments of the users' location behavior preferences, or by generating hash codes separately for users' behavior histories in separate locations. The architecture also clusters these locations according to available labels, such as "home," "grocery store," "restaurant," etc., with joint hash codes for each label, using either heuristics or deep learning models. Another solution described herein includes activity class-based hashing of user behavior histories. User behavior histories are grouped according to their activity classes using either heuristics or deep learning models. In particular embodiments, the disclosed system may produce hash segments representing the users' activity preferences or may decompose the users' behavior histories into separate hash codes according to each activity class. Another solution described herein includes heterogeneous hash codes. In particular embodiments, each contextual feature may be trained to contributed to certain part of the final hash code for each contextual portion. In this case, the hash code may not be required to fit into a fixed length. The similarity between users can be easily measured by comparing the corresponding hash bits (according to the given context) with different weights. Another solution described herein is storage and update of user behavior history hash codes. The disclosed systems and architecture store hash codes for each user for each of the above dimensions, as well as weights associated with those hash codes. The weights, in particular embodiments, may be obtained for example from statistical factor analysis. Systems employing the techniques described herein may also store general weights that describe the importance of each dimension, which again may be learned from factor analysis. Updates may be made according to both the length and magnitude of changes in the user's behavior history. Another solution described herein is the usage of user behavior history hash codes. In particular embodiments, retrieval and usage are performed by a context-aware decision engine that analyzes the advertisement and marketing needs of a marketing customer and retrieves the most relevant hash codes for comparison based on, for example, the dimensions of similarity desired and the purpose of the retrieval. The architecture supports at least three search modes: expansion, refinement, and analysis. Expansion finds the target number of users most similar to a group of "seed" users. Refinement takes a group of "seed" users and attempts to filter out noise. Analysis describes, for a group of users, the statistical properties of their hash codes, for example, average similarity, most important dimension, associations, etc.

Figure 4A:
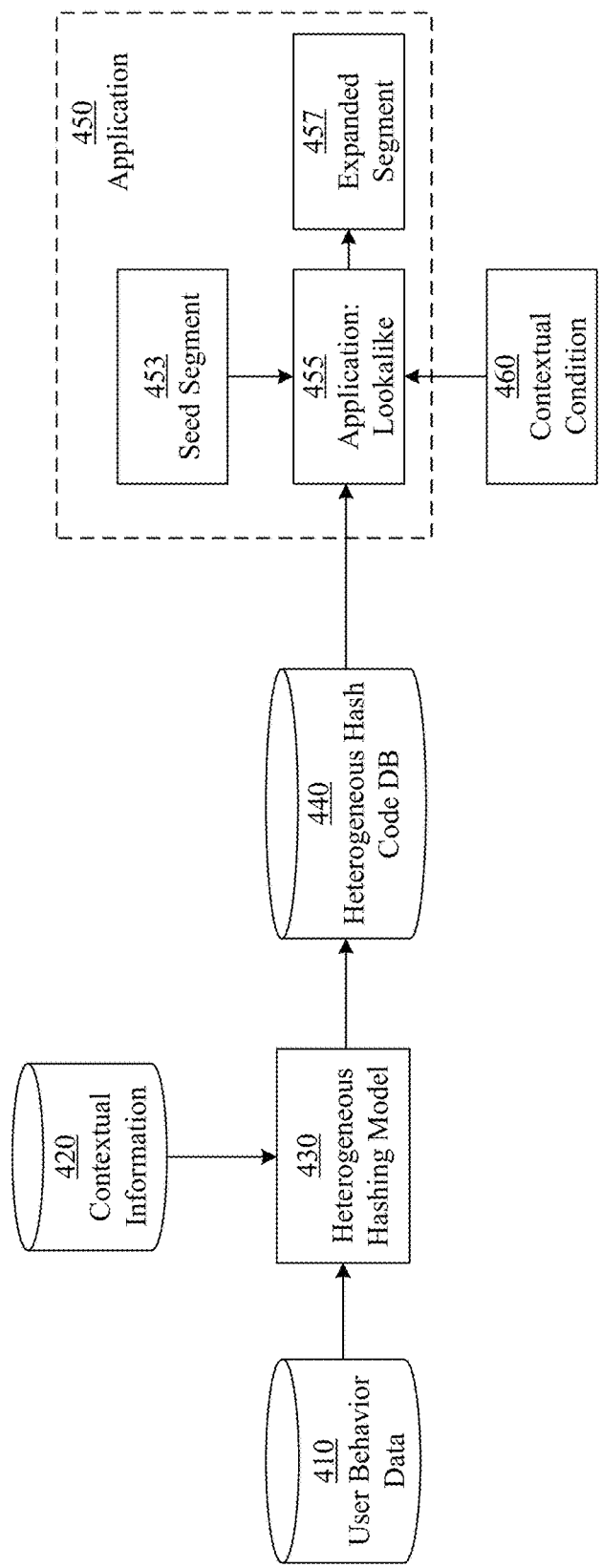
FIGS. 4a-4c illustrate example architectures of a system for generating and using heterogeneous hash codes.

FIG. 4a illustrates an example architecture of a system 400a for generating and using heterogenous hash codes according to particular embodiments. The system 400a includes a user behavior data database 410. The user behavior database 410 stored information regarding users' interactions with various applications, content items, media, websites, and other interactable elements tracked by user devices. The user behavior database 410 further stores metadata about those interactions. The system 400a includes a contextual information database 420. The contextual information database 420 stored any additional data acquire from various devices used by users to interact with media or other items that affect a particular user item interaction. Such contextual information may include, by way of example and not limitations, a user's demographic distribution (age, gender, income, etc.), location information, time information, device information, and various other suitable contextual information. The system 400a further includes a heterogeneous hashing model 430. The heterogenous hashing model 430 as described herein is a machine learning model trained to provide heterogeneous hash codes that enable many of the features of the disclosed system. The system 400a includes a heterogeneous hash codes database 440. The heterogeneous hash codes database 410 stores generated hash codes that capture different levels and aspects of users' preferences while preserving the similarity among users. In particular embodiments, the heterogeneous hash codes database 440 is organized for rapid, on-demand retrieval of heterogenous hash codes.

Also illustrated as part of the architecture of the system 400a is an example application system 450. Although only a single application system 450 is illustrated, this disclosure contemplates that multiple applications may be used within the system and may incorporate one or more heterogenous hash code databases 440. This disclosure will describe a particular instance of a lookalike expansion application, although other suitable applications are contemplated. Input to the application system 450 includes the contextual condition 460. The contextual condition 460 describes the uniting factor or condition of a requested new segment. The contextual condition 460 may be specified by a customer (or customer application) using the system 400a. For example, the contextual condition may specify that a customer is searching for four-member households who watch sports in California. The application system 450 includes an application block 455. In particular embodiments, the application block 455 may comprise the programming related to implementation of the application itself. In the example illustrated in FIG. 4, the application consists of lookalike user segment expansion. The problem solved by the application block 455 may be summarized as: given a seed user segment, find the most similar users that are most suitable for ad targeting. Various other applications that may use the hash codes are envisioned, such as advertising technologies, marketing technologies, recommendation engines, user profiling, detailed user segmentation, bid optimization, propensity prediction, and many other suitable applications. In particular embodiments, the application block 455 may describe variations on the application based on the customer's needs. For example, it may specify that lookalike expansion may be calculated using various distance function, such as Hamming distance. In particular embodiments, the application system 450 also receives as input a seed segment 453. The seed segment 453 may vary based on the application block 455. In lookalike modeling, the seed segment 453 may represent a set of users that already have been selected (e.g., by a customer) as representative of the target segment or as having already been targeted (e.g., to exclude from a new user based). The output of the application system 450 may, in particular embodiments, also vary with the application block 455. For example, in lookalike modeling, the output may be an expanded segment 457, a new user segment which includes the users that are most similar to a seed segment based on the targeting contextual condition 460.

Figure 5:
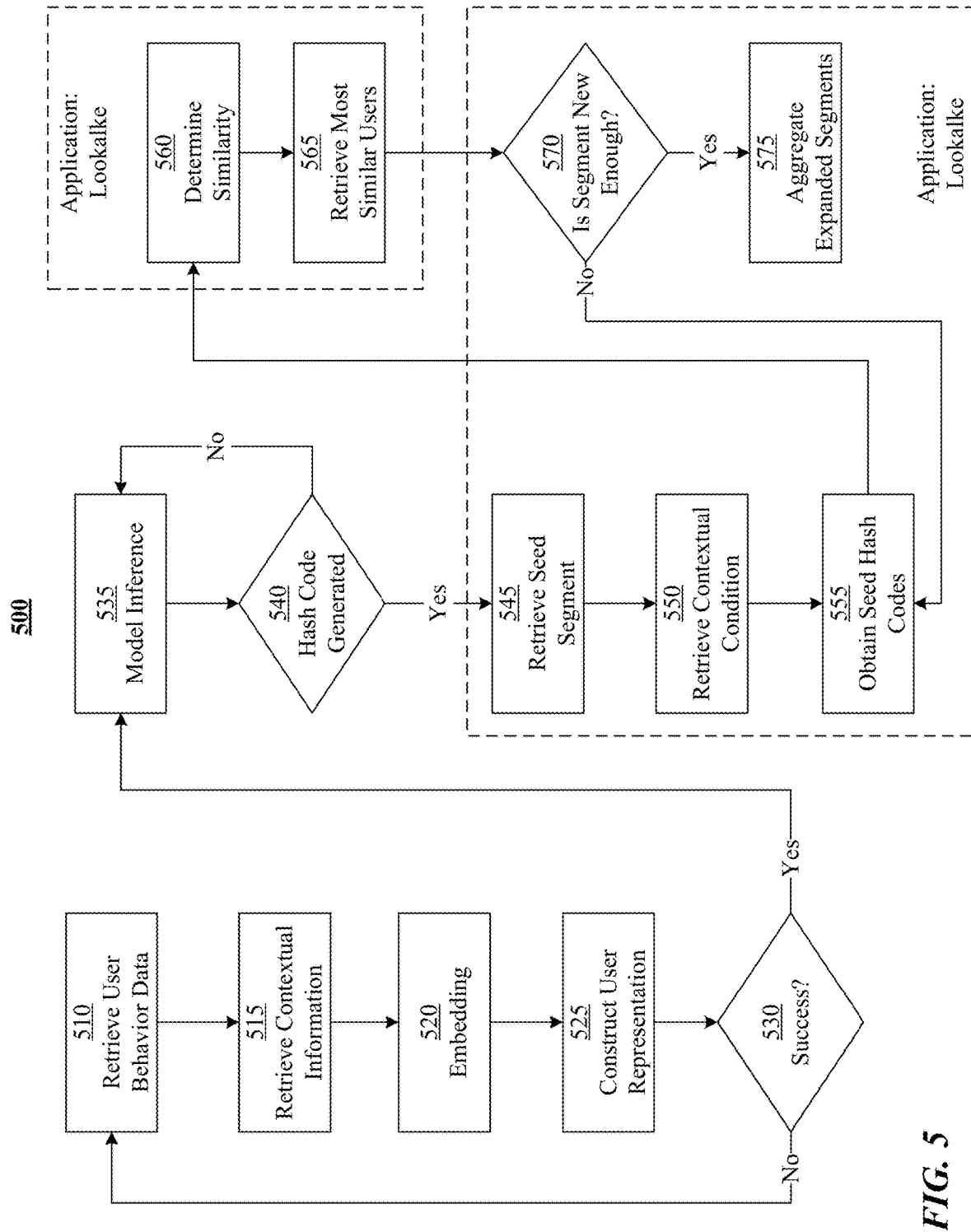
FIG. 5 illustrates an example method of operation of a system for generating and using heterogeneous hash codes.

FIG. 5 illustrates a method 500 of operation of the disclosed system for generating and using heterogeneous hash codes according to one embodiment of the architecture disclosed herein. The method many begin at step 510, where computing system may receive user behavior data from one or more client devices. For example, the system may receive records of user interactions with an application or an indication that a user has watched a particular video. At step 515, the system may also receive contextual information associated with the user behavior data. As described herein, the contextual information may include information such as a time of the interaction, location of the interaction, device used for interaction, demographics associated with the user and the user's household, etc. At step 520, the system may generate a vector embedding of the user interactions. The result of the embedding process may be a vector representation of the user's behavior in an embedding space. At step 525, the system may construct a user representation from the vector representation of the user's interactions and the received contextual info. The user representation may comprise the information about the user's preferences organized in a format reasonably readable by a human. The user representation may comprise a specialized format to allow the user representation to serve as input to the hash code generating model (e.g., heterogeneous hashing model 430). In particular embodiments, steps 510-525 relate to preprocessing the data or constructing the inputs to the inference or modeling stage, which generates the heterogeneous hash codes for all users. At step 530 the system may confirm that the preprocessing step resulted in success. If the determination is that the processing was unsuccessful, the method may return to step 510 to try again. The processing may be unsuccessful for a variety of reasons, including that an insufficient volume of data has been collected for the user, that the data may have been too sparse to create a meaningful representation, or a variety of other reasons. If the determination is that the processing was successful, the method may proceed to step 535.

At step 535 the system may use the heterogeneous hashing model 430 to generate a heterogeneous hash code based on the user representation. This process may variously be referred to as model inference, because, as described further herein, the heterogeneous hashing model 430 may be a machine learning model that has been trained to generate heterogeneous hash codes. The generated hash codes may be configured to preserve information about the user activity data and contextual information needed to calculate a similarity of users in behavior and context. In particular embodiments, the generated hash codes may not preserve the exact history of behaviors and contexts. In doing so, the hash codes may be much smaller and thus faster to compare than the original data they encode. At step 440, the system may evaluate the generated hash code to confirm that the hash code has been successfully created. Step 440 may encompass confirming that the hash code complies with rules relating to formatting, organization of data, error checking, and other relating requirements. These requirements may be pre-specified by the system or the application system for which the heterogeneous hashing model 430 is generating hash codes. Together, steps 535 and 540 may be responsible for generating the hash codes for the user data and contextual information.

In particular embodiments, steps 545-575 may be performed in part or in full by an application system (e.g., applications system 450) using the heterogeneous hash codes. At step 545 the application system 450 may receive a seed segment of users. The seed segment of users may be a collection of users chosen by the application system 450 or a user thereof as representative of the expanded group of users that the user would like to have identified. In particular embodiments, the seed segment may comprise users who have already received advertising targeting or users who have been identified as successful matches for a lookalike expansion. At step 550, the application system 450 may receive the contextual condition 460 that the user of the application system 450 desires to target. At step 555, the application system 450 may obtain seed hash codes from the heterogeneous hash code database 440 based on the received seed segment 453 and contextual condition 460. Because, as described herein, the heterogeneous hash codes are stored in a manner that allows the application systems 450 to retrieve only the most relevant hash codes based on the contextual condition 460, the application system 450 may retrieve different heterogeneous hash codes for varying contextual conditions 460 even if the seed segment 453 is the same. Thus, the retrieval of the correct heterogeneous hash codes is an major component of implementing the hash code comparison speedups that are a technical benefit of the described technology.

At steps 560 and 565, the application system 450 may perform the application for which the heterogeneous hash codes have been retrieved. For example, the application system 450 may perform the lookalike expansion. At step 560, the application system 450 may compare hash codes for a variety of users not in the seed segment 453 to retrieve seed heterogeneous has codes retrieved from the heterogeneous hash code database 440. The comparison may, in particular embodiments, involve computing a distance between the heterogeneous hash codes in an embedding space. The heterogeneous hash codes may have been produced by a heterogeneous hashing model 430 trained to generate heterogeneous hash codes that are similar when the underlying user activity data is similar and to generate heterogeneous hash codes that are dissimilar when the underlying user activity data is dissimilar. Thus, the distance between two heterogeneous hash codes is approximately reflective of the differences between the underlying user activity data. At step 565, the application system 450 may retrieve the most similar users to the users in the seed segment 453. The most similar user may be the user whose corresponding heterogeneous hash code is nearest to the seed heterogeneous hash codes in the embedding space. In particular embodiments, the application system 450 may identify all users within a threshold distance. In particular embodiments, the application system 450 may identify a threshold number of users, e.g., the fifty closest users.

In particular embodiments, the application system 450 may be configured to make a novelty determination regarding the retrieved users. For example, at step 570, the application system 450 may compare the retrieved segment of users to the seed segment of users to determine if the retrieved segment has a sufficient number of users or whether the retrieved segment of users satisfies a threshold degree of similarity. The application system 450 may determine that the retrieved segment of users has too high a degree of overlap with the seed segment of users, and proceed to step 555 where it may identify additional heterogeneous hash codes to which to compare the seed segment of users. If the application system 450 determines that the retrieved segment of users satisfies the threshold, the application system 450 may proceed to step 575 where it aggregates the collection of user segments (e.g., including the seed segment or not including the seed segment as appropriate), and prepares the expanded segment of users for return to the user of the application system 450.

In particular embodiments, the process of comparing users may be reliant on a weights matrix. As described herein, the process of generating heterogeneous hash codes may result in hash codes with substantially similar hash values for certain contextual information and substantially dissimilar hash values for other contextual information. The system or application system comparing the hash values may be configured to weight certain portions of the hash code comparison according to a weighting matrix that identifies sections of the hash code (e.g., particular context information) that is important in identifying, for example, similar user segments. A weighting matrix may also be used when generating the heterogeneous hash codes as a method of speeding up the comparison. The weights stored in the weighting matrix may be machine learned or based on heuristic values depending on the knowledge based available to the operator of the system or application system.

Figure 7:
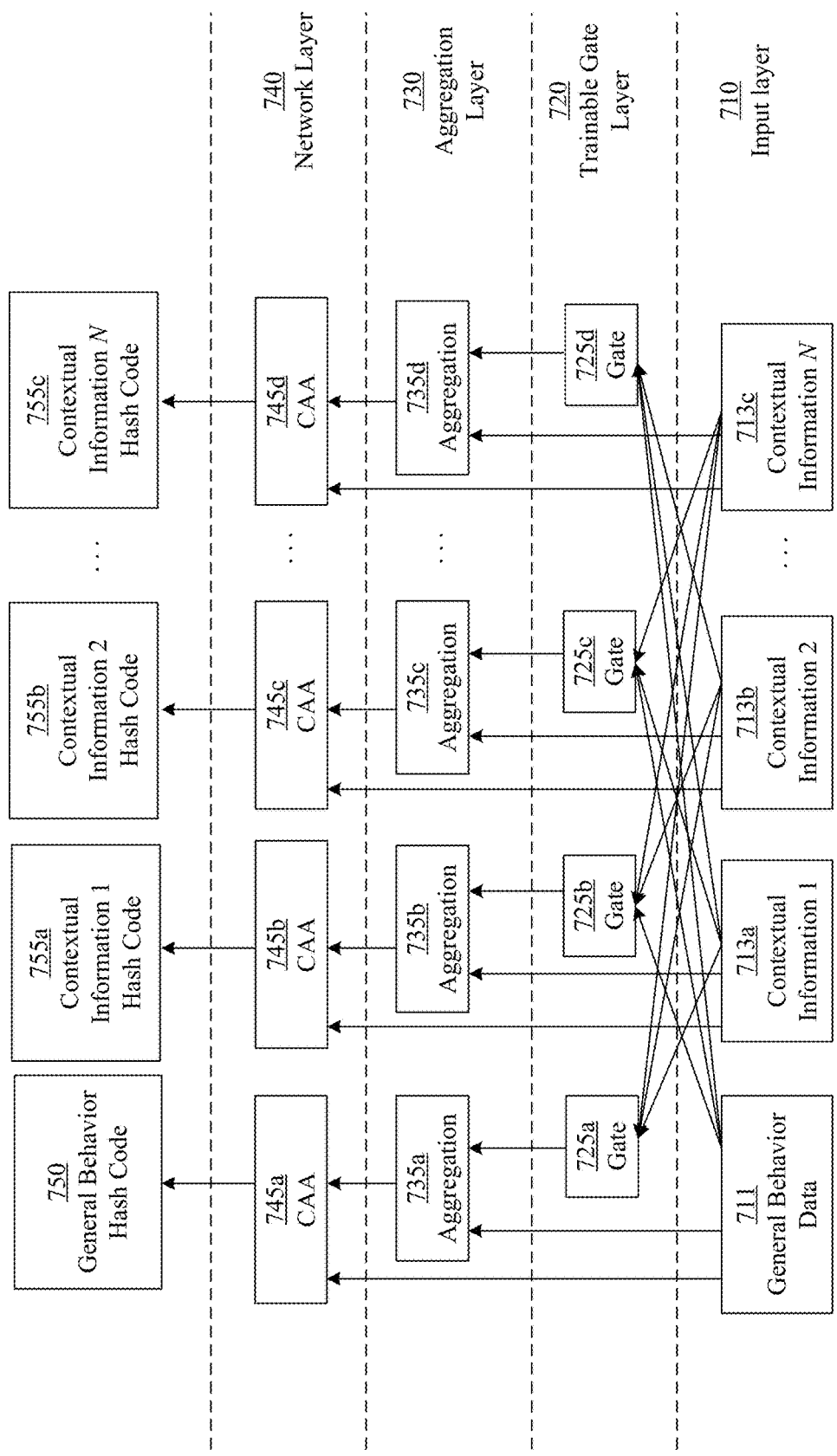
FIG. 7 illustrates an example architecture of a heterogeneous hashing model.

FIG. 7 illustrates an example architecture 700 of the heterogeneous hashing model. The input layer 710 includes preprocessed data, such as the general behavior data 711 (retrieved, for example, from a user behavior data database 410) and various contextual information 713a-713c (retrieved, for example, from a contextual information database 420). In this example, the preprocessed data may be considered only for a single user for the purposes illustration only. The same architecture may be used to process user activity data for a multitude of users in parallel. The data may be passed to a variety of structures in the architecture substantially simultaneously. For example, the general behavior data 711 may be passed to a trainable gate 725a specially set up for the general behavior data 711. The trainable gate 725a may be but one component that makes up the trainable gate layer 720 of the architecture. The trainable gate layer 720 may be considered to include a multitude of other trainable gates 725b-725d that each correspond to an input stream (e.g., one for each type of contextual information 713a-713c). The general behavior data 711 may also be passed to various other trainable gates 725b-725d. As described further below, each gate 725a-725d may be received data from each type of input as a method of recognizing and enforcing the inner-relationship of the data—that is, the effect of each context collected in the data on the user activity data and other context data. The general behavior data 711 may also be passed to aggregation block 735a of the aggregation layer 730 of the network architecture. The aggregation layer 730 may also include a multitude of other aggregation blocks 735b-735d that each correspond to an input stream (e.g., one for each type of contextual information 713a-713c). The general behavior data 711 may also be passed to category-aware attention (CAA) block 745a of the network layer 740 of the network architecture. The network layer 740 may also include a multitude of other CAA blocks 745b-745d that each correspond to an input stream (e.g., one for each type of contextual information 713a-713c). The same arrangement of data passing through the model architecture 700 may be used for each of the contextual information data types 713a-713c. For example, the contextual information 1 data 713a may be passed to each trainable gate 725a-725d, the contextual information 1 aggregation block 735b and CAA block 745b.

In particular embodiments, each gate of the trainable gate layer 720 takes into account all behavior and contextual information, and selects among them accordingly. The gates 725a-725d select among the data by applying learned weights to the values of the data as they will be reflected in the data eventually preserved in the hash code components. The weights may be learned through back propagation of values or other suitable neural network training techniques. The goal of the training may be to cause the gates to emphasize contextual data with a significant influence on the behavior data 711 values and on the particular contextual information data with which the trainable gate is associated. For example, if a gate is weighting values for contextual information relating to device used, the gate may emphasize the values of location (as a home television device is likely highly correlated with interaction at a home location) and deemphasize the values of age demographic information as use of a home television device may not be highly correlated with age).

Figure 8:
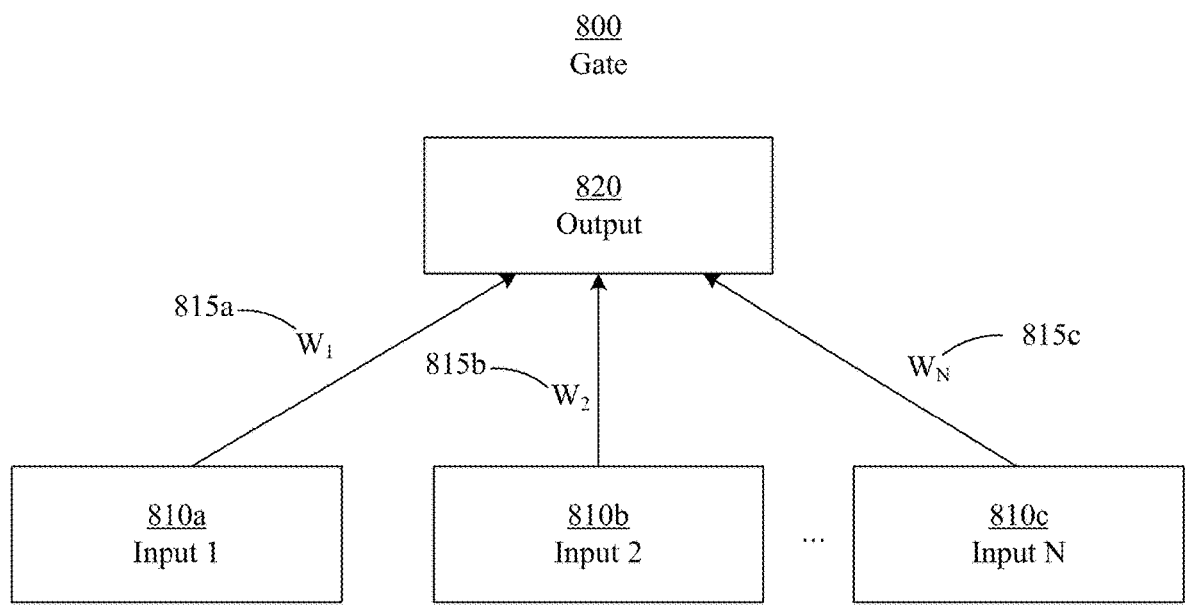
FIG. 8 illustrates an example architecture of trainable gate.

A detailed diagram of a single trainable gate 800 (e.g., gates 725a-725d) is shown in FIG. 8. The trainable gate 800 receives a plurality of data sources as input 810a-810c, applies a weight 815a-815c to each input 810a-810c, respectively, and combines the weighted values into a single output value 820. The output value 820 may be a weighted sum of the inputs 810a-810c. The weights applied by the trainable gate 800 are determined by a stochastic gradient descent. Conceptually, the value of the weights may, in particular embodiments, be learned based on the amount of variety in the data to which the weights are applied. For example, where the values for time contextual information varies greatly, while the values of location contextual information does not vary greatly, the gate 800 may give greater weight to the time value. The values for the weights may be learned for the entirety of the system and stored in a global weight matrix. In particular embodiments, the weights may be learned for independent contexts (e.g., a time context may have different weighting values than a location context). The weights are used to affect the representation of the contextual information in the embedding space.

Figure 9:
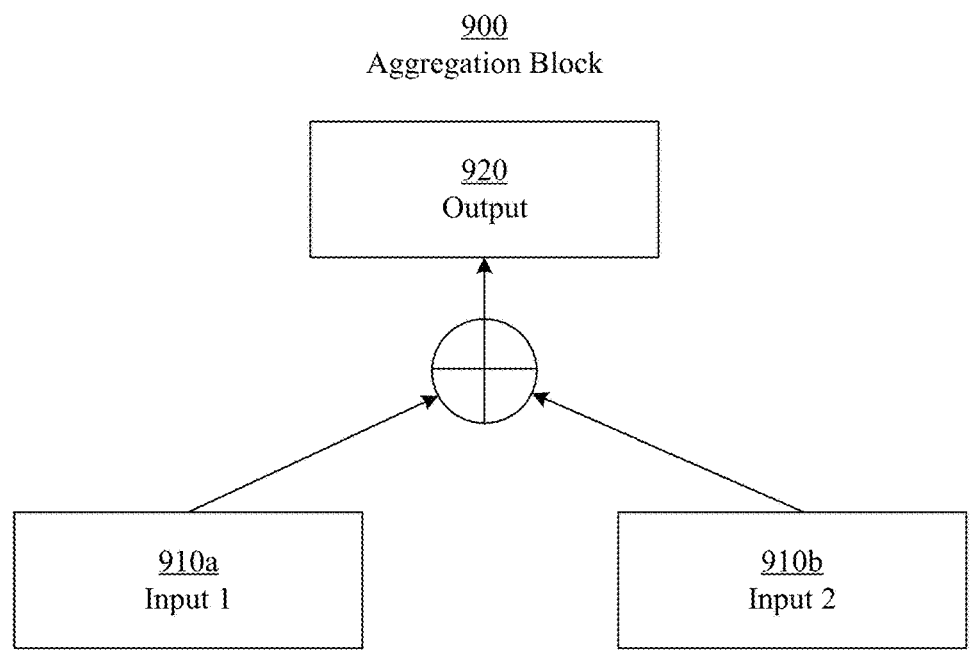
FIG. 9 illustrates an example architecture of an aggregation layer.

A detailed diagram of a single block 900 of the aggregation layer (e.g., aggregation blocks 735a-735d) is shown in FIG. 9. In particular embodiments, the aggregation block 900 receives multiple inputs 910a and 910b and adds them together to generate the output 920 of the aggregation block 920. In particular embodiments, the output 920 may be the result of a weighted sum of the inputs 910a and 910b, with learned weights. The output of the trainable gate layer 720 and the aggregation layer 730 compose the input for the network layer 740.

Figure 10:
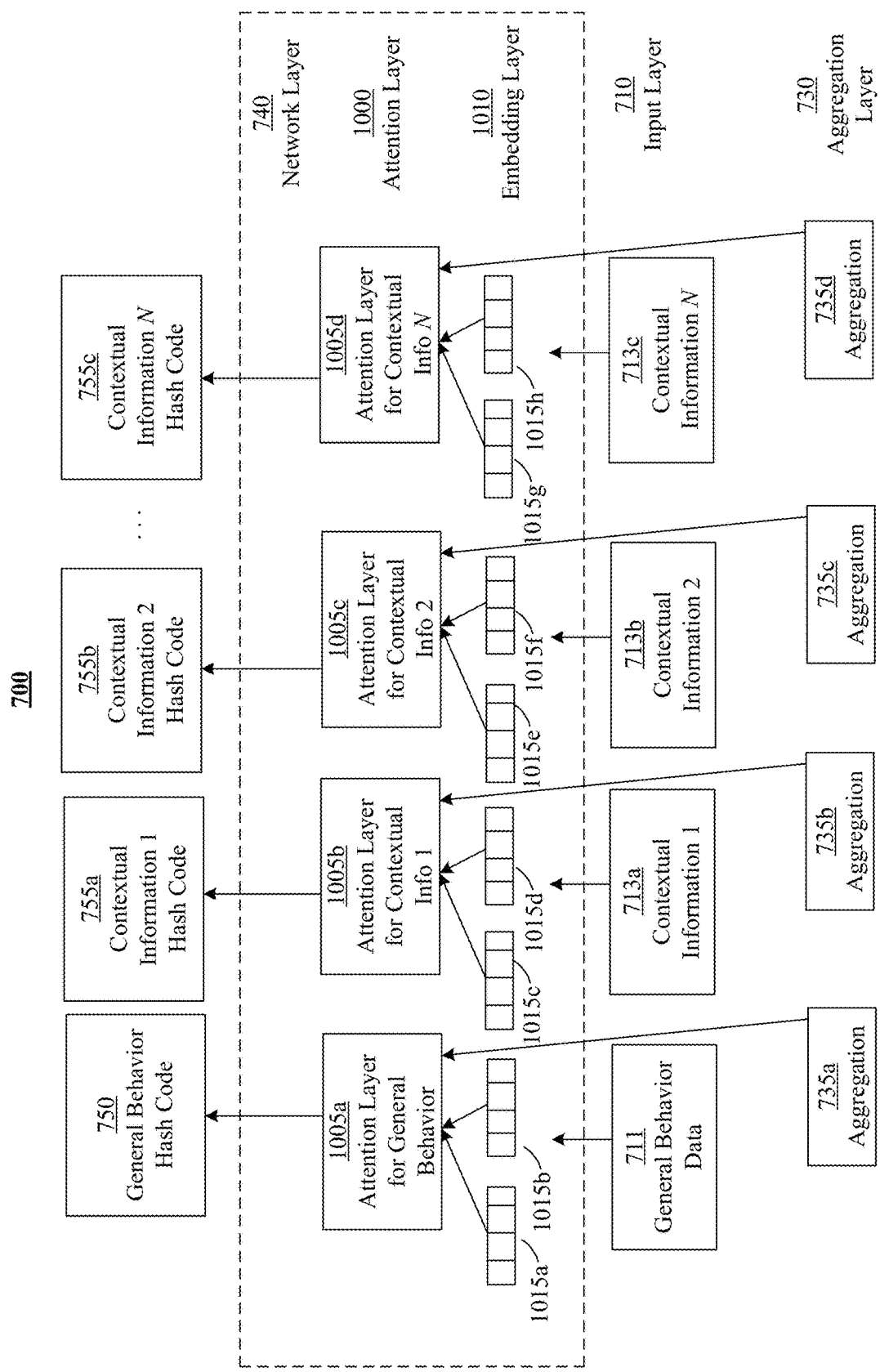
FIG. 10 illustrates an example architecture of a heterogeneous hashing model.

FIG. 10 illustrates another arrangement of the example architecture 700 of the heterogeneous hashing model also illustrates in FIG. 7. FIG. 10 expands the elements of the network layer 740 to illustrate two sub-layers of the network layer 740: the attention layer 1000 and the embedding layer 1010. The data from the input layer 710 is received as sequence data (e.g., user_id, item_id) in relation to contextual information (as shown in FIG. 7). The aggregation layer 730 is the output from the gate layer 720 shown in FIG. 7. Note that the aggregation layer, by virtue of the weighting system retains inner-relationship information of the general behavior data 711 and contextual information 713a-713c. The inner-relationship information records the measured effect of one type of context information on another type of context information. The blocks 1005a-1005d of the attention layer 1000 may receive input from blocks 1015a-1015h of an embedding layer 1010 and the aggregation layer 730. The embedding layer 1010 presents a representation of the output of the general behavior data 711 and contextual information 713a-713c in an embedding space. The blocks of the attention layer 1000 mark the importance of each data item in the embedding layer 1010 and aggregation layer 730. The output of the attention layer blocks 1005a-1005d is a general behavior hash code portion 750 and contextual information hash code portion 755a-755c. Each attention layer block is trained to generate the respective hash code portion. For clarity, the attention layer for general behavior data 1005a is trained to generate the general behavior hash code 750, etc.

Figure 11:
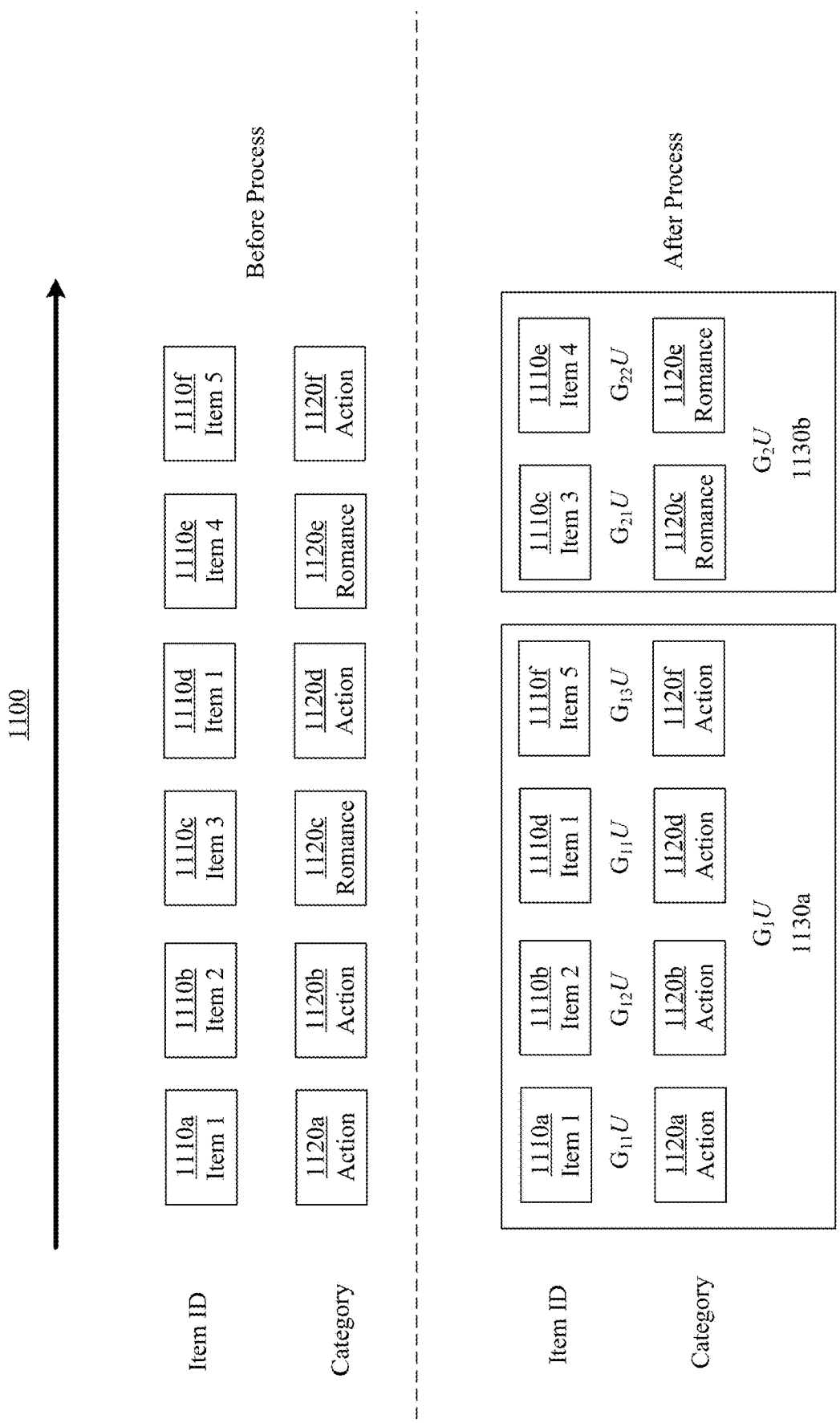
FIG. 11 illustrates an example preprocessing step and network layer.

FIG. 11 illustrates an example of a preprocessing step and the network layers 740. For simplicity, FIG. 11 illustrates just one example of a method to preprocess item history with contextual information, other methods are contemplated by this disclosure. The goal of the preprocessing step is to prepare the data for embedding and handling by the attention layer 1000. FIG. 11 shows a variety of content items 1110a-1110f with which a user has interacted as well as a category 1120a-1120f for that item. The category 1120a-1120f may be an example of a type of contextual information that is recorded with each item interaction. The items 1110a-1110f are organized along a timeline 1100 such that an item appearing to the left of another item was interacted with first. For example, the user interacted with item 1110b before they interacted with item 1110d. Additionally, FIG. 11 is divided into two halves. The top half shows the organization of the items 1110a-1110f before the preprocessing step has occurred (e.g., as they may be organized in a user behavior data database 410. The bottom half shows the organization of the items 1110a-1110f after the preprocessing step has occurred. The system first sorts the items 1110a-1110f and associated contextual information 1120a-1120f in time sequence order. Next, the items 1110a-1110f are grouped according to their contextual information. For example, the items 1110a-1110f are grouped according to their declared category 1120a-1120f. Each item associated with a particular context is represented by $G_{ij}^U$ (1130a-1130b) where G is a group, i is the index of the group, and j is the index of the item in the ith group. U represents the users.

With this formalized grouping, the operations of the attention layer 1000 may be formally stated. As discussed previously, the attention layer 1000 captures inner-relationships among all items found in the given context info class. From the embedding layer 1010 that is grouped per context (e.g., category), inner-relationships are captured in each item embedding 1015a-1015h. In particular embodiments, some user-item interactions may be inflated or deflated (e.g., the weight attached to the influence of the user-item interaction may be adjusted). The output of the attention layer 1000 is treated as a representation of a user's sequential behavior reflecting the influence of other items in the given preference context information. As stated above, the attention layer 1000 may be formalized as follows: Let $H_i$ be a matrix consisting of a sequence of embedding outputs from the grouped items in each user's context information i, where G and U denote a group of context and user respectively (Equation 1). A nonlinear activation function is applied on $H_i$ (Equation 2). $T_i$ denotes the number of sequenced items in the ith context (Equation 3). The representation $r_i$ of the sequence is formed by a weighted sum of these output vectors (Equation 4). After the attention per context is obtained using Equation 4, $r_i$ are summed together to retrieve user embeddings (Equation 5). In particular embodiments, the operation of Equation 5 may in part be replaced to other layers. Algorithm 1, provided above, illustrates pseudo-code for the attention operation.

Figure 12A:
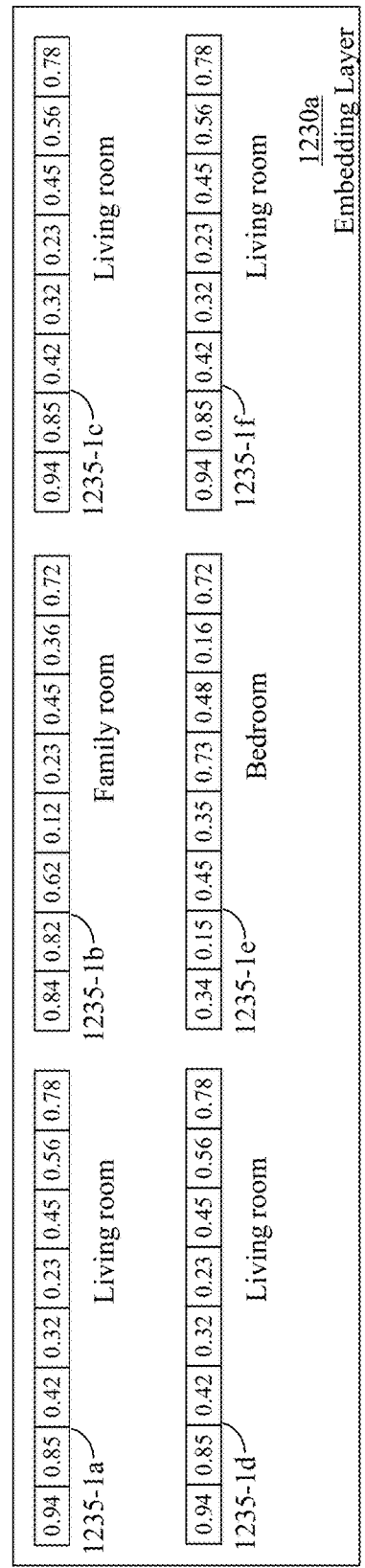
FIGS. 12a-12b illustrate example operations performed by layers of a heterogeneous hashing model.
Figure 12A:
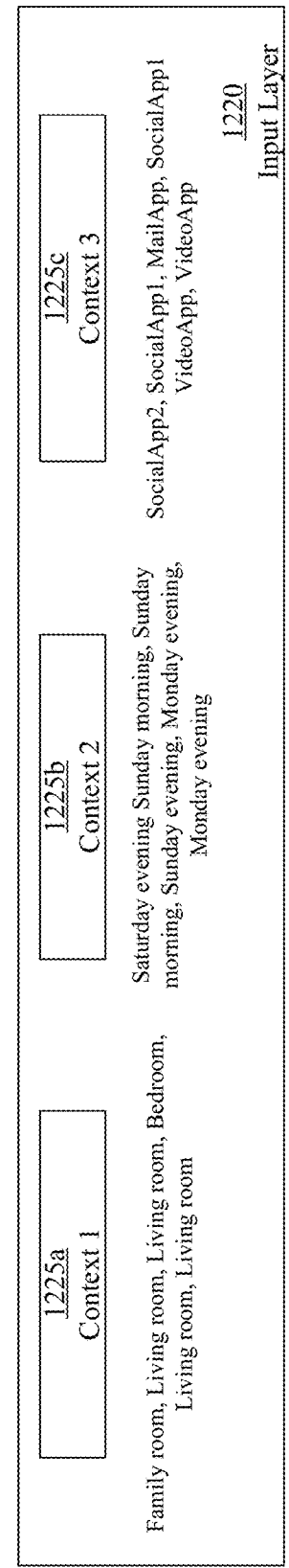

FIGS. 12a-13b illustrate a detailed example of the operations performed by each layer of the architecture 700 illustrated in FIGS. 7-10. The example involves preparing a heterogeneous hash code based on user behavior data captured for a user designated "u1". FIGS. 12a-12b illustrate input and output of the input layer 1220 and embedding layers 1230a-1230b. The table 1210 represents user behavior data received from various user devices, the user behavior data relating to activity of u1. The user behavior data may be stored in a user behavior data database 410 until the information is retrieved to be process by a heterogeneous hashing model 430. The user behavior data has been organized in chronological order, with the user behavior data appearing first in the table involving earlier interactions with particular items. The table is organized thus: the table states the identifier for the user (in this case, all interactions are by the same user u1, however, in practice, the activity of many users may be recorded); the table records an identifier for the item with which the user has interacted (e.g., i1, i2, etc.); the table then records various contexts associated with the interaction. The particular contexts available may depend on, for example, the type of the interaction, the type of item interacted with, the device recording the interaction, etc. In table 1210, the interactions recorded include Context 1 (the location of the interaction), Context 2 (the rough timing of the interaction), Context 3 (the application recording the interaction), Context 4 (the operating system of the device recording the interaction, Context 5 (a model identifier for the device recording the interaction), and Context 6 (a placeholder for additional contextual information).

Through the input layer 1220 (e.g., input layer 710), the data is grouped based on context to be processed. In particular embodiments, the behavior data (e.g., the item interacted with) or a pointer therefore may be processed with the context data items. The grouping may be performed substantially in compliance with the techniques described above with respect to FIG. 10. Not all contexts may be grouped, for example, if not all contexts are required to process heterogeneous hash codes for a particular customer application. In this example, the items in table 1210 are grouped for Context 1 1225a, Context 2 1225b, and Context 3 1225c.

Figure 12B:
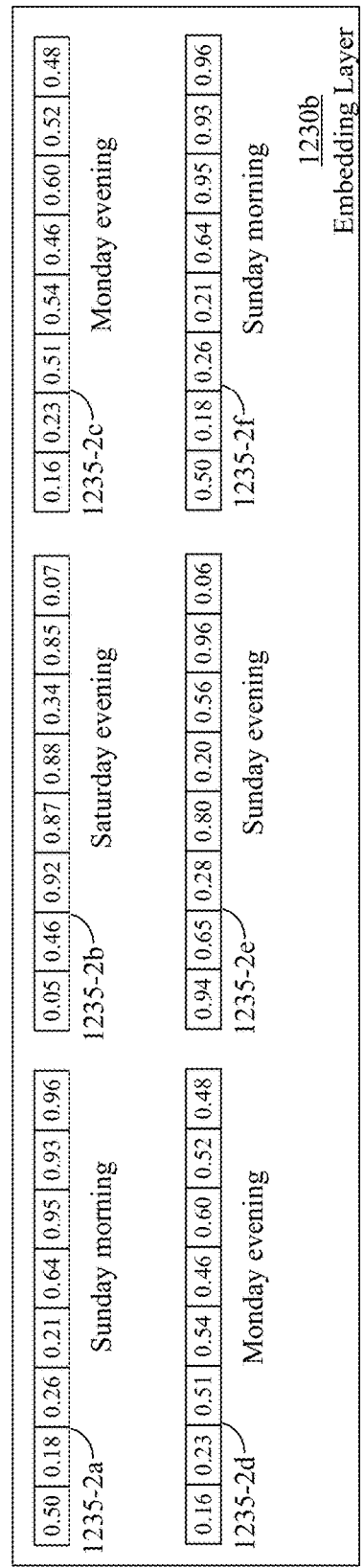
Figure 12B:
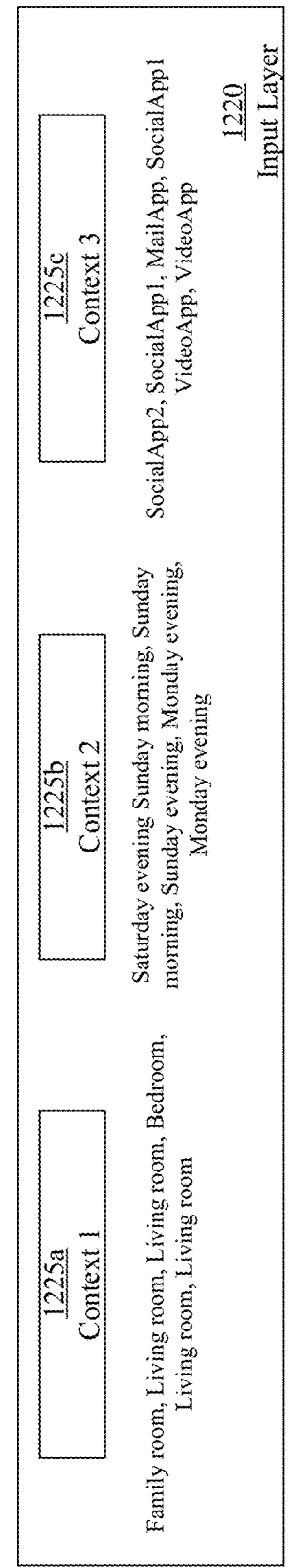

Next, through the embedding layer 1230a (e.g., embedding layer 1010), embeddings are generated for each item in each particular context group. For example, as shown in FIG. 12a, an embedding 1235-1a-1235-1f is generated for each item in Context 1 1225a. As shown in FIG. 12b, an embedding 1235-2a-1235-2f is generated for each item in Context 2 1225c. The embeddings may, in particular embodiments, comprise real-valued vectors of a given dimensionality. The dimensionality may be specified by the heterogeneous hashing model or by the application system that will use the hash codes. Note that in this example, embeddings are only generated for the values of the context items themselves, so all item interactions that occurred in the same location will have a similar embedding generated. Thus, there are four identical embeddings 1235-1a, 1235-1c, 1235-1d, and 1235-1f generated for the four interactions associated with a "Living room" context value, and two unique embeddings generated for the other two interactions associated with a "Family room" context value 1235-1b and a "Bedroom" context value 1235-1e. The embeddings are generated such that similar context values will have similar context embeddings (e.g., the similar context values with embeddings near each other in the embedding space). So, in the Context 1 1225a example, the embeddings for "Living room" items (1235-1a, 1235-1c, 1235-1d, and 1235-1f) will be located closer to the embeddings for "Family room" items (1235-1b) than "Bedroom" items (1235-1e) because heuristically speaking, a living room has more similarities with a family room than a bedroom. Turning to the example embeddings shown in FIG. 12b, there is a unique embedding 1235-2b generated for the "Saturday evening" context item, a common embedding generated for each "Sunday morning" context item 1235-2a and 1235-2f, a unique embedding 1235-2e generated for the "Sunday evening" context item, and a common embedding generated for each "Monday evening" context item 1235-2c and 1235-2d. The embeddings are generated such that similar context values will have similar context embeddings. So, in the Context 2 1225b example, the embeddings for the "Saturday evening" items (1235-2b) will be located closer to the embedding for the "Sunday evening" items (1235-2e) than "Monday evening" items (1235-2c and 1235-2d) because heuristically speaking, a Saturday evening has more similarities with Sunday evening than Monday evening. The embeddings may be generated from a learnable training process and provided from, for example, a deep learning framework.

Figure 13A:
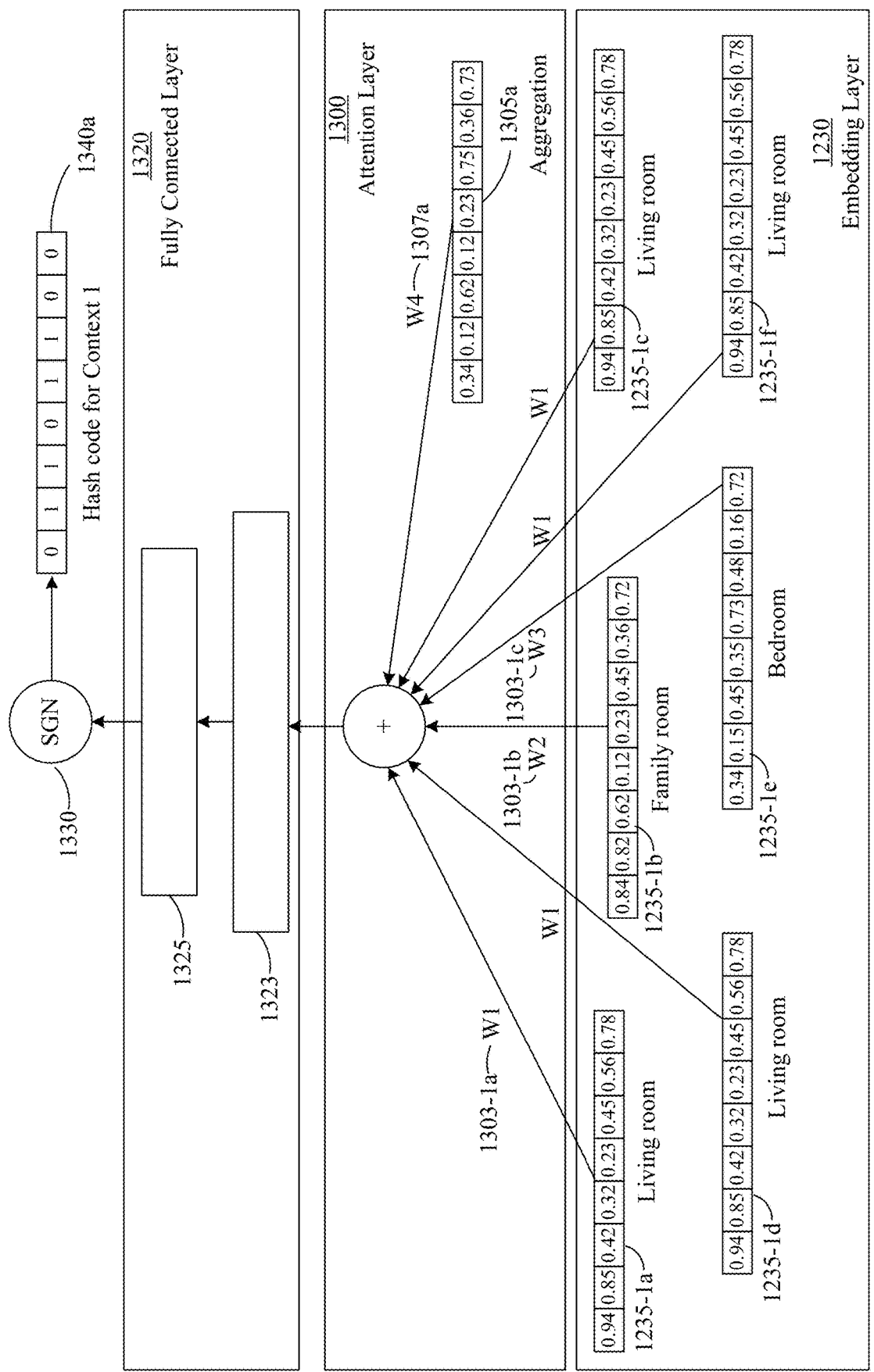
FIGS. 13a-13b illustrate example operations performed by layers of a heterogeneous hashing model.
Figure 13B:
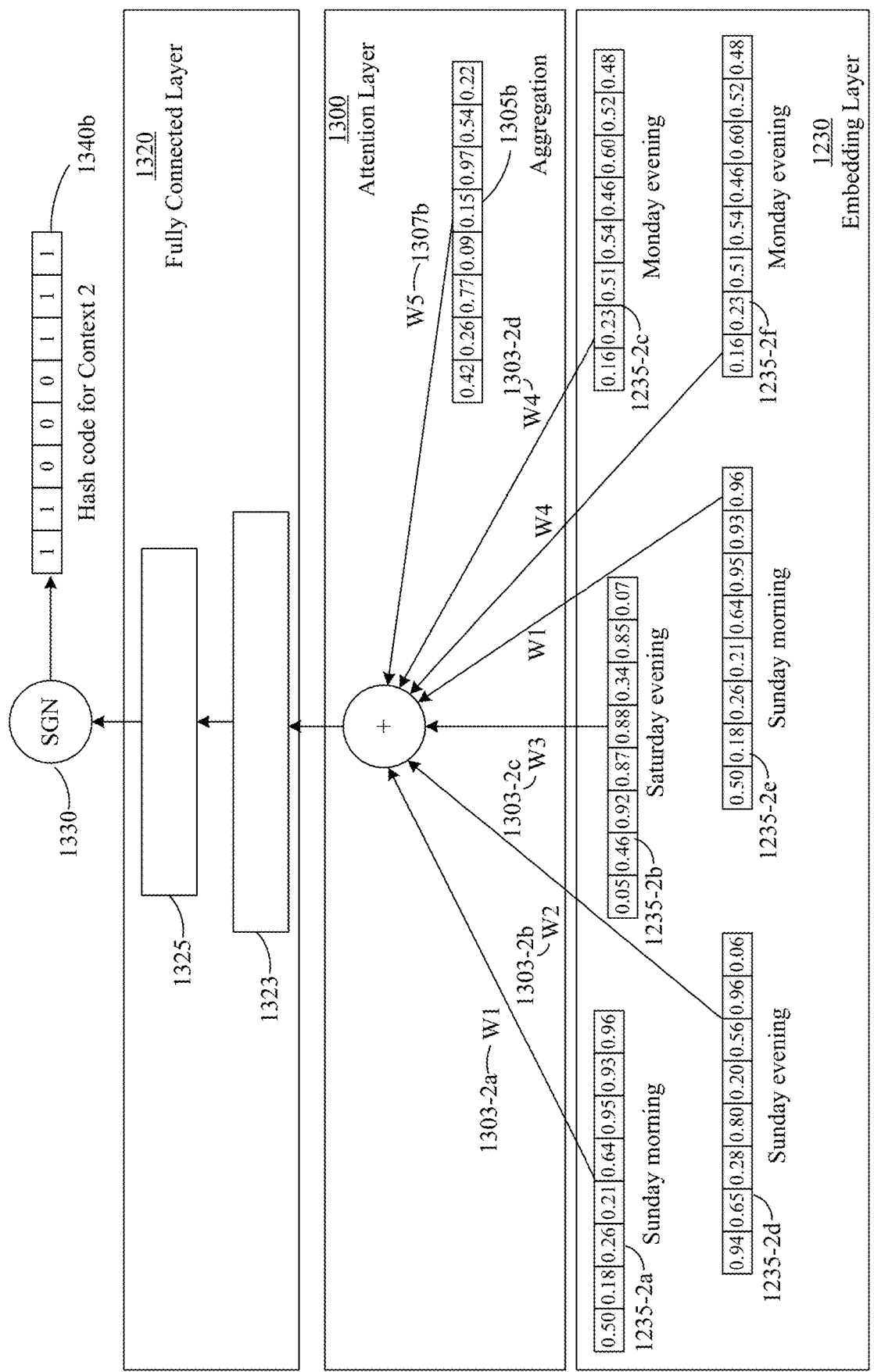

FIGS. 13a-13b illustrate input and output of the embedding layer 1230, aggregation layer (e.g., aggregation layer 730), attention layer 1300, fully connected layer 1320, and sign function 1330. FIGS. 13a-13b continue the example shown in FIGS. 12a-12b. For each context, the embeddings generated for each time in the table is passed to the attention layer along with an embedding from the aggregation layer (e.g., 730). The value from the aggregation layer 730 includes an aggregation of the value from a corresponding trainable gate and the value contextual information embedding, combined using a weighted sum. For example, for Context 1, the embeddings 1235-1a-1235-1f are passed to the attention layer 1300. The values of the embeddings are also associated, in the attention layer 1300 with weights 1303-1a-1303-1c corresponding to the particular determinative impact of the value. For example, the embeddings 1235-1a, 1235-1c, 1235-1d, and 1235-1f generated for the Living room context item may, in some embodiments, all be associated with the weight W1 1303-1a. The embedding 1235-1b generated for the Family room context item may be associated with the weight W2 1303-1b. The embedding 1235-1c generated for the Bedroom context item may be associated with the weight W3 1303-1c. An aggregation embedding 1305a may also be passed to the attention layer 1300 along with a weight W4 1307a. In particular embodiments the weights 1303-1a-1303-1c and 1307a may be generated by the attention layer 1300. The weights may be recorded as weight matrices. The weights may be learned weights generated from a machine learning model, such as a gradient descent process. Once the weights are stabilized, the output of the attention layer 1300 is passed to a fully connected layer 1320, which may be broken into multiple blocks or stages 1323 and 1325. The output of the fully connected layer 1320 may be passed to the sign function 1330. The sign function 1330 may evaluate the components of the output of the fully connected layer 1320 and determine, for example, whether each component does or does not satisfy some threshold value and determine a value in the hash code for the context 1340a. For values that satisfy the threshold, the sign function 1330 may specify that the value in hash code 1340a is 1, for values that fail to satisfy the threshold, the sign function 1330 may specify that the value in the hash code 1340*a* is 0. The result is the hash code for context 1 1340*a*.

For the example of for Context 2, the embeddings 1235-2*a*-1235-2*f* are passed to the attention layer 1300. The values of the embeddings are also associated, in the attention layer 1300 with weights 1303-2*a*-1303-2*d* corresponding to the particular determinative impact of the value. For example, the embeddings 1235-2*a* and 1235-2*e* generated for the Sunday morning context item may, in some embodiments, all be associated with the weight W1 1303-2*a*. The embedding 1235-2*b* generated for the Saturday evening context item may be associated with the weight W3 1303-2*c*. The embeddings 1235-2*c* and 1235-2*f* generated for the Monday evening items may be associated with the weight W4 1303-2*d*. The embedding 1235-2*d* generated for the Sunday evening context item may be associated with the weight W2 1303-2*b*. An aggregation embedding 1305*b* may also be passed to the attention layer 1300 along with a weight W5 1307*b*. The attention layer may generate an output according to the architecture and formal description provided above (e.g., Equations (4) and (5) and FIG. 10). The output of the attention layer 1300 is passed to a fully connected layer 1320, which may be broken into multiple blocks or stages 1323 and 1325. The output of the fully connected layer 1320 may be passed to the sign function 1330. The sign function 1330 may evaluate the components of the output of the fully connected layer 1320 and determine, for example, whether each component does or does not satisfy some threshold value and determine a value in the hash code for the context 1340*b*. The output of the sign function 1330 is the hash code for context 1 1340*a*. In particular embodiments, the fully connected layer 1320 and sign function 1330 may be substantially similar among the various context or may vary based on the type of context and the effect of that context on the similarity predicting capability of the hash code.

Figure 14:
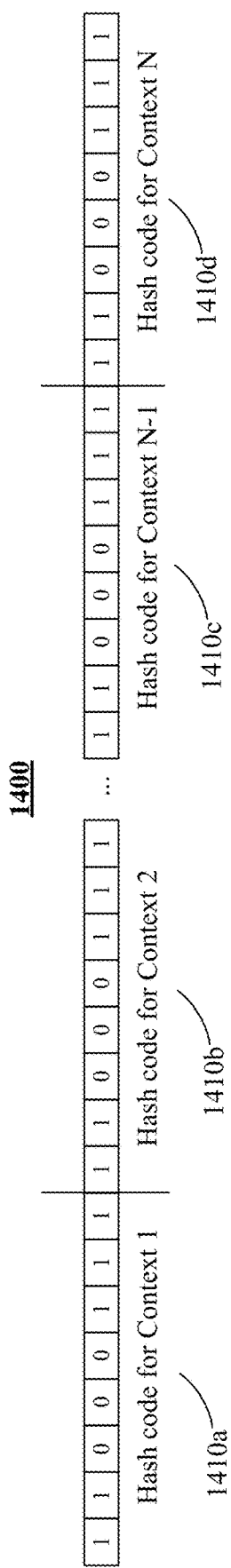
FIG. 14 illustrates a heterogeneous hash code.

A hash code 1340*a*-1340*b* is generated for each context, or each substantial context, associated with each user in the data set. The result, as illustrated in FIG. 14 is a sequence of hash code portions 1410*a*-1410*d*. The number of hash code portions 1410*a*-1410*d* may naturally vary based on the number of contexts being evaluated. Each hash code portion 1410*a*-1410*d* forms a portion of the heterogeneous hash code for the user. After all hash codes have been generated, they are combined (e.g., through concatenation) to generate the full heterogeneous hash code 1400. Although the illustrated portions of the heterogeneous hash code 1400 all have the same length, it is envisioned that the size of the hash codes for each context may be variable. A heterogeneous hash code 1400 may be generated in substantially the same manner for each user whose activity is stored in the user activity database.

Figure 17:
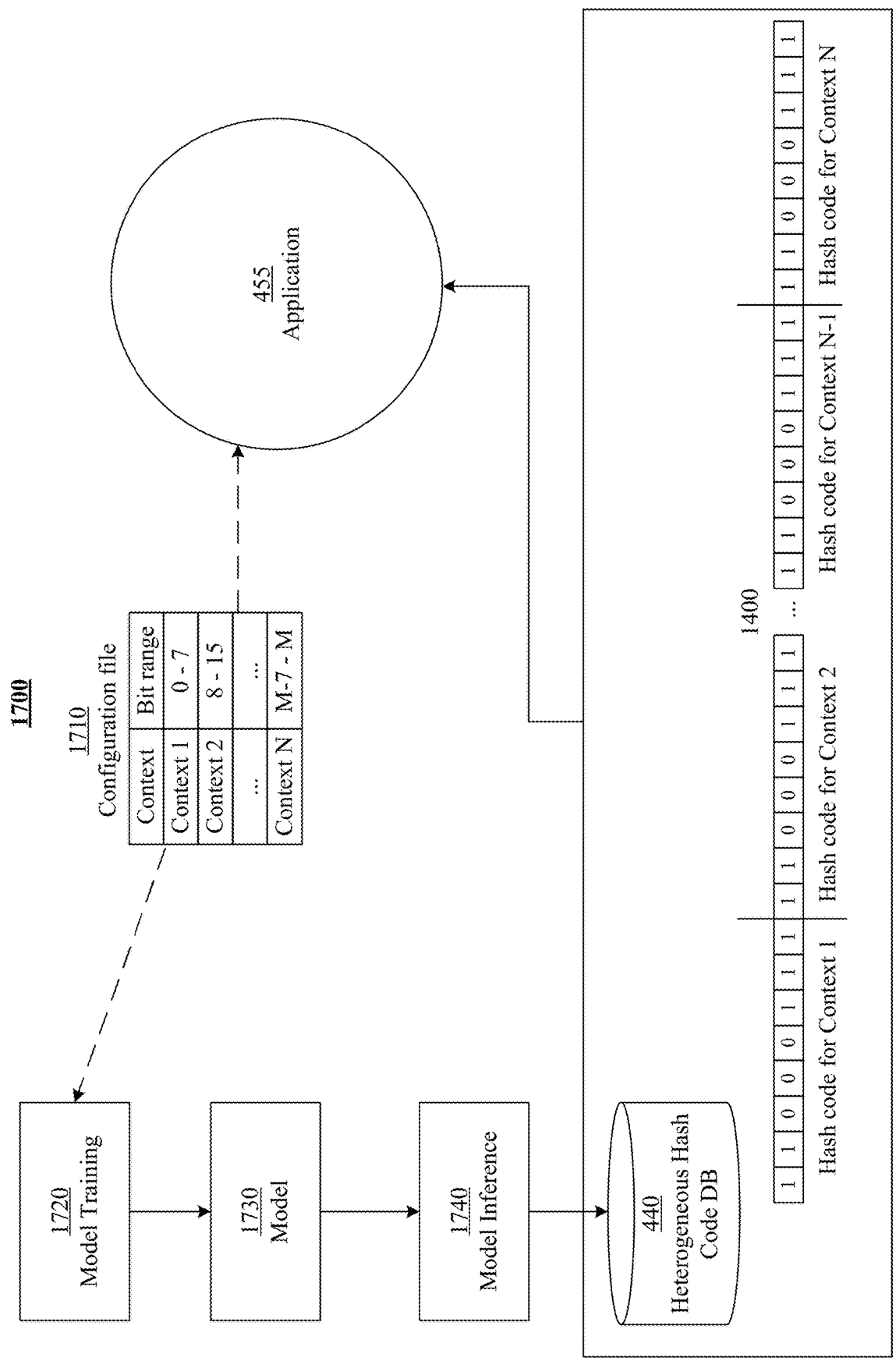
FIG. 17 illustrates an architectural representation of a hashing system an application.

Variable hash code sizes may be facilitated through the use of a configuration file that specifies the length of each context portion of heterogeneous hash code. FIG. 17 illustrates an architectural representation 1700 of the hashing system and application. The system may incorporate the use of a configuration file 1710. As shown, the configuration file includes, at a minimum an identifier for the context (e.g., Context 1, Context 2, . . . ) and a bit range of the heterogeneous hash code 1400 associated with each context. The configuration file may also specify a starting bit position and a length of each hash code (or hash code portion). The configuration file may be specified by various components of the system, or be specified by a user of the user (including an application customer or administrator). The configuration file 1710 may be passed to or accessed by a model training module of the system 1720. In this context, the model training module 1720 may encompass any portions of the architecture involved in the training of the model for generating the heterogeneous hash code. The model training module 1720 may use the configuration file 1710 to cause the model 1730 to only generate heterogeneous hash codes (e.g., hash code portions) that satisfy the configuration file 1710. For example, generated hash codes that do not satisfy the requirements of the configuration file 1710 may be outright rejected by the training module 1720. The model training module 1720 may produce the heterogeneous hashing model 1730. Though the model 1730 may not necessarily have direct access to the configuration file 1710, it may still comply with the configuration file 1710 by nature of its training. Additionally, the configuration may implicitly be used by the model inference module 1740 of the architecture. The model inference module 1740 represents the portions of the architecture that are responsible for generating the heterogeneous hash codes 1400 that are eventually stored in the heterogeneous hash code database 440. The configuration file 1710 may also be used (or specified) by the application 455 relying on the heterogeneous hash codes. For example, the application 455 may use the configuration file 1710 to specify which portions of the heterogeneous hash codes 1400 are retrieved from the heterogeneous hash code database 440 when the application 455 runs (e.g., when a lookalike expansion application examines hash code similarities).

Figure 18:
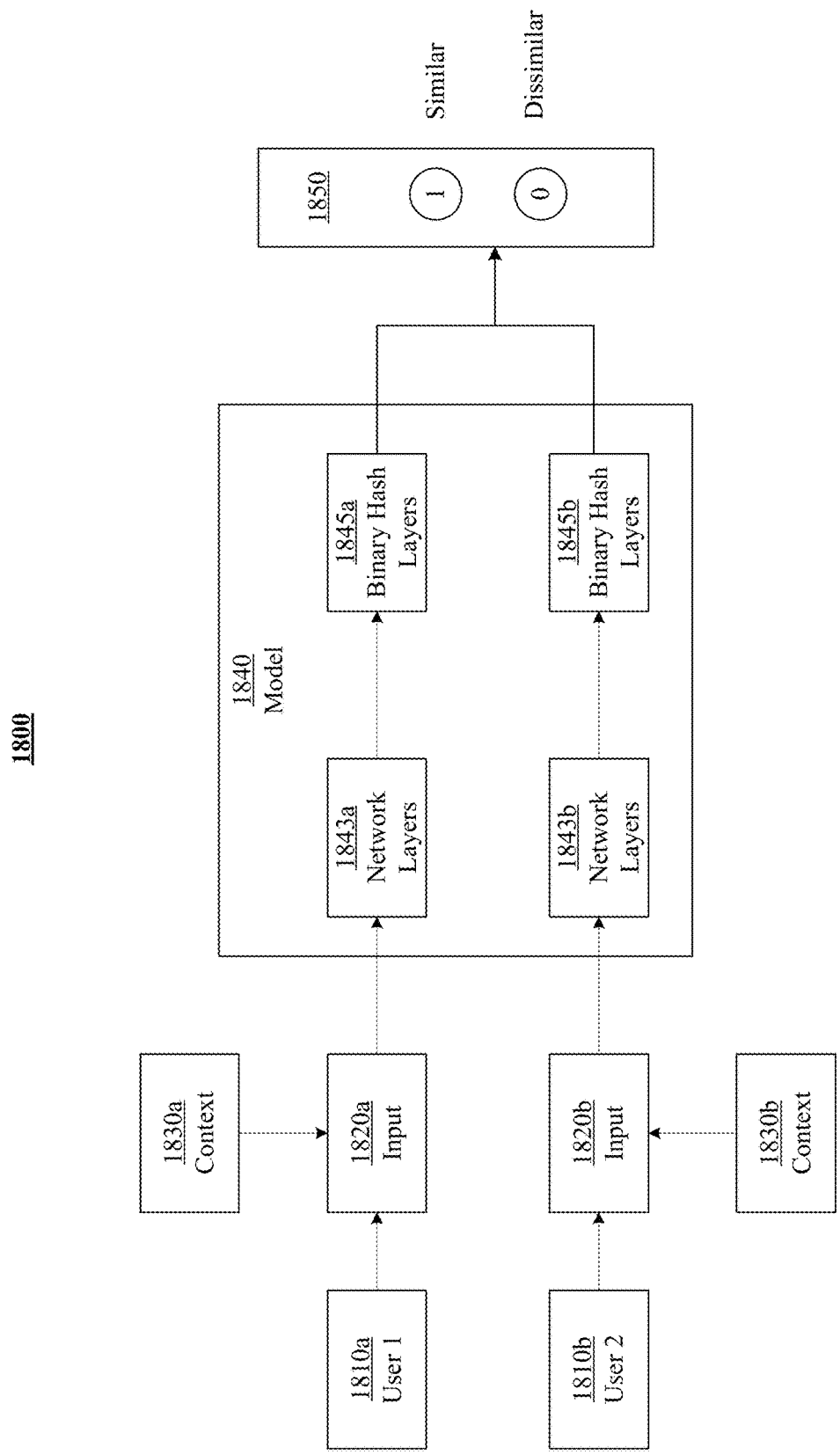
FIG. 18 illustrates an example framework for training a heterogeneous hashing model.

FIG. 18 illustrates an example framework 1800 for training the heterogeneous hashing model 1840. The framework 1800 is setup to train the model 1840 is a parallel or Siamese fashion, where the training input includes activity data and contextual information regarding two users and the training is performed as a function of cross entropy and loss reduction against a ground truth based on a determination that the users are similar or dissimilar. Information about two users 1810*a* and 1810*b* is provided to a input module 1820*a* and 1820*b*, respectively. Contextual information associated with each user 1830*a* and 1830*b* is also provided to the respective input module 1820*a* and 1820*b*. The input modules 1820*a* and 1820*b* may, in particular embodiment, handle preprocessing of the data to generally prepare it for the heterogeneous hashing model 1840 to receive. The preprocessing may be similar to the methods described previously. In particular embodiments, the data may be provided to the model 1840 in two pipelines, so that the same model 1840 processes information for the two users 1810*a* and 1810*b* effectively simultaneously. First, the input is received by corresponding network layers 1843*a* and 1843*b* of the model 1840. The network layers may be substantially similar to the above described network layers of the architecture. The output of the network layers 1843*a* and 1843*b* may be passed to the corresponding binary hashing layers 1845*a* and 1845*b* of the heterogeneous hashing model 1840. The binary hashing layers 1845*a* and 1845*b* may generate hash codes comprising the binary comparison data. The output of binary hashing layers 1845*a* and 1845*b* may be provided to a comparator 1850 that evaluates, based on the binary hashes generated by the model 1840 whether the users would be determined to be similar or dissimilar. The result of the comparator 1850 may be compared to a ground truth value and the results of this final comparison may be used to revise the model 1840. The nature of the revisions may be based on the underlying machine learning process being used to construct the 1843*a* and 1843*b* and binary hashing layers 1845*a* and 1845*b*. Different deep neural networks can be applied to the network layers 1843a and 1845b, such as the described CAA network and TAACNN.

Figure 4B:
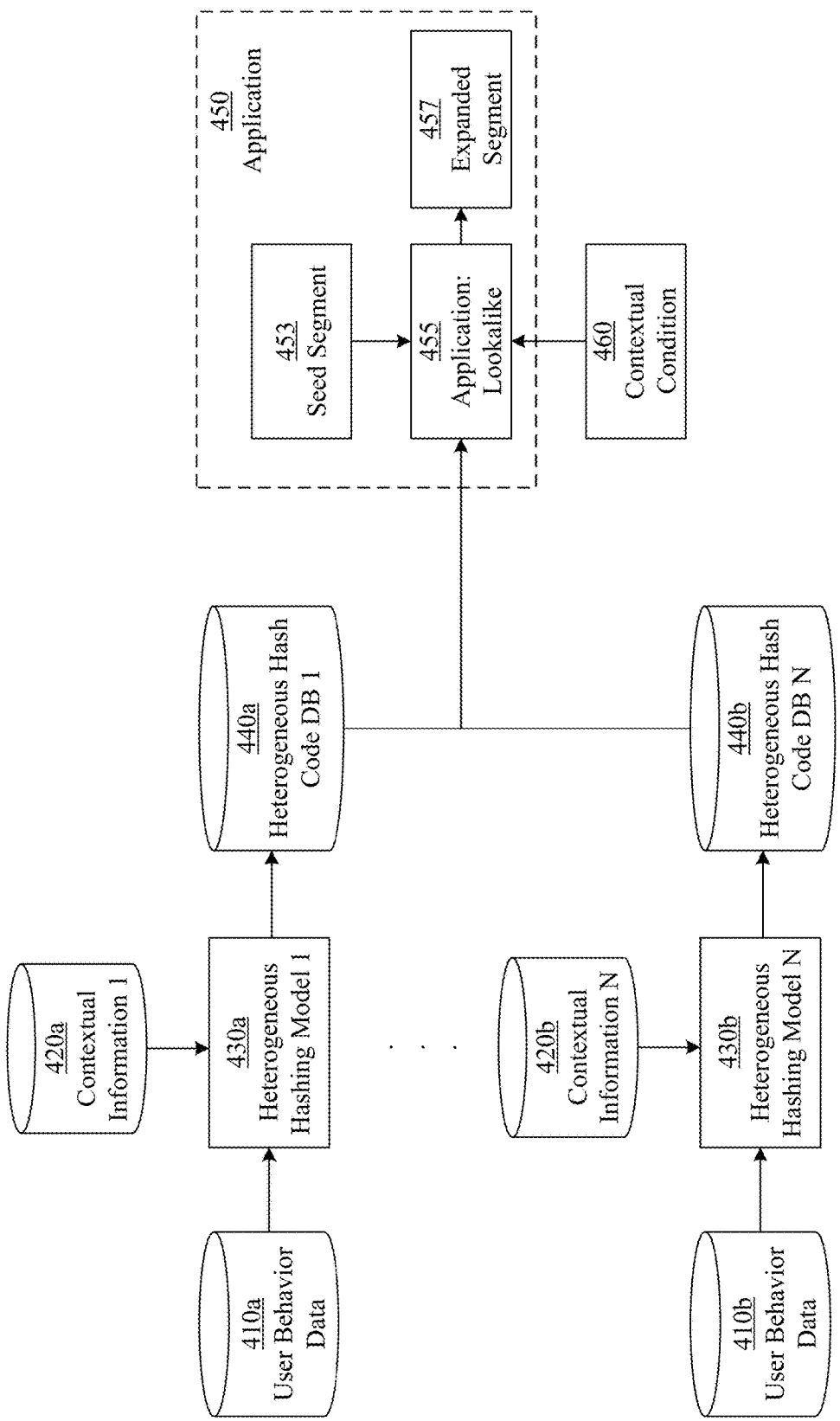

FIG. 4b illustrates another example architecture of a system 400b for generating and using heterogeneous hash codes according to particular embodiments. The system 400b includes a plurality of heterogeneous hash code generation and storage systems that operate in parallel, where the hashing codes are separated based on the type of contextual information before the contextual hash codes are generated. Thus, the output hash codes are contextual hash codes that may be combined in a number of manners to construct a heterogeneous hash code. One advantage of this embodiment may be that, for application customers who wish to only target specific contextual information types, they need to manage or retrieve the unnecessary contextual information. Thus, the system 400b may, in particular embodiments, operate more efficiently for certain customers.

The system 400b includes a plurality of user behavior data databases 410a-410b. The user behavior databases 410a-410b store information regarding users' interactions with various applications, content items, media, websites, and other interactable elements tracked by user devices. The user behavior databases 410a-410b further store metadata about those interactions. The system 400b includes multiple contextual information databases 420a-420b. The contextual information databases 420a-420b store any additional data acquire from various devices used by users to interact with media or other items that affect a particular user item interaction. Such contextual information may include, by way of example and not limitations, a user's demographic distribution (age, gender, income, etc.), location information, time information, device information, and various other suitable contextual information. The system may incorporate the use of module to separate out the user behavior data and contextual information based on context type as the information is received from the various devices. The system 400b further includes multiple heterogeneous hashing models 430a-430b. The heterogenous hashing models 430a-430b may be substantially similar to the heterogeneous hashing model 430 described herein. The heterogeneous hashing models 430a-430b may be specifically trained to generate the heterogeneous hashing codes based on the specific type of contextual information which the hashing pipeline has been assigned. The system 400c includes multiple heterogeneous hash code databases 440a-440b to stores generated hash codes that capture different levels and aspects of users' preferences while preserving the similarity among users. The application system 450 and related components may be substantially similar to that described above with respect to FIG. 4a, with the addition that it is configured to retrieve information from multiple heterogeneous hash codes databases 440a-440b.

Figure 15:
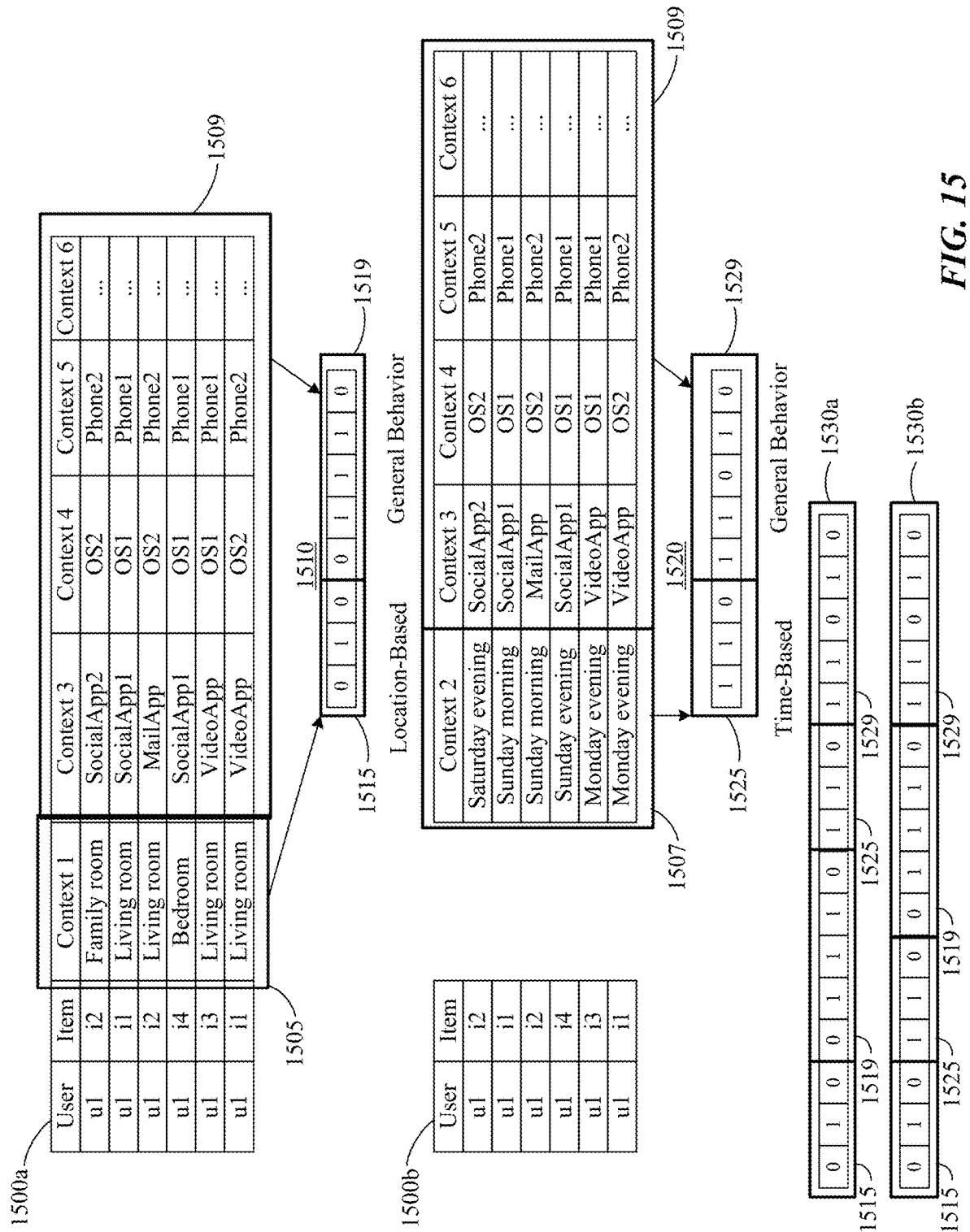
FIG. 15 illustrates example hashing codes.

FIG. 15 illustrates hashing codes that may be generated by the system 400b incorporating a plurality of contextual information-specific hashing pipelines. The illustrated example involves preparing a heterogeneous hash code based on user behavior data captured for a user designated "u1". The tables 1500a-1500b represents user behavior data received from various user devices, the user behavior data relating to activity of u1. The user behavior data may be stored in multiple user behavior data databases 410a-410b until the information is retrieved to be processed by a heterogeneous hashing model 430a-430b. The user behavior data has been organized in chronological order, with the user behavior data appearing first in a table 1500a-1500b involving earlier interactions with particular items. The tables are organized thus: the table states the identifier for the user (in this case, all interactions are by the same user u1, however, in practice, the activity of many users may be recorded); the table records an identifier for the item with which the user has interacted (e.g., i1, i2, etc.); the table then records various contexts associated with the interaction. The particular contexts available may depend on, for example, the type of the interaction, the type of item interacted with, the device recording the interaction, etc. In table 1500a, the interactions recorded include Context 1 (the location of the interaction), Context 3 (the application recording the interaction), Context 4 (the operating system of the device recording the interaction, Context 5 (a model identifier for the device recording the interaction), and Context 6 (a placeholder for additional contextual information). In table 1500b, the interactions recorded include Context 2 (the rough timing of the interaction), Context 3 (the application recording the interaction), Context 4 (the operating system of the device recording the interaction, Context 5 (a model identifier for the device recording the interaction), and Context 6 (a placeholder for additional contextual information). For both tables 1500a and 1500b, Contexts 3-6 may be referred to as General Behavior data because the information therein is recorded and stored with both contexts and is thus available to influence the hash codes generated by heterogeneous hashing models 430a-430b, respectively.

Hash codes may be generated substantially in accordance with the techniques described herein, with the caveat that the resulting heterogeneous hash codes are limited to being influenced by only one particular context at a time. The generated hash codes 1510 and 1520 may comprise two components: a first component where the hash code encodes the value of the context type and a second component where the hash code is based on the general behavior data. For example, the hash code 1510 is generated based on Context 1 1505, the location context. The hash code 1510 comprises a first component 1515 that is based on the location 1505 and a second component 1519 that is based on the general behavior data 1509. The hash code 1520 is generated based on Context 2 1507, the time context. The hash code 1520 comprises a first component 1525 that is based on the time 1507 and a second component 1529 that is based on the general behavior data 1509. Note that, as the general behavior data hash code portions are influenced by the context information shown in tables 1500a and 1500b, they will often different in their raw value even though the same general behavior data is used. The hash codes 1510 and 1520 may be combined in various ways to form the heterogeneous hash codes for the user. A first heterogeneous hash code 1530a is organized where each complete hash code portion is concatenated together. A second hash code 1530b is organized where the context-based portions are concatenated first and the general behavior-based portions are concatenated second. The arrangement of the heterogeneous hash codes may be specified in a configuration file.

Figure 4C:
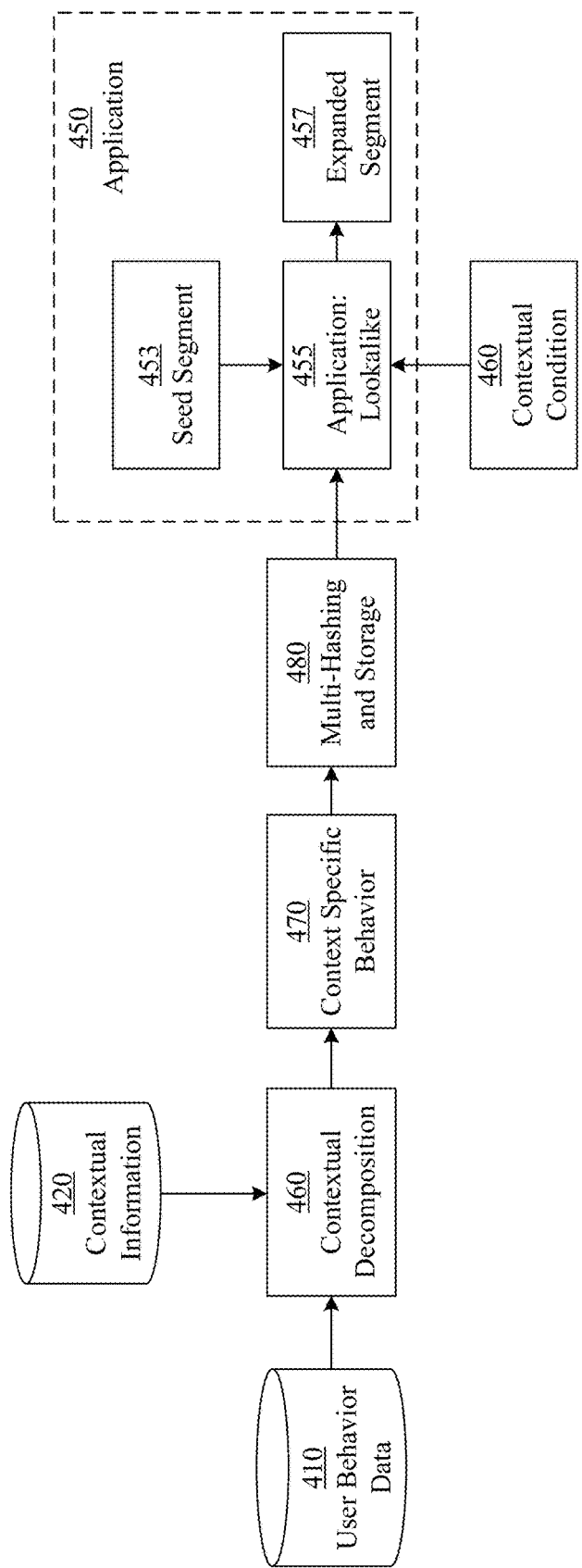

FIG. 4c illustrates another example architecture of a system 400c for generating and using heterogenous hash codes according to particular embodiments. The system 400c includes a user behavior data database 410. The user behavior database 410 stores information regarding users' interactions with various applications, content items, media, websites, and other interactable elements tracked by user devices. The user behavior database 410 further stores metadata about those interactions. The system 400c includes a contextual information database 420. The contextual information database 420 stored any additional data acquired from various devices used by users to interact with media or other items that affect a particular user item interaction. Such contextual information may include, by way of example and not limitations, a user's demographic distribution (age, gender, income, etc.), location information, time information, device information, and various other suitable contextual information.

The system 400c further includes a contextual decomposition module 460. The contextual decomposition module 460 may be configured to decompose user behavior data into context specific behavior. For example, rather than viewing a record of an interaction as dependent on every piece of contextual information, the contextual decomposition may group particular interactions as being related because of their contextual information. In particular embodiments, the grouping may be performed through aggregation or machine learning via clustering. The contextual decomposition module 460 decomposes the user behavior data (e.g., retrieved from the user behavior database 410) and the contextual information 420 into context specific behavior 470. The context specific behavior 470 may be organized into their contextual segments based on their associated context labels. From the context specific behavior 470, one or more multi-hashing and storage methods may be used to transform the context specification behavior segments into efficient hash codes.

Also illustrated as part of the architecture of the system 400c is an example application system 450. The application system 450 may be substantially similar to the application system 450 described above with respect to FIG. 4a, with the substitution that the application system 450 is configured to use the context-based hash codes.

Figure 16:
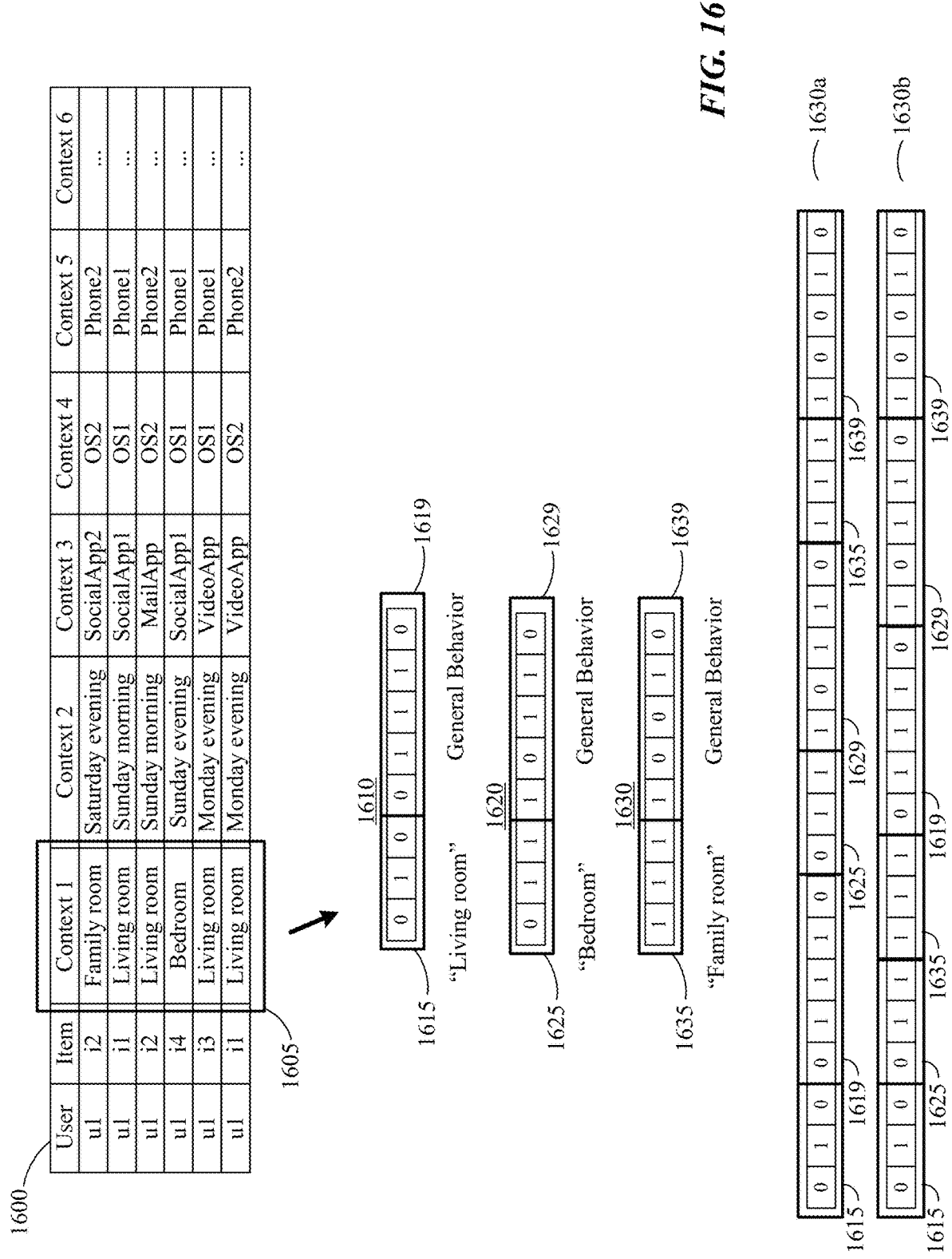
FIG. 16 illustrates example hashing codes.

FIG. 16 illustrates hashing codes that may be generated by the system 400c incorporating a contextual decomposition model prior to hashing. The illustrated example involves preparing a heterogeneous hash code based on user behavior data captured for a user designated "u1". The table 1600 represents user behavior data received from various user devices, the user behavior data relating to activity of u1. The user behavior data has been organized in chronological order, with the user behavior data appearing first in the table 1600 involving earlier interactions with particular items. The tables are organized thus: the table states the identifier for the user (in this case, all interactions are by the same user u1, however, in practice, the activity of many users may be recorded); the table records an identifier for the item with which the user has interacted (e.g., i1, i2, etc.); the table then records various contexts associated with the interaction. The particular contexts available may depend on, for example, the type of the interaction, the type of item interacted with, the device recording the interaction, etc. In table 1600, the interactions recorded include Context 1 (the location of the interaction), Context 2 (the rough timing of the interaction), Context 3 (the application recording the interaction), Context 4 (the operating system of the device recording the interaction, Context 5 (a model identifier for the device recording the interaction), and Context 6 (a placeholder for additional contextual information). Contexts 3-6 may be referred to as General Behavior data because the information therein is recorded and stored with all contexts. The system 400c has been configured not to perform contextual decomposition with respect to these contexts.

Hash codes may be generated substantially in accordance with the techniques described herein, with the caveat that the resulting heterogeneous hash codes are generated to incorporate information regarding the contextual decomposition. To perform the contextual decomposition, the contextual decomposition module 460 (or other responsible module in some embodiments) selects the particular context type along which the decomposition will occur. In this example, the decomposition will be based around Context 1 (the location of the interaction). The contextual decomposition module 460 identifies the various values in the user behavior database 410 associated with Context 1 1605 (e.g., "Family room", "Living room", and "Bedroom"). The hashing-specific behavior module 470 (or other responsible module in some embodiments) groups the interaction records based on the values associated with Context 1. For example, all records associated with the "Family room" value are grouped, all records associated with the "Living room" value are grouped, and all records associated with the "Bedroom" value are grouped. Then, the multi-hashing and storage module 480 generated hash code portions using these grouped values (e.g., these grouped values may be used as input to a heterogeneous hashing model).

The generated hash codes 1610, 1620, and 1630 may comprise two components: a first component where the hash code encodes the context type value 1605 and a second component where the hash code is based on the general behavior data (e.g., the remaining context values). For example, the hash code 1610 is generated based on the "Living room" value. The hash code 1610 comprises a first component 1615 that encodes the "Living room" value and a second component 1619 that is based on the general behavior data. The hash code 1620 is generated based on the "Bedroom" value. The hash code 1620 comprises a first component 1625 that encodes the "Bedroom" value and a second component 1629 that is based on the general behavior data. The hash code 1630 is generated based on the "Family room" value. The hash code 1630 comprises a first component 1635 that encodes the "Family room" value and a second component 1639 that is based on the general behavior data. The hash codes 1610, 1620, and 1630 may be combined in various ways to form the heterogeneous hash codes for that particular context for the user. A first heterogeneous hash code 1630a is organized where each complete hash code portion is concatenated together (e.g., the entirety of hash codes 1610, 1620, and 1630 are concatenated). A second hash code 1630b is organized where the context-based portions are concatenated first and the general behavior-based portions are concatenated second (e.g., portions 1615, 1625, and 1635) are concatenated first and portions 1619, 1629, and 1639 are concatenated second). The arrangement of the heterogeneous hash codes may be specified in a configuration file. The generated hash codes may then be stored in association with the user. The system may generate multiple hash codes based on different context values (e.g., for location, for time, for demographics). The system may combine multiple hash codes (e.g., concatenate) into a single hash code for the user.

Figure 6:
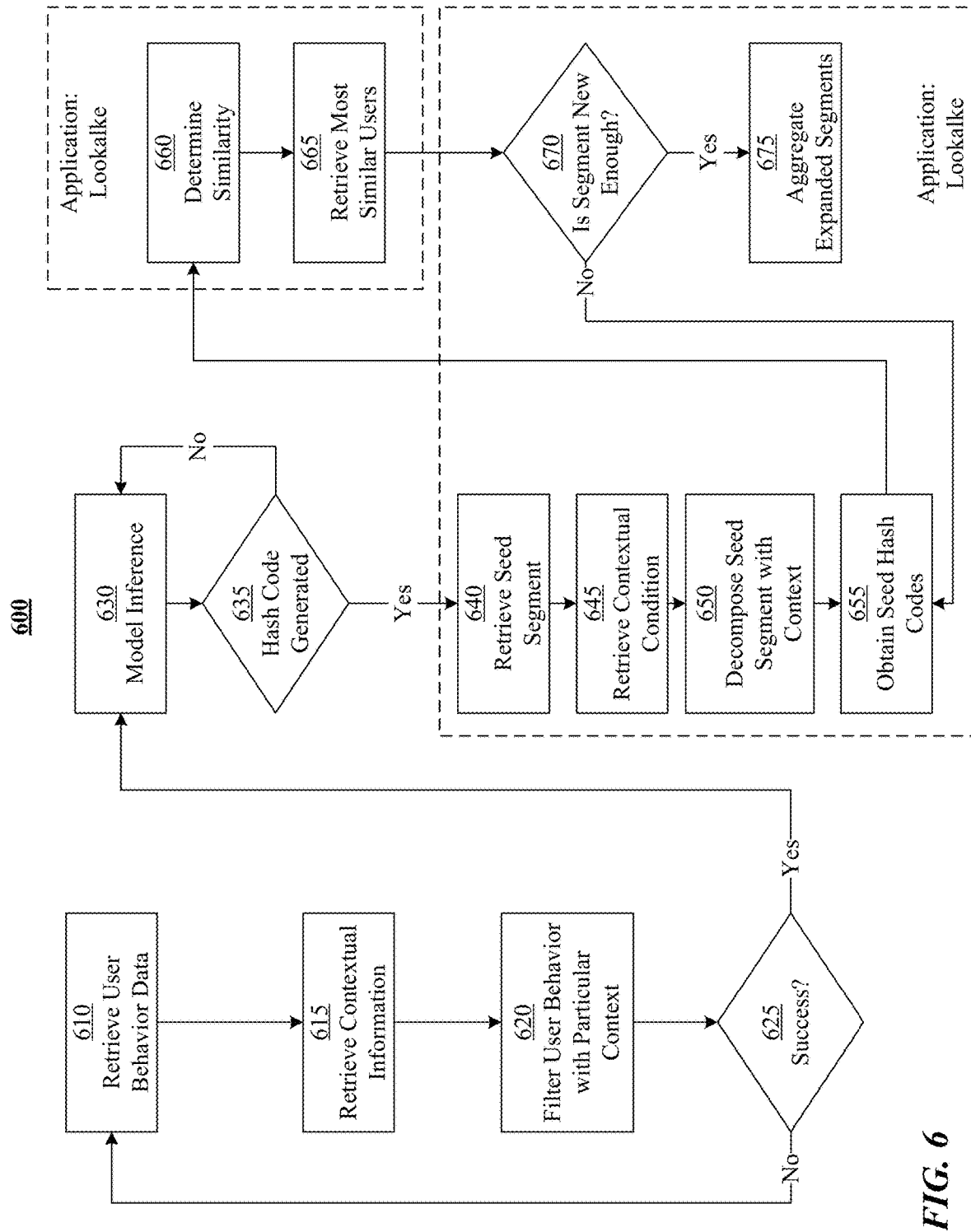
FIG. 6 illustrates an example method of operation of a system for generating and using heterogeneous hash codes.

FIG. 6 illustrates a method 600 of operation of the disclosed system for generating and using heterogeneous hash codes according to one embodiment of the architecture disclosed herein. Method 600 may comprise a process to be used with a system configured similar to the system architecture 400c incorporating contextual decomposition. The method 600 many begin at step 610, where a computing system may receive user behavior data from one or more client devices. For example, the system may receive records of user interactions with an application or an indication that a user has watched a particular video. At step 615, the system may also receive contextual information associated with the user behavior data. As described herein, the contextual information may include information such as a time of the interaction, location of the interaction, device used for interaction, demographics associated with the user and the user's household, etc. At step 620, the system may filter user behavior and contextual information based on a particular context. The system may further filter user behavior based on a particular value of the context. In particular embodiments, the system may use a contextual decomposition module 460 and context specific behavior module 470 to filter user behavior. In one example, as described above, the system may filter user behavior based on location, and further filter the data based on the particular location values. In particular embodiments, steps 610-620 may be considered to relate to preprocessing the data or constructing the inputs to the inference or modeling stage, which generates the heterogeneous hash codes for all users. At step 625 the system may confirm that the preprocessing step resulted in success. If the determination is that the processing was unsuccessful, the method may return to step 610 to try again. The processing may be unsuccessful for a variety of reasons, including that an insufficient volume of data has been collected for the user, that the data may have been too sparse to create a meaningful representation, or a variety of other reasons. If the determination is that the processing was successful, the method may proceed to step 630.

At step 630 the system may use a heterogeneous hashing model 430 to generate a heterogeneous hash code based on the filtered data. In particular embodiments, the system may use a multi-hashing and storage module 480. The heterogeneous hashing model 430 may be incorporated into the multi-hashing and storage module 480. This process may variously be referred to as model inference, because, as described further herein, the heterogeneous hashing model 430 may be a machine learning model that has been trained to generate heterogeneous hash codes. The generated hash codes may be configured to preserve information about the user activity data and contextual information needed to calculate a similarity of users in behavior and context. In particular embodiments, the generated hash codes may not preserve the exact history of behaviors and contexts. In doing so, the hash codes may be much smaller and thus faster to compare than the original data they encode. At step 635, the system may evaluate the generated hash code to confirm that the hash code has been successfully created. Step 635 may encompass confirming that the hash code complies with rules relating to formatting, organization of data, error checking, and other relating requirements. These requirements may be pre-specified by the system or the application system for which the hash codes are being generated. Together, steps 630 and 635 may be responsible for generating the hash codes for the user data and contextual information.

In particular embodiments, steps 640-675 may be performed in part or in full by an application system (e.g., applications system 450) using the heterogeneous hash codes. At step 640 the application system 450 may receive a seed segment of users. The seed segment of users may be a collection of users chosen by the application system 450 or a user thereof as representative of the expanded group of users that the user would like to have identified. In particular embodiments, the seed segment may comprise users who have already received advertising targeting or users who have been identified as successful matches for a lookalike expansion. At step 645, the application system 450 may receive the contextual condition 460 that the user of the application system 450 desires to target. At step 650, the application system 450 may decompose the seed segment using the contextual condition information received in the preceding segments. This may encompass decomposing the seed segment data based on the target condition. The application system 450 may perform the decomposition in a manner similar to how the contextual decomposition module 460 decomposes the user behavior data 410. In particular embodiments, the application system 450 may incorporate a contextual decomposition module for this purpose. At step 655, the application system 450 may obtain seed hash codes from the multi-hashing and storage module 470 based on the decomposed seed segment 453 and contextual condition 460. In particular embodiments, the seed segment may require performance of multi-hashing on decomposed behaviors to generate the seed hash codes in the event that the decomposed seed hash codes have not been prepared in advance. Because, as described herein, the heterogeneous hash codes are stored in a manner that allows the application systems 450 to retrieve only the most relevant hash codes based on the contextual condition 460, the application system 450 may retrieve different heterogeneous hash codes for varying contextual conditions 460 even if the seed segment 453 is the same. Thus, the retrieval of the correct heterogeneous hash codes is an major component of implementing the hash code comparison speedups that are a technical benefit of the described technology.

At steps 660 and 665, the application system 450 may perform the application for which the heterogeneous hash codes have been retrieved. For example, the application system 450 may perform the lookalike expansion. At step 660, the application system 450 may compare decomposed hash codes for a variety of users not in the seed segment 453 to the seed heterogeneous hash codes. The comparison may, in particular embodiments, involve computing a bit-wise comparison or distance between the heterogeneous hash codes in an embedding space. The heterogeneous hash codes may have been produced by a heterogeneous hashing model 430 trained to generate heterogeneous hash codes that are similar when the underlying user activity data is similar and to generate heterogeneous hash codes that are dissimilar when the underlying user activity data is dissimilar. Thus, the distance between two heterogeneous hash codes is approximately reflective of the differences between the underlying user activity data. At step 665, the application system 450 may retrieve the most similar users to the users in the seed segment 453. The most similar user may be the user whose corresponding heterogeneous hash code is nearest to the seed heterogeneous hash codes in the embedding space. In particular embodiments, the application system 450 may identify all users within a threshold distance. In particular embodiments, the application system 450 may identify a threshold number of users, e.g., the fifty closest users. The application system 450 may hash the users to buckets and rank general users using distance calculations, using contextual conditions as a filter.

In particular embodiments, the application system 450 may be configured to make a novelty determination regarding the retrieved users. For example, at step 670, the application system 450 may compare the retrieved segment of users to the seed segment of users to determine if the retrieved segment has a sufficient number of users or whether the retrieved segment of users satisfies a threshold degree of similarity. The application system 450 may determine that the retrieved segment of users has too high a degree of overlap with the seed segment of users, and proceed to step 655 where it may identify additional hash codes to which to compare the seed segment of users. If the application system 450 determines that the retrieved segment of users satisfies the threshold, the application system 450 may proceed to step 675 where it aggregates the collection of user segments (e.g., including the seed segment or not including the seed segment as appropriate), and prepares the expanded segment of users for return to the user of the application system 450.

In particular embodiments, the process of comparing users may be reliant on a weights matrix. As described herein, the process of generating heterogeneous hash codes may result in hash codes with substantially similar hash values for certain contextual information and substantially dissimilar hash values for other contextual information. The system or application system comparing the hash values may be configured to weight certain portions of the hash code comparison according to a weighting matrix that identifies sections of the hash code (e.g., particular context information) that is important in identifying, for example, similar user segments. A weighting matrix may also be used when generating the heterogeneous hash codes as a method of speeding up the comparison. The weights stored in the weighting matrix may be machine learned or based on heuristic values depending on the knowledge based available to the operator of the system or application system.

As described previously, another method for performing nearest neighbor search via deep hashing of user behavior histories relates, in particular embodiments, to generating hash codes for comparison of users using a Time-Aware Attention CNN (TAACNN). The TAACNN abstracts users' behavior at various time scales. In particular embodiments, this model combines features of a user's long-term preferences with her short-term preferences. Thus, the RACNN/ TAACNN model may be suitable for modeling the user's more dynamic behavior patterns.

The TAACNN stems from the interrogation of several technical problems in the field of user activity modelling. For example, a first question relates to how to appropriately preprocess sequential behavior data to be used by a deep learning algorithm? Deep learning algorithms show promise in processing sequential data. However, current deep learning models for sequential data are designed for text analysis or video analysis. Sequential behavior data is a different class of data. For example, first, it is fundamentally one-dimensional data, which does not comprise a similarity structure as in image data. Second, sequential behavior data is discontinuous. A second question relates to how to generalize a user representation for sequential behavior data when only certain portions of the data may reliably have metadata information? Unlike the other sequential data like text and video that have no complementary data, sequential behavior data may be linked to metadata. Metadata information could prove to be useful for binary hashing. Thus, a problem to solve was how to make a generalized deep learning algorithm to create a user representation that uses metadata when available, but is not entirely reliant on it. A third question relates to how to address a user's long-term and short-term behavior? Sequential behavior data inherently stores a user's long-term and short-term behavior information in it. For example, the behavior data may reveal a user's preferences on a moment-to-moment basis as well as preferences over months or years. Since long-term behavior and short-term behavior may show diverging patterns, the problem is how to process them separately to abstract accurate features without negatively effecting the hashing performance. A fourth question relates to how to abstract a user's behavior pattern at multiple time-aware scale levels? Even when specifically targeting long-term or short-term features, how to dynamically identify features at different time-scale levels is a complex and difficult problem.

In particular embodiments, one solution contemplated by this disclosure to solve problems such as these is a Time-Aware Attention Convolutional Neural Network (TAACNN) to perform binary hashing for sequential behavior data. This binary hashing model may be integrated into a variety of networks and applications that, greatly simplified, must compare information about users (segment expansion, user analysis, etc.). This new deep-learning based model solves the previously stated problems in at least the following ways. The TAACNN model introduces a input layer that preprocesses the user's sequential behavior and maps the one-dimensional data into three dimensions. This allows the one-dimensional data to be processed by convolutional neural network at all. During the mapping from low-dimensional data to high-dimensional data, sequential behavior data is aggregated to make sure that the high-dimensional data does not suffer severe sparsity issues. As an added benefit, the data under analysis can be more freely treated as continuous data. The proposed input layer and the proposed embedding layer make the TAACNN adaptive and compatible to a variety of different embedding algorithms. This characteristic makes it compatible with data that may or may not have metadata information. The two kernel sets in a time-aware attention layer of the TAACNN helps the TAACNN model separate the user's long-term and short-term behavior attention and abstracts the features thereof separately. This prevents mixing up attention features that are unrelated to others to help improve the quality of the hash code generated from TAACNN. The proposed TAACNN supports different kernel sizes in the proposed time-aware attention layer to facilitate recognition of long-term and short-term behavior at different time-scale levels. This increases the coverage of this model's time awareness and creates a more profound representation of user's profile.

Figure 19:
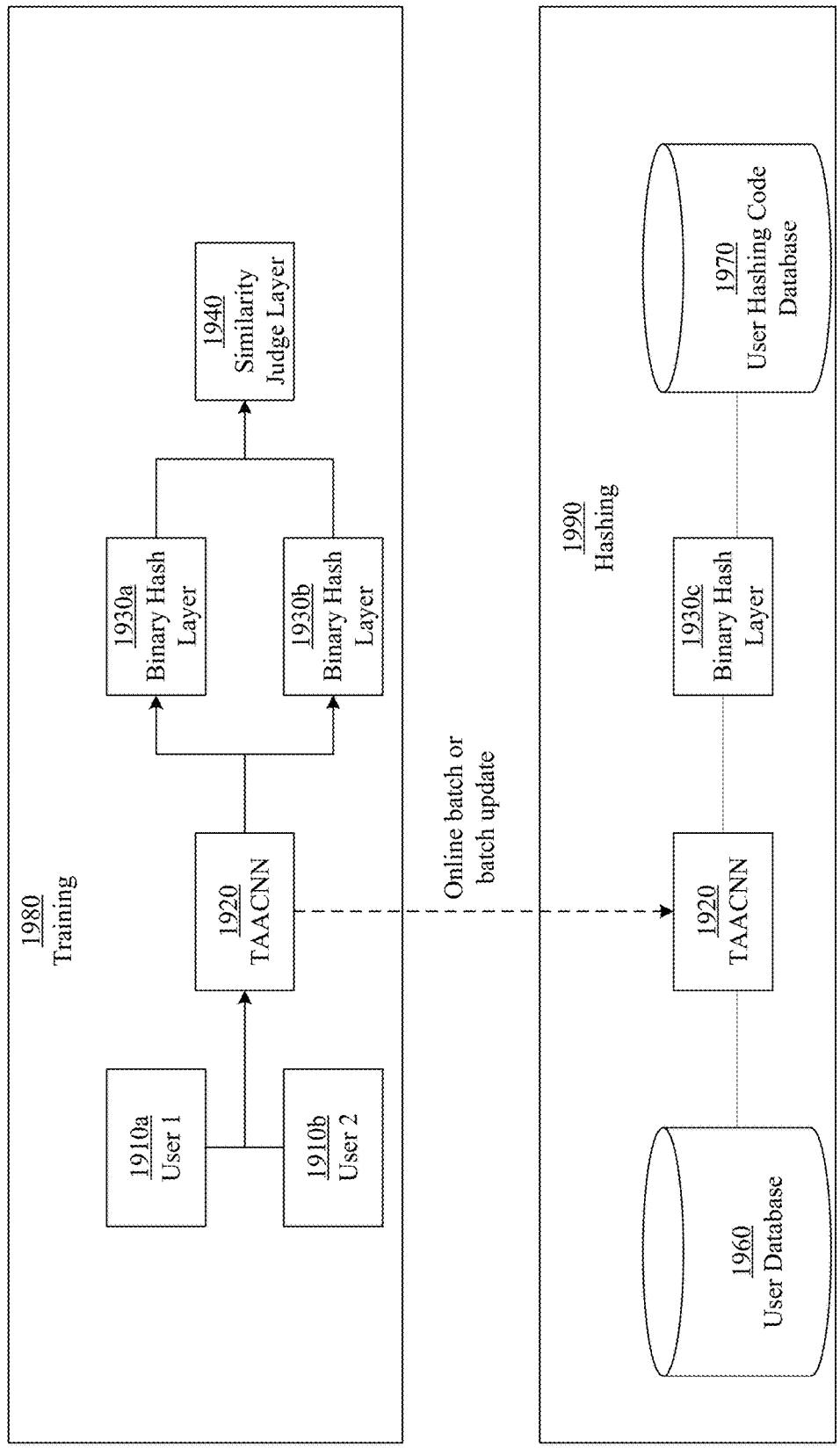
FIG. 19 illustrates an example model of systems for training and using a time-aware attention convolutional neural network.

FIG. 19 illustrates an example model of systems for training and using the proposed TAACNN. As the model 1900 proposes, the training system 1980 and the hashing system 1990 are intimately linked. As will be described herein, the TAACNN 1920 may be updated (at times online) during the training procedure, which may improve the hashing performance.

During the training procedure 1980, a user pair (comprising data regarding two users 1910a and 1910b) may be loaded into a Siamese or parallel training structure. The data from the two users 1910a and 1910b is passed into a deep-learning based TAACNN model 1920. The TAACNN 1920 generates user embeddings for both users using the methods described further herein. These continuous embeddings from the two users 1910a and 1910b are passed to two binary hashing layers 1930a and 1930b to generate a binary hashing code for each of the two users 1910a and 1910b. The binary hashing layers 1930a and 1930b may be configured to use a variety of algorithms to generate the hashing codes, including, by way of example only and not limitation, different activation functions or different thresholds. In particular embodiments, the binary hashing layers 1930a and 1930b for User 1 1910a and User 2 1910b may share the same binary hashing algorithm. In particular embodiments, the binary hashing layers 1930a and 1930b for User 1 1910a and User 2 1910b may use different algorithms if needed based on the arrangement of the data of the users. After the two hash codes are generated for the user pair, the hash codes are provided to a similarity judge layer 1940 to compute their similarity label. The similarity judge layer 1940 may support a variety of comparison methods, including, but not limited to hamming distance, Euclidean distance, etc. After the similarity judge layer 1940 computes a similarity result for this user pair, the similarity result will be compared with a ground-truth genuine similarity label provided by the administrator of the training procedure 1980. Any error between the similarity result and the genuine similarity label may be back-propagated through the architecture, updating the TAACNN model 1920 in the training process.

During the hashing process 1990, the TAACNN model 1920 trained from the training process 1980 is used to generate hash codes for large scale user sequential behavior data that is stored in a user database 1960. The user database 1960 may, in particular embodiments, be equivalent to the user activity data database 410. Another binary hashing layer 1930c generates binary hashes from the hash codes generated by the TAACNN model 1920. The output (e.g., the hash codes) is stored in a user hashing code database 1970. The user hashing code database 1970 may, in particular embodiments, be equivalent to the heterogeneous hash code database 440, with the caveat that, rather than storing heterogeneous hash codes, the user hashing code database 1970 stores TAA-based user hashing codes. The TAACNN model 1920 in the hashing process 1990 comes directly from the training process 1980 and is updated as changes are made during the training process. The disclosure envisions as least two methods of updating the TAACNN model 1920: online updating and batch updating. During online updating, the training process 1980 and hashing process 1990 run essentially simultaneously and TAACNN model 1920 is updated in both processes at the same time or at specific check points during the process (e.g., after an amount of time run without an update) according to system design. In particular embodiments, online updating may provide the hashing process 1990 flexibility to handle streaming data. For batching processing, the TAACNN model 1920 updating occurs at the end of a full training process operation. In particular embodiments, batch updating ensures that only completely updated TAACNN models 1920 are propagated to the hashing model 1990.

Figure 20A:
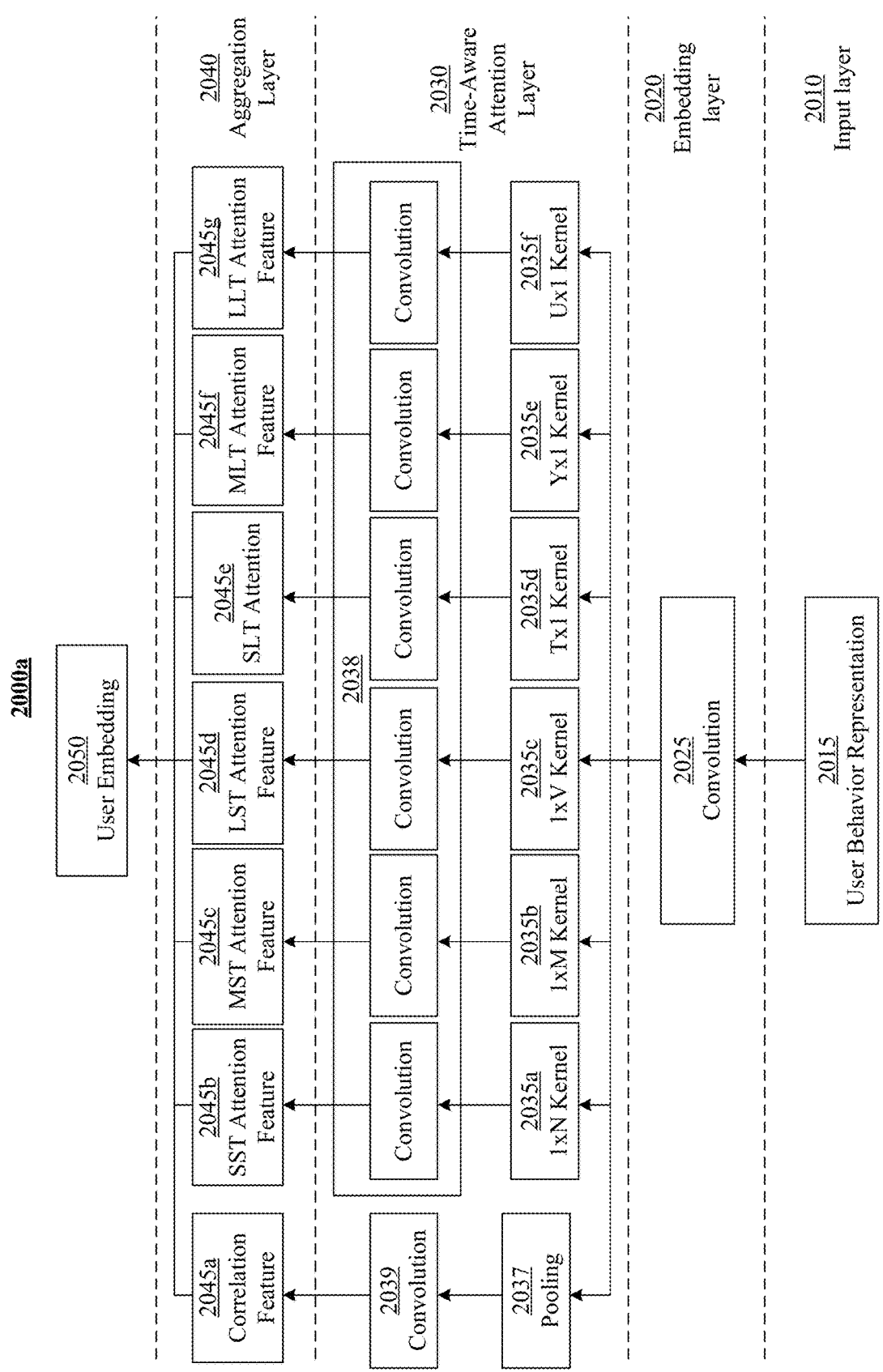
FIGS. 20a-20c illustrates an example architecture for a time-aware attention convolution neural network.

FIG. 20a illustrates an example architecture 2000a for the TAACNN 1920. The output of the TAACNN 1920 (and indeed of the example architecture 2000a) is a user embedding 2050 for a binary hashing layer (e.g., 1930a and 1930b) to compute each user's hash codes. The quality of the user embedding 2050 is highly determinative of the quality of the hash code and thus the quality of the comparison. The input layer 2010 is a data pre-processing layer that maps sequential behavior data input (with or without metadata, in particular embodiments) into a three-dimensional structure that may be processed by a CNN. The result of the pre-processing is a user behavior representation 2015 that may be further understood by reference to FIG. 21.

User behavior data is often represented by records of user interactions with specific items. The first step in the data pre-processing stage is to embed each item into a vector representation. A variety of appropriate algorithms may be used here depending on, for example, if the input data has metadata associated with it or not. If there is no metadata, an embedding algorithm similar to word2vec may be used here. If metadata is available, an embedding algorithm similar to one-hot or multi-hot embedding may be used according to the particular arrangement of the metadata. The next step in the data pre-processing stage is to sessionize a user's activity history by a desired time unit. The choice of the time unit for each session may impact the reliability of user embedding 2050 relating to particular time-scales. As one example a session length of one hour may be choice. In particular embodiments, longer or short session length are envisioned. For each session, all items that the user in consideration had interacted with during the session timeframe are aggregated using the embedding of the corresponding items generated from the previous step. For example, between time=0 and time=1 hour, all interactions are placed in a first session, between time=1 hour and time=2 hours, all interactions are placed in a second session. The aggregation represents the summary of the user's behavior for the given session.

Figure 21:
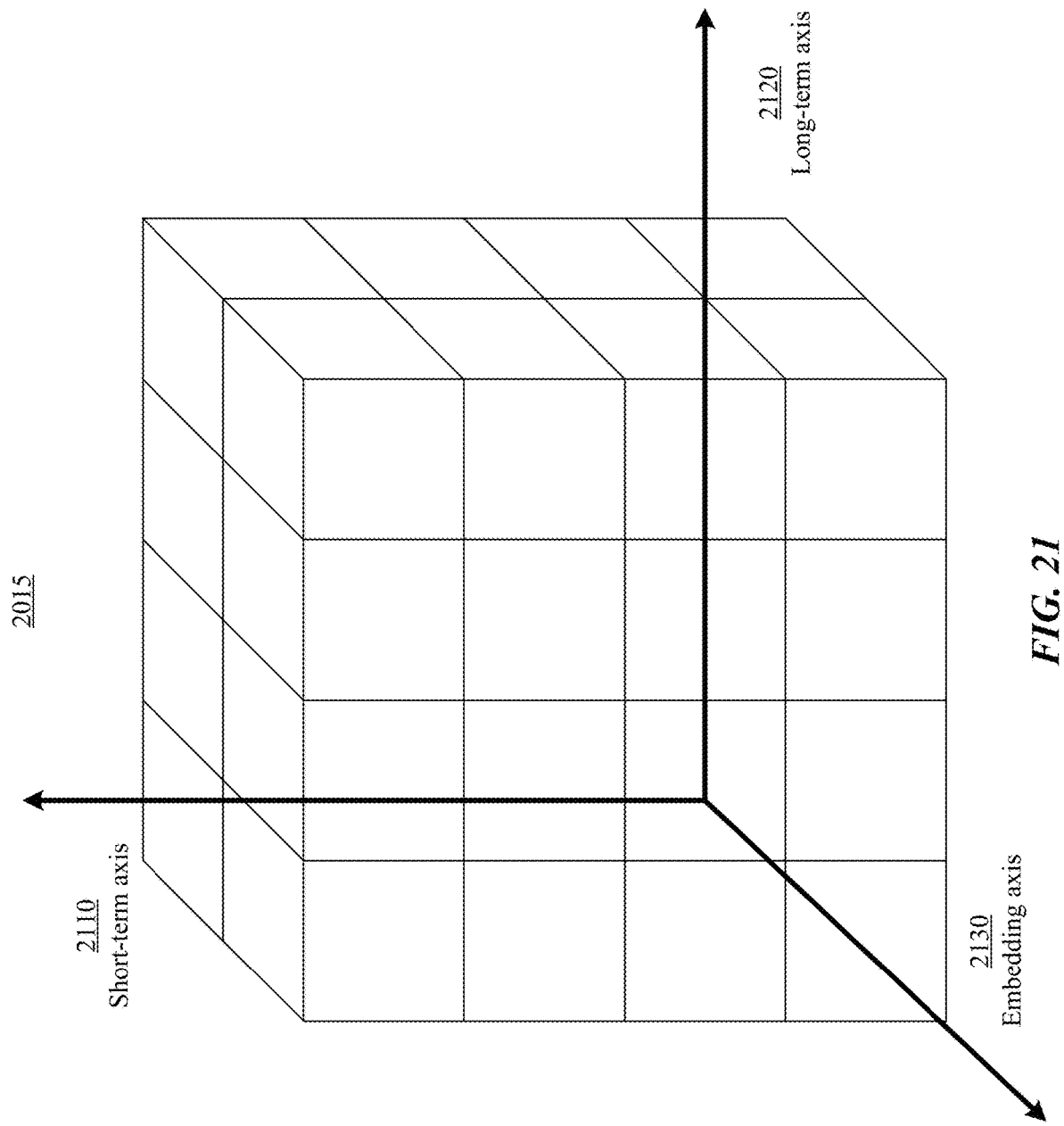
FIG. 21 illustrates an example user behavior representation.

After sessionization, each user's behavior input is reshaped or mapped into a high-dimensional space $U \in R^{H \times W \times C}$, where H is short-term dimension (e.g., day), W is long-term dimension (e.g., month), and C is category/embedding size. The exact time required in each dimension may be relative to the length of time chosen for the session. FIG. 21 illustrates how an instance of user sequential behavior data conceptually appears after the mapping. In the figure, short-term axis 2110 corresponds to short-term time units (e.g., hourly basis), long-term axis 2120 corresponds to long-term time units (e.g., daily basis), and the embedding axis 2130 corresponds to different embedding sizes for the embedding of items. In particular embodiments, the short-term time unit may, but is not required to, be equivalent to the length of the chosen session timeframe. In particular embodiments, the short-term dimension and long-term dimension may be chosen to approximately balance (or to avoid an imbalance) in the user representation. For example, if a short-term dimension of 1 hour is chosen, it may be inappropriate or inefficient to choose 1 year for the long-term dimension. This may be designated through heuristic models set by customer applications.

In particular embodiments, the embedding from the input layer 2010 may be sparse or the result of a hand-crafted embedding. Thus the user behavior representation 2015 may carry more conceptual information than actual similarity information. This scenario would negatively affect the overall performance of TAACNN, particularly its ability to preserve similarity information at large scale. To overcome this limitation, an embedding layer 2020 is introduced as part of the architecture 2000a. The embedding layer 2020 applies convolution kernel 2025 (e.g., a mapping or embedding kernel) to transform the output of the input layer 2010—based on a sparse representation-into an adaptive distributed representation. The embedding layer 2020 may use a 1×1 convolution kernel 2025 to map the low-dimensional sparse input U into a high dimensional adaptive dense embedding $U_e \in R^{H \times W \times E}$, where E is the embedding size (e.g., 128).

The time-aware attention layer 2030 is used to abstract time-aware attention features in the architecture 2000a of the TAACNN model. The time-aware attention layer 2030 separates attention features into short-term and long-term features. Short-term attention features (shown as axis 2110 in FIG. 21) are feature abstractions that encompass a relatively small time scale correlation. Long-term attention features (shown as axis 2120 in FIG. 21) are feature abstractions that encapsulate the importance of relative independent activities in the longer period of time. As an example, short-term attention features may depict a user scenario in which the user's TV watching behavior at 8:00 PM today is highly correlated with the user's TV watching behavior at 9:00 PM today. Long-term attention features may then depict the user's TV watching behavior at 8:00 PM on Monday compared to that at 8:00 PM on last Monday. Due to the differences in time unit representation, short-term attention features and long-term attention features cannot be easily combined. They are therefore represented and handled separately in the architecture 2000a of the TAACNN. From this, it has been discerned that traditional square shaped convolution kernels, used in previous CNNs are a sub-optimal kernel option for the time-aware attention layer 2030 not the best kernels options for our time-aware attention mechanism with sequential behavior data.

To address this, two separate designs of two different sets of kernels for short-term and long-term attention features have been developed. In the example architecture 2000a shown in FIG. 20a, the short-term kernel set (2035a-2035c) is applied along the short-term axis 2110 of the user behavior representation 2015 using kernels with different dimensions: 1×N (2035a), 1×M (2035b), and 1×V (2035c) where N<M<V. These kernels are abstractions of small short-term (SST), middle short-term (MST) and large short-term (LST) attention features respectively. The long-term kernel set (2035d-2035f) is applied along the long-term axis 2120 of the user behavior representation 2015 using kernels with different dimensions: T×1 (2035d), Y×1 (2035e), and U×1 (2035f) where T<Y<U. The longer-term kernel set are abstractions of small long-term (SLT), middle long-term (MLT) and large long-term (LLT) attention features respectively. For each kernel set, different kernel sizes within the kernel set are used to increase the time awareness coverage in the case of feature loss. Although in this example each kernel set includes three kernels, more or fewer kernels may be used per set and the sets may not be equivalent in size, as appropriate. In some embodiments, the size of the kernel sets may be based on the characteristics of the sequential behavior dataset used (e.g., sparsity, time range of the dataset, etc.). In some embodiments, no matter how many kernels are in one set, their sizes may follow the rule:

$$2(i+1)$$

where $i \in 1, 2, 3, \ldots, R$ and

R is how many kernels are in this kernel set.

To prevent information loss during possible interactions between short-term and long-term attention features, a pooling layer 2037 is introduced to the time-aware attention layer 2030 to abstract out the correlation feature as complementary features. The pooling layer 2037 and various convolution kernels 2035a-v35f are used to convolve the user behavior representation (shown as convolution blocks 2039 and 2038). A pseudo-code algorithm explaining how the time-aware layers abstract features has been previously discussed as Algorithm 2 above. Algorithm 2 shows how to compute the features in the time-aware attention layer according to particular embodiments.

The output of the convolution blocks 2039 and, collectively, 2038 are a correlation feature 2045a and a variety of attention features 2045b-2045g. The short short-term feature 2045b, middle short-term feature 2045c, and long short-term feature 2045d are the results of convolution of the user behavior representation 2015 by the convolution kernels 2045a, 2035b and 2035c, respectively. The short long-term feature 2045e, middle long-term feature 2045f, and long long-term feature 2045g are the results of convolution of the user behavior representation 2015 by the convolution kernels 2045d, 2035e and 2035f, respectively. In the aggregation layer 2040 all features output from the time-aware attention layer 2030 are flattened and concatenated together. From this, the final user embedding 2050 is prepared. The user embedding 2050 will ultimately be used for similarity training and/or hashing.

Figure 20B:
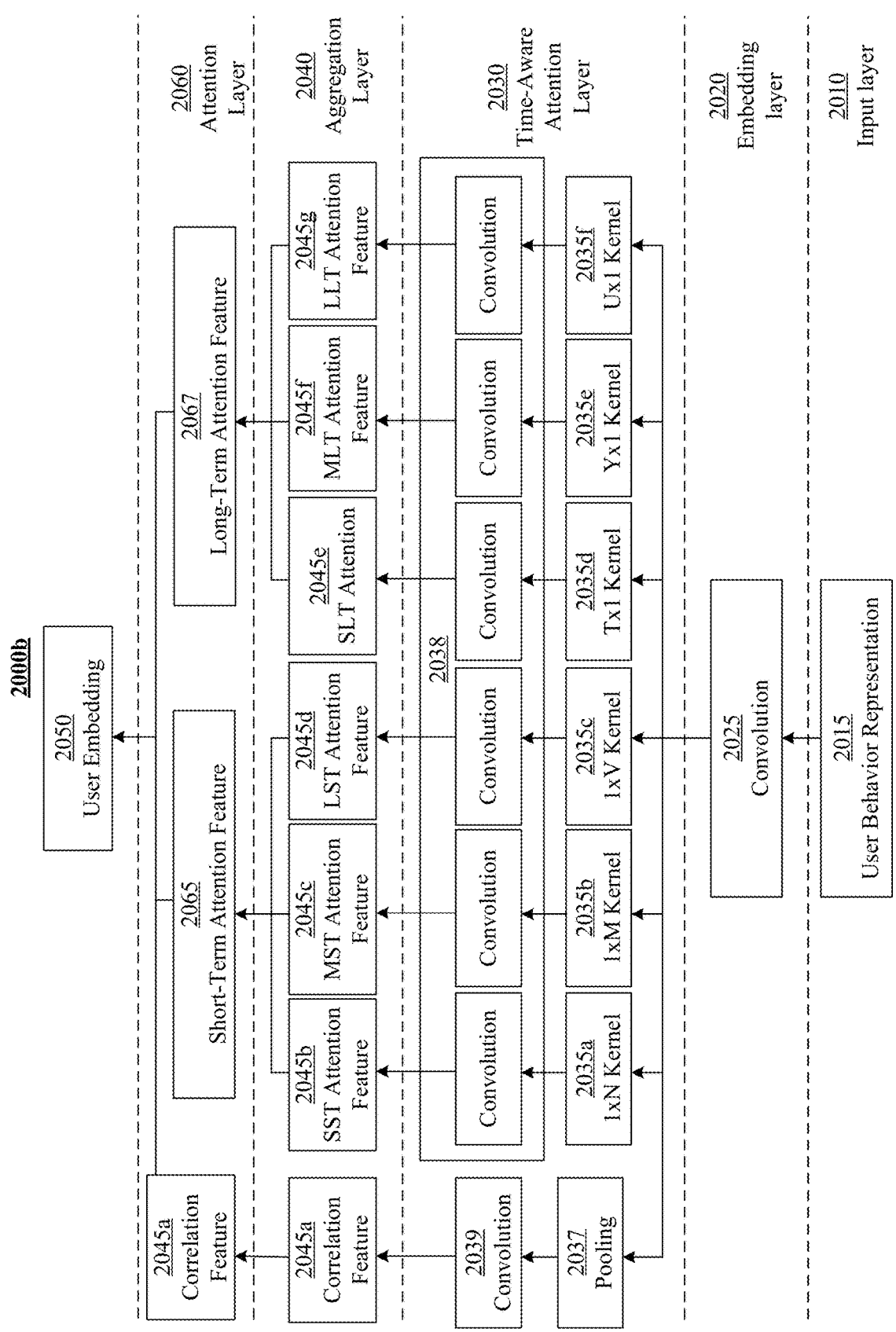

FIG. 20b illustrates another example architecture 2000b for the TAACNN 1920. The architecture 2000b builds on the architecture 2000a illustrated in FIG. 20a and similarly-numbered components should be understood to behave similarly except where specifically otherwise noted. The architecture 2000b illustrated in FIG. 20b includes a further attention layer 2060 after the aggregation layer 2040. If the time range of the sequential data is too large (e.g., over several decades) or if there is a large difference between the time-scale covered by the session size and the time scale of one or more both of the short-term axis 2110 and the long-term axis 2120, to cover as deep an analysis of the time awareness as possible, additional kernels may need to be implemented. In particular embodiments, this may render training deep learning models and generating user embeddings from the aggregation layer 2040 directly impractical because the aggregation layer 2040 may be considered to have too much parameters (e.g., the resulting user embedding 2050 may have too high a dimensionality to be efficiently stored, retrieved, and compared). In this case, an attention layer 2060 is added to abstract a combined short-term attention feature 2065 and long-term attention feature 2067. The short-term attention feature 2065 abstracts the short short-term feature 2045b, middle short-term feature 2045c, and long short-term feature 2045d, and other additional features that have been generated as a result of additional kernels selected to process the user behavior representation 2015. The long-term attention feature 2067 abstracts the short long-term feature 2045e, middle long-term feature 2045f, and long long-term feature 2045g, and other additional features that have been generated as a result of additional kernels selected to process the user behavior representation 2015. As, in this example, no additional abstraction of the correlation feature 2045a is required, it is simply carried forward. The correlation feature 2045a, short-term attention feature 2065, and long-term attention feature 2067 (and any of attention features that may be used) are combined to form the user embedding 2050.

Figure 20C:
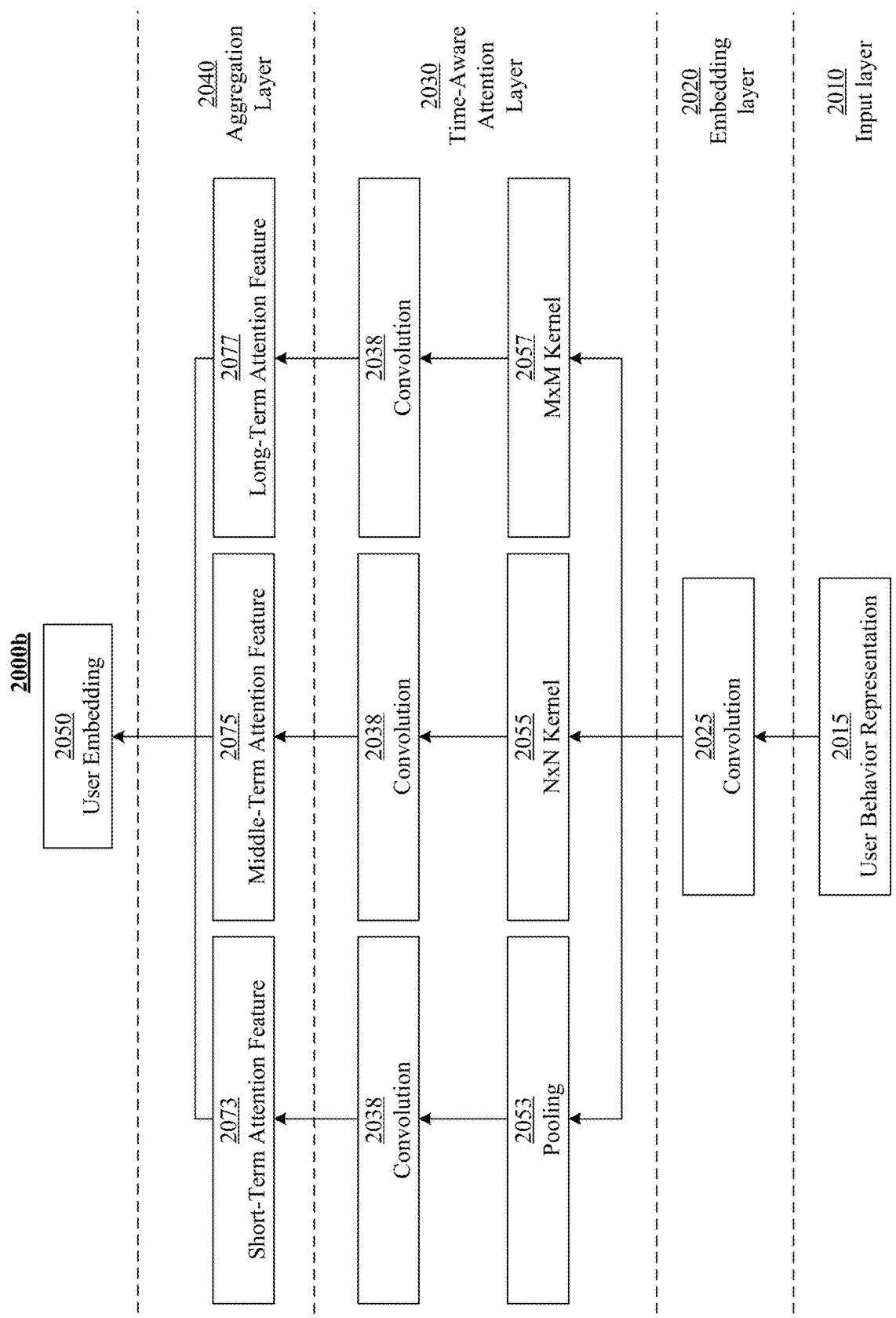

FIG. 20c illustrates another example architecture 2000b for the TAACNN 1920. The architecture 2000c is related to the architecture 2000a illustrated in FIG. 20a and similarly-numbered components should be understood to behave similarly except where specifically otherwise noted. Speaking generally, the architecture 2000c is a simplified version of the architecture 2000a. If the time range of the user sequential behavior data is small (for example, only one day's behavior data is available), the long-term attention and short-term attention may become tightly related to each other. In this case, the asymmetric convolution kernels 2035a-2035f of architecture 2000a may be replaced with more traditional square-like pooling 2053 and convolution kernels 2055 and 2057 to abstract features. Each of the pooling 2053, N×N convolution kernel 2055, and M×M convolution kernel 2057 (N<M) may be convolved with the user behavior representation 2015 to generate an attention feature. In this architecture, the short-term attention feature 2073 is the result of the pooling 2053, the middle-term attention feature 2075, is the result of the N×N convolution kernel 2055, and the long-term attention feature 2077 is the result of the M×M convolution kernel 2057. In the aggregation layer 2040 the attention features 2073, 2075, and 2077 are combined to form the user embedding 2050.

In particular embodiments, the TAACNN, and these adaptive architectures particularly, may be used with a variety of application systems. For example, the approach described herein may be used for fast and efficient user analysis. By providing accurate time awareness for both long-term and short-term attentions on user behavior, the TAACNN provides high quality user embeddings that may be used by a variety of application customers to base a user analysis model. In particular, the embeddings may facilitate faster development of accurate user analysis model by providing a strong and adaptive starting point for future systems while avoiding issues associated with data sparsity and noise. For example, an advertising analysis can use each user's hash code or embedding to run a demographic analysis model to identify appropriate target customers. As another example, the approach described herein may be used for a fast and efficient recommendation system. Because the TAACNN can provide high quality hash codes for users and embeddings for items (from the input layer of the TAACNN), it can help provide a high performance recommendation system. Additionally, the TAACNN may be used to support a lookalike modeling system. Because the TAACNN provides a high quality hash code for each user, it can be used to create a high performance lookalike system as described above. For example, if an advertising team has a seed group of users that is interested in programming type, by comparing user hash codes, the advertising team may easily enlarge the seed group by introducing users with similar hash codes compared to seed group users.

Several experiments have been performed to evaluate the performance of the disclosed techniques against other existing binary hashing techniques. More specifically, the disclosed technology is compared against other baseline hashing methods like LSH and VDSH-S on both public (MovieLens, Goodreads) and proprietary anonymized user activity data. All these datasets contain sequential user activities with respect to certain items.

All datasets are pre-processed by removing some user activities (e.g., too many ratings by a single user) that look like outliers to assure more precise evaluation results. Table 1 contains a summary statistics of such pre-processed datasets.

TABLE 1

Dataset Statistics (after preprocessing)

| Dataset | # Users | # Items | # Interactions/User | # Interactions | # Categories |
|---|---|---|---|---|---|
| MovieLens | 62,081 | 10,142 | 127.8 | 7,931,778 | 20 |
| Goodreads | 100,000 | 640,660 | 88.4 | 8,842,472 | 8 |
| User Activity Data | 24,389 | 21,669 | 3,847 | 93,838,974 | 49 |

Since there is no ground-truth for user similarity labels on the given datasets, ground-truth labels are created using the Jaccard index from the most recent time slot for each dataset. Next, the most similar and dissimilar users with respect to each user (i.e., 5 similar vs 5 dissimilar users) are categorized based on the predefined Jaccard index value. From those instances before the most recent time slot, input features are extracted for the disclosed models (Categorical Attention and RACNN/TAACNN). Then the extracted features are reintegrated with the similarity labels (from the present) and are split into 80%/20% respectively to produce training and test sets.

There can be a computation of the number of correct predictions divided by the total number of predictions made (i.e., accuracy) through the trained Categorical Attention and RACNN/TAACNN models, varying hash code lengths. For LSH, a model is constructed based on the relative frequency of item categories, appearing in user-item interactions. An approximate similarity join is then performed on the trained LSH model to infer user pair similarity or dissimilarity. For VDSH-S, the model is trained using the tf-idf values computed for all items that exist in the user interaction history, in conjunction with user's most frequently-viewed item category as a label. Next, hash codes generated by the trained VDSH-S model are extracted to predict the pairwise user similarity based on the Hamming distance between the given hash codes. The accuracy of LSH and VDSH-S is measured by comparing their prediction output with the similarity labels of the disclosed technology.

Figure 22:
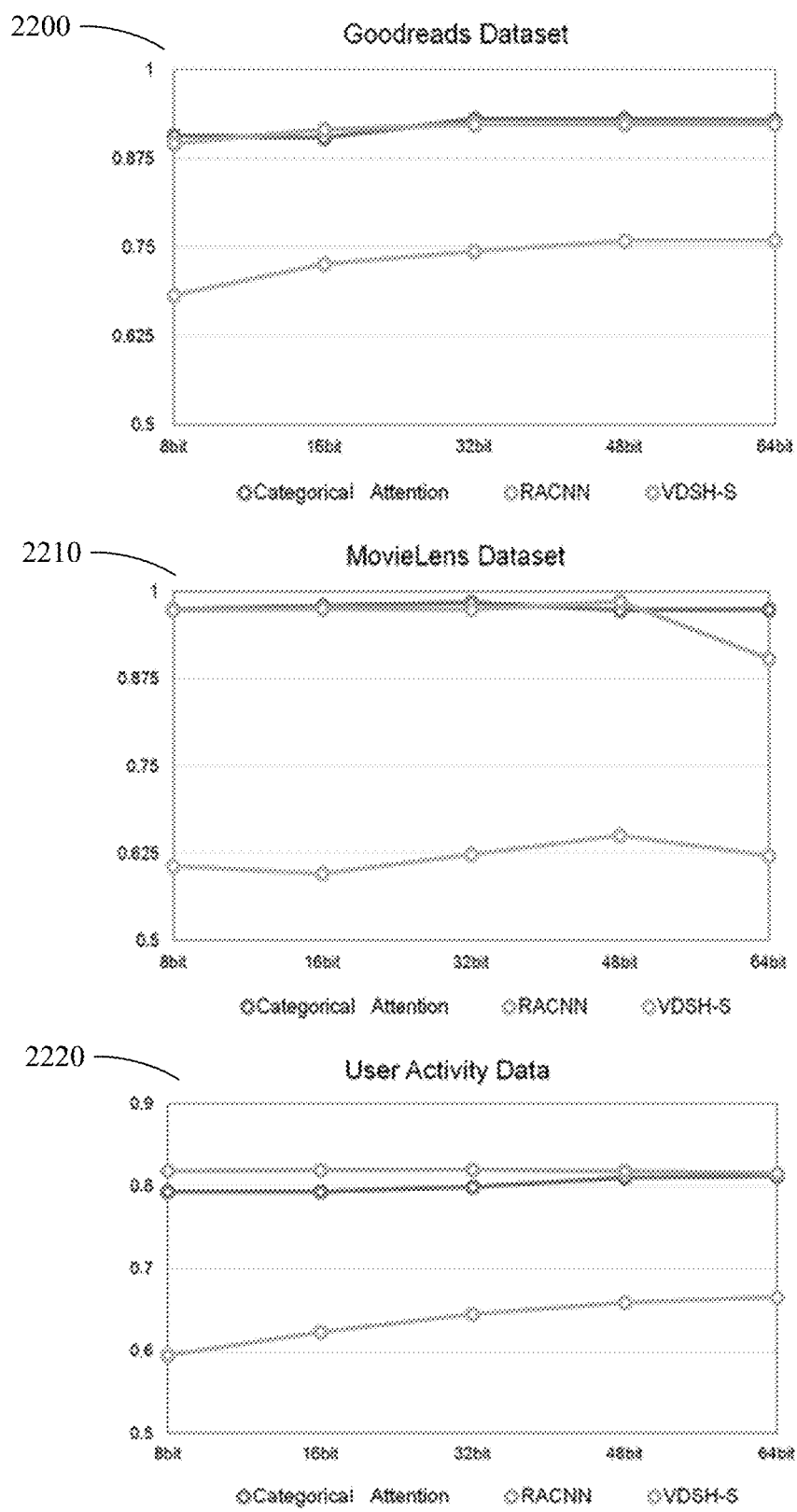
FIG. 22 illustrates performance of hashing systems on various datasets.

Table 2 and FIG. 22 show the performance of all methods for three datasets that considered in the experiments. FIG. 22 illustrates an Accuracy evaluation result from the three described user behavior datasets, Goodreads 2200, MovieLens 2210, and the proprietary user activity data 2220.

TABLE 2

Accuracy of user similarity prediction for different number of hash bits on the three user behavior datasets

| Method | 8 bits | 16 bits | 32 bits | 48 bits | 64 bits |
|---|---|---|---|---|---|
| MovieLens | | | | | |
| Categorical Attention | 0.974 | 0.979 | 0.984 | 0.974 | 0.975 |
| RACNN | 0.9733 | 0.9746 | 0.9745 | 0.9855 | 0.9038 |
| VDSH-S | 0.606 | 0.596 | 0.623 | 0.65 | 0.621 |
| LSH | | | 0.787 | | |

TABLE 2-continued

Accuracy of user similarity prediction for different number of hash bits on the three user behavior datasets

| Method | 8 bits | 16 bits | 32 bits | 48 bits | 64 bits |
|---|---|---|---|---|---|
| Goodreads | | | | | |
| Categorical Attention | 0.907 | 0.903 | 0.931 | 0.931 | 0.929 |
| RACNN | 0.8964 | 0.9157 | 0.9239 | 0.9233 | 0.9233 |
| VDSH-S | 0.683 | 0.727 | 0.744 | 0.759 | 0.76 |
| LSH | | | 0.831 | | |
| User Activity Data | | | | | |
| Categorical Attention | 0.793 | 0.793 | 0.799 | 0.81 | 0.812 |
| RACNN | 0.8184 | 0.8189 | 0.8202 | 0.8177 | 0.8156 |
| VDSH-S | 0.595 | 0.623 | 0.645 | 0.659 | 0.665 |
| LSH | | | 0.738 | | |

From the given results, it can be observed that both Categorical Attention and RACNN/TAACNN significantly outperform other baseline binary hashing techniques on all datasets across various hash bit lengths. This provides validation that both LSH and VDSH-S are not able to consider categorical preferences or time scales in the user-item interaction history. It can also be observed that the highest accuracy improvement (0.34/0.2 against VDSH-S/LSH) was observed with the MovieLens dataset. This is because the MovieLens dataset has far sparser interaction data points per user than other datasets (see Table 2). Because the techniques described herein can model a user's sequential behavior with high precision using high-level metadata and various time scales, hash codes generated for each user are more accurate than other baseline models.

Categorical Attention shows strong performance on datasets like MovieLens and Goodreads, where user activity is sparse because it generates categorical embeddings that capture long-term preferences. RACNN/TAACNN may be suitable for datasets with denser user-item interaction data points like in the proprietary user activity data of the disclosed technology because it is more sensitive to time-variance.

Described herein are two example deep binary hashing architecture embodiments to derive similarity preserving binary hash codes for sequential behavior data. Categorical Attention utilizes the high-level metadata to capture user's preferences. RACNN/TAACNN explores evolving user's preferences across different time scales. Experiments with various datasets demonstrate the effectiveness of the embodiments of the disclosed technology through their significant performance improvement over other well-known hashing methods. It is also shown herein that Categorical Attention is more effective for those datasets in which user activity over time is not very frequent, while RACNN/TAACNN is more effective for those datasets in which user activity over time is more frequent. The present disclosure illustrates the importance of developing precise models for binary hashing specifically for sequential behavior data.

Figure 23:
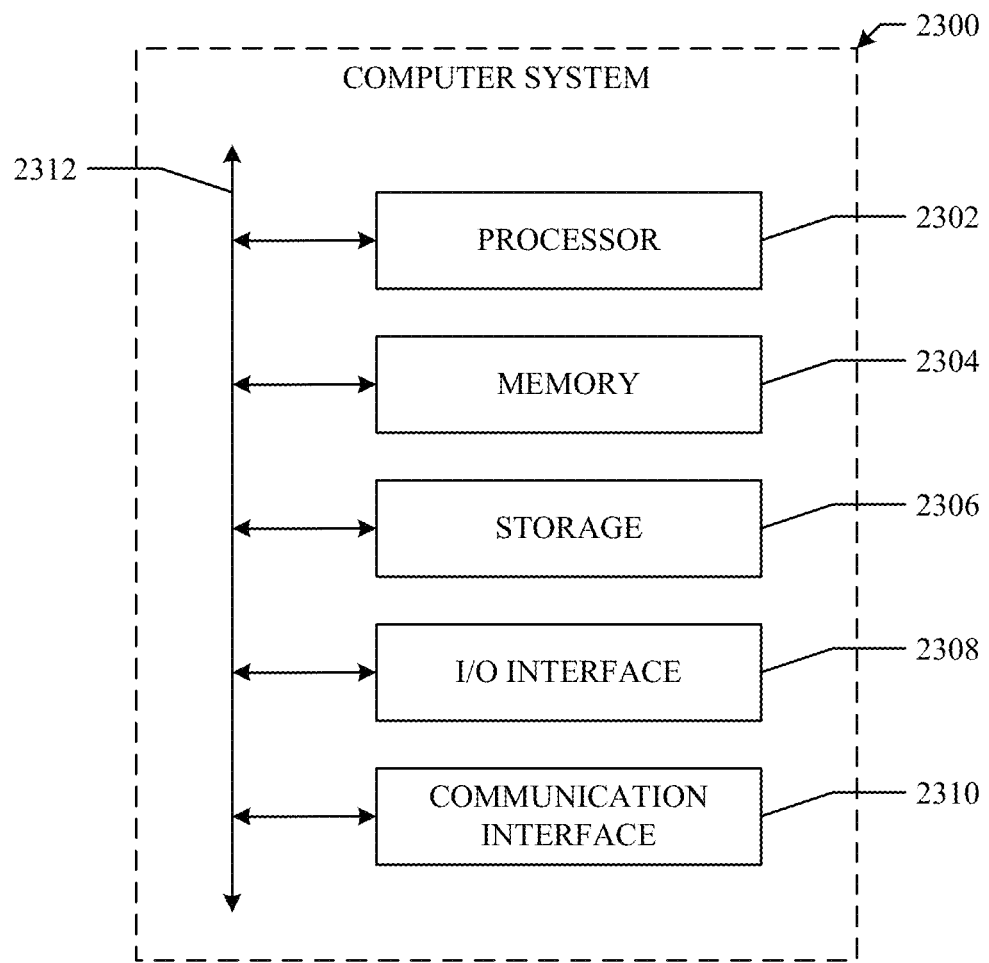
FIG. 23 illustrates an example computer system.

FIG. 23 illustrates an example computer system 2300. In particular embodiments, one or more computer systems 2300 perform one or more steps of one or more methods described or illustrated herein. In particular embodiments, one or more computer systems 2300 provide functionality described or illustrated herein. In particular embodiments, software running on one or more computer systems 2300 performs one or more steps of one or more methods described or illustrated herein or provides functionality described or illustrated herein. Particular embodiments include one or more portions of one or more computer systems 2300. Herein, reference to a computer system may encompass a computing device, and vice versa, where appropriate. Moreover, reference to a computer system may encompass one or more computer systems, where appropriate.

This disclosure contemplates any suitable number of computer systems 2300. This disclosure contemplates computer system 2300 taking any suitable physical form. As example and not by way of limitation, computer system 2300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 2300 may include one or more computer systems 2300; be unitary or distributed; span multiple locations; span multiple machines; span multiple data centers; or reside in a cloud, which may include one or more cloud components in one or more networks. Where appropriate, one or more computer systems 2300 may perform without substantial spatial or temporal limitation one or more steps of one or more methods described or illustrated herein. As an example and not by way of limitation, one or more computer systems 2300 may perform in real time or in batch mode one or more steps of one or more methods described or illustrated herein. One or more computer systems 2300 may perform at different times or at different locations one or more steps of one or more methods described or illustrated herein, where appropriate.

In particular embodiments, computer system 2300 includes a processor 2302, memory 2304, storage 2306, an input/output (I/O) interface 2308, a communication interface 2310, and a bus 2312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 2302 includes hardware for executing instructions, such as those making up a computer program. As an example and not by way of limitation, to execute instructions, processor 2302 may retrieve (or fetch) the instructions from an internal register, an internal cache, memory 2304, or storage 2306; decode and execute them; and then write one or more results to an internal register, an internal cache, memory 2304, or storage 2306. In particular embodiments, processor 2302 may include one or more internal caches for data, instructions, or addresses. This disclosure contemplates processor 2302 including any suitable number of any suitable internal caches, where appropriate. As an example and not by way of limitation, processor 2302 may include one or more instruction caches, one or more data caches, and one or more translation lookaside buffers (TLBs). Instructions in the instruction caches may be copies of instructions in memory 2304 or storage 2306, and the instruction caches may speed up retrieval of those instructions by processor 2302. Data in the data caches may be copies of data in memory 2304 or storage 2306 for instructions executing at processor 2302 to operate on; the results of previous instructions executed at processor 2302 for access by subsequent instructions executing at processor 2302 or for writing to memory 2304 or storage 2306; or other suitable data. The data caches may speed up read or write operations by processor 2302. The TLBs may speed up virtual-address translation for processor 2302. In particular embodiments, processor 2302 may include one or more internal registers for data, instructions, or addresses. This disclosure contemplates processor 2302 including any suitable number of any suitable internal registers, where appropriate. Where appropriate, processor 2302 may include one or more arithmetic logic units (ALUs); be a multi-core processor; or include one or more processors 2302. Although this disclosure describes and illustrates a particular processor, this disclosure contemplates any suitable processor.

In particular embodiments, memory 2304 includes main memory for storing instructions for processor 2302 to execute or data for processor 2302 to operate on. As an example and not by way of limitation, computer system 2300 may load instructions from storage 2306 or another source (such as, for example, another computer system 2300) to memory 2304. Processor 2302 may then load the instructions from memory 2304 to an internal register or internal cache. To execute the instructions, processor 2302 may retrieve the instructions from the internal register or internal cache and decode them. During or after execution of the instructions, processor 2302 may write one or more results (which may be intermediate or final results) to the internal register or internal cache. Processor 2302 may then write one or more of those results to memory 2304. In particular embodiments, processor 2302 executes only instructions in one or more internal registers or internal caches or in memory 2304 (as opposed to storage 2306 or elsewhere) and operates only on data in one or more internal registers or internal caches or in memory 2304 (as opposed to storage 2306 or elsewhere). One or more memory buses (which may each include an address bus and a data bus) may couple processor 2302 to memory 2304. Bus 2312 may include one or more memory buses, as described below. In particular embodiments, one or more memory management units (MMUs) reside between processor 2302 and memory 2304 and facilitate accesses to memory 2304 requested by processor 2302. In particular embodiments, memory 2304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2304 may include one or more memories 2304, where appropriate. Although this disclosure describes and illustrates particular memory, this disclosure contemplates any suitable memory.

In particular embodiments, storage 2306 includes mass storage for data or instructions. As an example and not by way of limitation, storage 2306 may include a hard disk drive (HDD), a floppy disk drive, flash memory, an optical disc, a magneto-optical disc, magnetic tape, or a Universal Serial Bus (USB) drive or a combination of two or more of these. Storage 2306 may include removable or non-removable (or fixed) media, where appropriate. Storage 2306 may be internal or external to computer system 2300, where appropriate. In particular embodiments, storage 2306 is non-volatile, solid-state memory. In particular embodiments, storage 2306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2306 taking any suitable physical form. Storage 2306 may include one or more storage control units facilitating communication between processor 2302 and storage 2306, where appropriate. Where appropriate, storage 2306 may include one or more storages 2306. Although this disclosure describes and illustrates particular storage, this disclosure contemplates any suitable storage.

In particular embodiments, I/O interface 2308 includes hardware, software, or both, providing one or more interfaces for communication between computer system 2300 and one or more I/O devices. Computer system 2300 may include one or more of these I/O devices, where appropriate. One or more of these I/O devices may enable communication between a person and computer system 2300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2308 for them. Where appropriate, I/O interface 2308 may include one or more device or software drivers enabling processor 2302 to drive one or more of these I/O devices. I/O interface 2308 may include one or more I/O interfaces 2308, where appropriate. Although this disclosure describes and illustrates a particular I/O interface, this disclosure contemplates any suitable I/O interface.

In particular embodiments, communication interface 2310 includes hardware, software, or both providing one or more interfaces for communication (such as, for example, packet-based communication) between computer system 2300 and one or more other computer systems 2300 or one or more networks. As an example and not by way of limitation, communication interface 2310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2310 for it. As an example and not by way of limitation, computer system 2300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2300 may include any suitable communication interface 2310 for any of these networks, where appropriate. Communication interface 2310 may include one or more communication interfaces 2310, where appropriate. Although this disclosure describes and illustrates a particular communication interface, this disclosure contemplates any suitable communication interface.

In particular embodiments, bus 2312 includes hardware, software, or both coupling components of computer system 2300 to each other. As an example and not by way of limitation, bus 2312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2312 may include one or more buses 2312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
   acquiring sequential user behavior data including one-dimensional data, the user behavior data being associated with a user;
   creating higher-dimensional user-behavior data by mapping the one-dimensional data into a higher-dimensional space;
   abstracting features from the sequential user behavior data to cover short-term and long-term timeframes by applying a set of one or more short-term kernels to a first part of the higher-dimensional data and by applying a set of one or more long-term kernels to a second part of the higher-dimensional data; and
   determining one or more properties of the user based on the abstracted features.

2. The method of claim 1, wherein acquiring sequential user behavior data comprises:
   receiving user behavior data from a user device;
   storing the user behavior data in a user behavior database; and
   accessing the user behavior data on-demand from the user behavior database.

3. The method of claim 1, wherein the sequential behavior data comprises a series of interactions of the first user with one or more content items, each interaction being associated with metadata.

4. The method of claim 1, further comprising:
   prior to abstracting features to cover short-term and long-term timeframes, mapping the one-dimensional data into at least three dimensions.

5. The method of claim 4, wherein the mapping is performed in part by convolving the sequential user behavior data with a mapping kernel.

6. The method of claim 1, wherein abstracting features to cover short-term and long-term timeframes comprises:
   sessionizing the sequential user behavior data into sessions of a fixed length.

7. The method of claim 6, wherein abstracting features to cover short-term and long-term timeframes further comprises:
   convolving the sessionized sequential user behavior data with one or more kernels selected from a plurality of kernel sets comprising the set of one or more short-term kernels and the set of one or more long-term kernels, wherein each kernel of the plurality of kernel sets comprise at least two dimensions, and wherein a first dimension of kernels of a first of the plurality of kernel sets is larger than a second dimension of the kernels of the first kernel set and a second dimension of kernels of a second of the plurality of kernel sets is larger than a first dimension of the kernels of the second kernel set.

8. The method of claim 1, wherein the determined properties comprise temporal preferences, location preferences, demographic information, origination device preferences, categorical preferences, or behavior patterns of the user relative to the short-term and long-term timeframes.

9. The method of claim 1 further comprising:
  determining one or more properties of a second user based on features abstracted from sequential user behavior data associated with the second user; and
  determining a degree of similarity between the first user and the second user based on the determined properties of each user.

10. The method of claim 9, wherein the abstracted features are provided to a binary hashing component that generates a hash code representation of the abstracted features; and
  wherein the determining a degree of similarity between the first user and the second user comprises calculating a bitwise distance between the hash code representation of the abstracted features of the first user and the hash code representation of the abstracted features of the second user.

11. The method of claim 9, wherein the first user is of a given set of users and the second user is of an identified set of users; and
  wherein the method further comprises:
    determining that the degree of similarity between the first user and the second user satisfies a threshold level of similarity; and
    expanding the given set of users by adding the second user to the segment.

12. The method of claim 1, wherein the features are abstracted from the sequential user behavior data by a machine-learning model.

13. An apparatus comprising:
  one or more non-transitory computer-readable storage media embodying instructions; and
  one or more processors coupled to the storage media and configured to execute the instructions to:
  acquire sequential user behavior data including one-dimensional data, the user behavior data being associated with a user;
  create higher-dimensional user-behavior data by mapping the one-dimensional data into a higher-dimensional space;
  abstract features from the sequential user behavior data to cover short-term and long-term timeframes by applying a set of one or more short-term kernels to a first part of the higher-dimensional data and by applying a set of one or more long-term kernels to a second part of the higher-dimensional data; and
  determine one or more properties of the user based on the features.

14. The apparatus of claim 13, wherein the instructions to acquire sequential user behavior data are further executed by the processors to:
  receive user behavior data from a user device;
  store the user behavior data in a user behavior database; and
  access the user behavior data on-demand from the user behavior database.

15. The apparatus of claim 13, wherein the sequential behavior data comprises a series of interactions of the first user with one or more content items, each interaction being associated with metadata.

16. The apparatus of claim 13, wherein the instructions are further executed by the processors to:
  prior to abstracting features to cover short-term and long-term timeframes, map the one-dimensional data into at least three dimensions.

17. One or more non-transitory computer-readable storage media embodying instructions that are operable when executed to:
  acquire sequential user behavior data including one-dimensional data, the user behavior data being associated with a user;
  create higher-dimensional user-behavior data by mapping the one-dimensional data into a higher-dimensional space;
  abstract features from the sequential user behavior data to cover short-term and long-term timeframes by applying a set of one or more short-term kernels to a first part of the higher-dimensional data and by applying a set of one or more long-term kernels to a second part of the higher-dimensional data; and
  determine one or more properties of the user based on the features.

18. The non-transitory computer-readable storage media of claim 17, wherein the instructions to acquire sequential user behavior data are further operable when executed to:
  receive user behavior data from a user device;
  store the user behavior data in a user behavior database; and
  access the user behavior data on-demand from the user behavior database.

19. The non-transitory computer-readable storage media of claim 17, wherein the sequential behavior data comprises a series of interactions of the first user with one or more content items, each interaction being associated with metadata.

20. The non-transitory computer-readable storage media of claim 17, wherein the instructions are further operable when executed to:
  prior to abstracting features to cover short-term and long-term timeframes, map the one-dimensional data into at least three dimensions.

* * * * *